United States Patent
Zhu et al.

(10) Patent No.: US 12,206,850 B2
(45) Date of Patent: Jan. 21, 2025

(54) TECHNIQUES FOR MODIFYING QUANTIZATION PARAMETER IN TRANSFORM SKIP MODE

(71) Applicant: Bytedance Inc., Los Angeles, CA (US)

(72) Inventors: Weijia Zhu, San Diego, CA (US); Li Zhang, San Diego, CA (US); Jizheng Xu, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

(21) Appl. No.: 17/944,876

(22) Filed: Sep. 14, 2022

(65) Prior Publication Data

US 2023/0016377 A1    Jan. 19, 2023

Related U.S. Application Data

(63) Continuation of application No. 17/528,312, filed on Nov. 17, 2021, now Pat. No. 11,451,780, which is a (Continued)

(30) Foreign Application Priority Data

Jun. 28, 2019    (WO) ................ PCT/CN2019/093852
Jul. 3, 2019    (WO) ................ PCT/CN2019/094593

(51) Int. Cl.
*H04N 19/124*    (2014.01)
*H04N 19/159*    (2014.01)
(Continued)

(52) U.S. Cl.
CPC ......... *H04N 19/124* (2014.11); *H04N 19/159* (2014.11); *H04N 19/176* (2014.11); *H04N 19/70* (2014.11)

(58) Field of Classification Search
CPC .. H04N 19/124; H04N 19/159; H04N 19/176; H04N 19/70
See application file for complete search history.

(56) References Cited

U.S. PATENT DOCUMENTS 9,432,667 B2    8/2016    Seregin
10,404,988 B2    9/2019    Ye et al.
(Continued)

FOREIGN PATENT DOCUMENTS

CA    3135397 A1    11/2020
CN    104205836 A    12/2014
(Continued)

OTHER PUBLICATIONS

Document: JVET-O0296-v1, Chiang, M., et al., "CE8-related: Intra prediction mode for BDPCM," Joint Video Experts Team (JVET) of ITU-T SG 16 WP 3 and ISO/IEC JTC 1/SC 29/WG 11 15th Meeting: Gothenburg, SE, Jul. 3-12, 2019, 5 pages.
(Continued)

*Primary Examiner* — Nam D Pham
(74) *Attorney, Agent, or Firm* — Conley Rose, P.C.

(57) ABSTRACT

A method of video processing is described. The method includes performing a conversion between a current video block of a video and a coded representation of the current video block according to a rule, wherein the rule specifies that, due to use of an identity transform coding tool for representing the current video block into the coded representation, a syntax field indicative of a quantization parameter used for decoding the current video block is included such that a value of the quantization parameter is modified according to a rule, wherein the identity transform coding tool allows coefficient values at a transform domain of the current block to be same as values of a residual block of the current video block.

20 Claims, 26 Drawing Sheets

Related U.S. Application Data continuation of application No. PCT/US2020/040028, filed on Jun. 28, 2020.

(51) Int. Cl.
*H04N 19/176* (2014.01)
*H04N 19/70* (2014.01)

(56) References Cited

U.S. PATENT DOCUMENTS

| | | | |
|---|---|---|---|
| 11,917,169 | B2 | 2/2024 | Xu |
| 12,041,223 | B2 | 7/2024 | Zhu et al. |
| 2013/0259120 | A1 | 10/2013 | Van der Auwera |
| 2013/0294524 | A1* | 11/2013 | Van Der Auwera ... H04N 19/60 375/240.18 |
| 2013/0343464 | A1 | 12/2013 | Van Der Auwera |
| 2014/0314142 | A1 | 10/2014 | Oh |
| 2014/0327831 | A1 | 11/2014 | Liu |
| 2015/0341673 | A1 | 11/2015 | Joshi et al. |
| 2015/0358631 | A1 | 12/2015 | Zhang |
| 2015/0373327 | A1 | 12/2015 | Zhang |
| 2016/0100179 | A1 | 4/2016 | He |
| 2016/0227239 | A1 | 8/2016 | Pu et al. |
| 2016/0234498 | A1 | 8/2016 | Misra |
| 2016/0261865 | A1 | 9/2016 | Li et al. |
| 2016/0353111 | A1 | 12/2016 | Zhang et al. |
| 2016/0353112 | A1 | 12/2016 | Zhang |
| 2017/0085891 | A1* | 3/2017 | Seregin ............... H04N 19/157 |
| 2017/0238001 | A1 | 8/2017 | Li |
| 2017/0374372 | A1 | 12/2017 | Liu et al. |
| 2018/0014017 | A1 | 1/2018 | Li et al. |
| 2018/0124398 | A1 | 5/2018 | Park et al. |
| 2018/0205946 | A1 | 7/2018 | Zhang et al. |
| 2018/0213222 | A1 | 7/2018 | Lee et al. |
| 2018/0241995 | A1 | 8/2018 | Son |
| 2018/0352226 | A1 | 12/2018 | An et al. |
| 2019/0116380 | A1 | 4/2019 | Chuang et al. |
| 2019/0166370 | A1 | 5/2019 | Xiu et al. |
| 2019/0182482 | A1 | 6/2019 | Vanam et al. |
| 2019/0281311 | A1 | 9/2019 | Ye et al. |
| 2020/0045322 | A1 | 2/2020 | Ye et al. |
| 2020/0077122 | A1 | 3/2020 | Alakuijala |
| 2020/0092546 | A1 | 3/2020 | Ye |
| 2020/0275121 | A1 | 8/2020 | Zhao et al. |
| 2020/0296381 | A1 | 9/2020 | Coban |
| 2020/0404324 | A1 | 12/2020 | Pham Van et al. |
| 2020/0413092 | A1 | 12/2020 | Ray et al. |
| 2021/0136395 | A1 | 5/2021 | Jun et al. |
| 2021/0218964 | A1 | 7/2021 | Park |
| 2021/0344961 | A1 | 11/2021 | Zhao |
| 2022/0021902 | A1 | 1/2022 | Choi |
| 2022/0232205 | A1 | 7/2022 | Chiang |
| 2022/0248036 | A1 | 8/2022 | Choi |
| 2022/0295102 | A1 | 9/2022 | Zhao |
| 2022/0368909 | A1 | 11/2022 | Park |

FOREIGN PATENT DOCUMENTS

| | | |
|---|---|---|
| CN | 105934948 A | 9/2016 |
| CN | 106576174 A | 4/2017 |
| CN | 107005717 A | 8/2017 |
| CN | 108028940 A | 5/2018 |
| CN | 109792516 A | 5/2019 |
| CN | 110662039 A | 1/2020 |
| CN | 110662054 A | 1/2020 |
| CN | 110662063 A | 1/2020 |
| CN | 110719463 A | 1/2020 |
| CN | 111919441 A | 11/2020 |
| CN | 113574894 A | 10/2021 |
| CN | 117978990 A | 5/2024 |
| CN | 114026859 B | 6/2024 |
| EP | 3123716 A1 | 2/2017 |
| IN | 540607 | 5/2024 |
| IN | 546864 | 7/2024 |
| JP | 2018532319 A | 11/2018 |
| JP | 2020017970 A | 1/2020 |
| JP | 2022514921 A | 2/2022 |
| JP | 2022525430 A | 5/2022 |
| JP | 2023010892 A | 1/2023 |
| JP | 2023171907 A | 12/2023 |
| JP | 7451731 B2 | 3/2024 |
| KR | 20180056687 A | 5/2018 |
| KR | 20210068513 A | 6/2021 |
| KR | 20230129623 A | 9/2023 |
| KR | 102684993 A | 7/2024 |
| TW | 201806384 A | 2/2018 |
| WO | 2015138927 A1 | 9/2015 |
| WO | 2017049119 A1 | 3/2017 |
| WO | 2017206805 A1 | 12/2017 |
| WO | 2018064948 A1 | 4/2018 |
| WO | 2019099569 A1 | 5/2019 |
| WO | 2019112394 A1 | 6/2019 |
| WO | 2020169104 A1 | 8/2020 |
| WO | 2020213931 A1 | 10/2020 |
| WO | 2020223449 A1 | 11/2020 |
| WO | 2021003241 A1 | 1/2021 |
| WO | 2021150407 A1 | 7/2021 |

OTHER PUBLICATIONS

Document: JVET-N1002-v1, Chen, J., et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, 70 pages.

Document: JVET-O0651-v1, Van, L., et al., "Non-CE8: Intra prediction mode derivation for DM chroma block with corresponding IBC/PCM luma," Joint Video Experts Team (JVET) of ITU-T SG 16 WP 3 and ISO/IEC JTC 1/SC 29/WG 11 15th Meeting: Gothenburg, SE, Jul. 3-12, 2019, 2 pages.

Document: JVET-L0053-v3, Choi, N., et.al., "CE3-related: Chroma DM modification," Joint Video Experts Team (JVET) of ITU-T SG 16 WP 3 and ISO/IEC JTC 1/SC 29/WG 11 12th Meeting: Macao, CN, Oct. 3-12, 2018, 7 pages.

Document: JVET-O0275-v1, Chiang, M., et al., CE3-related: Chroma DM derivation for IBC an d PCM, Joint Video Experts Team (JVET) of ITU-T SG 16 WP 3 and ISO/IEC J TC 1/SC 29/WG 11 15th Meeting: Gothenburg, SE, Jul. 3-12, 2019, 5 pages.

Document: JCTVC-S0043-v5, Sole, J., et.al., "Non-CE6: Delta QP signalling for palette," Joint Collaborative Team on Video Coding (JCT-VC) of ITU-T SG 16 WP 3 and ISO/I EC Jtc 1/SC 29/WG 11 19th Meeting: Strasbourg, FR, Oct. 17-24, 2014, 5 pages.

Document: JVET-N1001-v9, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 65 pages.

Foreign Communication From A Related Counterpart Application, European Application No. 20833035.7, Extended European Search Report dated Jan. 25, 2023, 11 pages.

Non-Final Office Action from U.S. Appl. No. 17/888,956 dated Oct. 12, 2023, 44 pages.

Xu, J., et al., "Overview of the emerging HEVC screen content coding extension," IEEE Transactions on Circuits and Systems for Video Technology, vol. 26, No. 1, Jan. 2016, 19 pages.

Murakami, A., et al., "High efficiency video Coding," HEVC/H.265 and its applications, Ohmsha, HEVC/H.265 ISBN: 978-4-274-21329-8, May 26, 2022, 26 pages. With English Translation.

Sun, Y., et al., "Analysis of Palette Mode on Versatile Video Coding," Proceedings of 2019 IEEE Conference on Multimedia Information Processing and Retrieval (MIPR), ISBN: 9 78-1-7281-1198-8, DOI: 10.1109/MIPR.2019.00091, Mar. 30, 2019, 10 pages.

Pu, W., et al., "Palette Mode Coding in HEVC Screen Content Coding Extension," IEEE Journal on Emerging and Selected Topics in Circuits and Systems, vol. 6, No. 4, ISSN: 2156-3357, DOI: 10.1109/JETCAS.2016.2605661, Dec. 2016, 21 pages.

Sun, Y., "Palette Mode—a New Coding Tool in Screen Conte NT Coding Extensions of HEVC," Proceedings of 2015 IEEE International Conference on Image Processing (ICIP), IEEE, ISBN: 978-1-4799-8339-1, DOI: 10.1109/ICIP.2015.7351234, Sep. 30, 2015, 11 pages.

(56) References Cited

OTHER PUBLICATIONS

Document: JVET-N1001-v8, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 400 pages.
Document: JVET-M1001-v7, Bross, B., et al., "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, 300 pages.
Bossen, F., Retrieved From the Internet: vcgit.hhi.fraunhofer.de/jvet/VVCSoftware_VTM/tags/VTM-4.0, Oct. 27, 2022, 2 pages.
Document: JVET-N0843-v1, Xu, X., et al., "CE8-related: Combination test of JVET-N0176/JVET-N0317/JVET-N0382 on simplification of IBC vector prediction," Joint Video Experts Team (JVET) of ITU-T SG 16 WP 3 and ISO/IEC JTC 1/SC 29/WG 11 14th Meeting: Geneva, CH, Mar. 19-27, 2019, 11 pages.
Document: JVET-M0464-v4, Bross, B., et al., "Non-CE8: Unified Transform Type Signalling and Residual Coding for Transform Skip," Joint Video Experts Team (JVET) of ITU-T SG 16 WP 3 and ISO/IEC JTC 1/SC 29/WG 11 13th Meeting: Marrakech, MA, Jan. 9-18, 2019, 13 pages.
Document: JVET-N0280, Bross, B., et al., "CE8: Residual Coding for Transform Skip Mode (CE8-4.3a, CE8-4.3b, CE8-4.4a, and CE8-4.4b)," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Document: JVET-M0413, Said, A., et al., "CE5: Per-context CABAC initialization with single window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
Document: JVET-K0353-v1, Misra, K., et al., "CE1: Shared-separate partition tree in QT+BT configuration (Tests 6.3.1 and 5.4.1)," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.
Document: JVET-K0354-v1, Misra, K., et al., "CE1: Shared-separate partition tree in QT+BT+TT configuration (Tests 5.3.2 and 5.4.2)," Joint Video Experts Team (JVET) of ITU-T SG 16 WP 3 and ISO/IEC JTC 1/SC 29/WG 11 11th Meeting: Ljubljana, SI, Jul. 10-18, 2018, 4 pages.
Document: JVET-M0471, Ikeda, M., et al., "CE11.1.6, CE11.1.7 and CE11.1.8: Joint proposals for long deblocking from Sony, Qualcomm, Sharp, Ericsson," Joint Video Experts Team (JVET) of ITU-T SG 16 WP 3 and ISO/IEC JTC 1/SC 29/WG 11 13th Meeting: Marrakesh, MA, Jan. 9-18, 2019, 11 pages.
Document: JVET-M0051, Sun, Y-C., et al., "CE8: Palette mode and intra mode combination (Test8.2.2)," Joint Video Experts Team (JVET) of ITU-T SG 16 WP 3 and ISO/IEC JTC 1/SC 29/WG 11 13th Meeting: Marrakech, MA, Jan. 9-18, 2019, 5 pages.
Document: JVET-N0259-v1, Zhu, W., et al., "CE8-related: Compound Palette Mode," Joint Video Experts Team (JVET) of ITU-T SG 16 WP 3 and ISO/IEC JTC 1/SC 29/WG 11 14th Meeting: Geneva, CH, Mar. 19-27, 2019, 14 pages.
Document: JVET-N0185-r2, Wang, B., et al., "CE3-related: a unified MPM list for intra mode coding," Joint Video Experts Team (JVET) of ITU-T SG 16 WP 3 and ISO/IEC JTC 1/SC 29/WG 11 14th Meeting: Geneva, CH, Mar. 19-27, 2019, 3 pages.
Document: JVET-N1001-v6, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 384 pages.
"Information Technology—High efficiency coding and media delivery in heterogeneous envoironments—Part 2: High Efficiency Video Coding," ISO/IEC DIS 23008/2:201x (4th Ed.), ISO/IEC JTC 1/SC 29/WG 11 N17661, Apr. 20, 2018, 8 pages.
Document: JVET-L0427-v1, Chernyak, R., et al., "CE15-related: Separate Palette Coding for Luma and Chroma components," Joint Video Experts Team (JVET) of ITU-T SG 16 WP 3 and ISO/IEC JTC 1/SC 29/WG 11 12th Meeting:Macao, CN, Oct. 3-12, 2018, 15 pages.
JVET-O0405-v1, Nguyen, T., et al., "Non-CE8: Minimum Allowed QP for Transform Skip Mode," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
JVET-O0919-v2, Karczewicz, M., et al., "Non-CE8 : Minimum QP for Transform Skip Mode," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
Office Action dated Jan. 31, 2022, 17 pages, U.S. Appl. No. 17/502,280, filed Oct. 15, 2021.
Office Action dated Feb. 3, 2022, 10 pages, U.S. Appl. No. 17/528,288, filed Nov. 17, 2021.
Foreign Communication From A Related Counterpart Application, European Application No. 20814223.2, Extended European Search Report dated May 25, 2022, 12 pages.
Foreign Communication From A Related Counterpart Application, Indian Application No. 202147055472, English Translation of Indian Office Action dated Jul. 4, 2022, 7 pages.
Foreign Communication From A Related Counterpart Application, European Application No. 20833143.9, Extended European Search Report dated Jun. 22, 2022, 11 pages.
Foreign Communication From A Related Counterpart Application, Indian Application No. 202147061320, English Translation of Indian Office Action dated Jul. 11, 2022, 6 pages.
Office Action dated Feb. 7, 2022, 9 pages, U.S. Appl. No. 17/528,312, filed Nov. 17, 2021.
Foreign Communication From A Related Counterpart Application, International Application No. PCT/US2020/034913, English Translation of International Search Report dated Sep. 25, 2020, 6 pages.
Foreign Communication From A Related Counterpart Application, International Application No. PCT/US2020/40027, English Translation of International Search Report dated Oct. 2, 2020, 4 pages.
Foreign Communication From A Related Counterpart Application, International Application No. PCT/US2020/40028, English Translation of International Search Report dated Sep. 28, 2020, 4 pages.
JVET-Q2001-vB, Bross, B. et al., "Versatile Video Coding (Draft 8)," Joint Video Experts Team (JVET) of ITU-T SG 16 WP 3 and ISO/IEC JTC 1/SC 29A/VG 11 17th Meeting: Brussels, BE, Jan. 7-17, 2020, 519 pages.
Bossen, F., Retrieved From the Internet: https://A/cgit.hhi.fraunhofer.de/jvetAA/CSoftware_VTM/-/tagsA/TM-7.3, Oct. 28, 2022, 1 page.
JVET-O2011, Segall, A., et al., "JVET common test conditions and evaluation procedures for HDR/WCG video," Joint Video Exploration Team (JVET) of ITU-T SG 16 WP 3 and ISO/IEC JTC 1/SC 29/WG 11 15th Meeting: Gothenburg, SE, Jul. 3-12, 2019, 10 pages.
JVET-N0258-v1, Zhu, W., et al., "CE8-related: Palette Mode Coding," Joint Video Experts Team (JVET) of ITU-T SG 16 WP 3 and ISO/IEC JTC 1/SC 29/WG 11 14th Meeting: Geneva, CH, Mar. 19-27, 2019, pages.
JVET-P0077, Chao, Y-H., et al., "CE8-1.3: Line-based CG Palette Mode," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.
JVET-N0309-v3, Henkel, A., et al., "Non-CE4: Switched half-pel interpolation filter, "Joint Video Experts Team (JVET) of ITU-T SG 16 WP 3 and ISO/IEC JTC 1/SC 29/WG 11 14th Meeting: Geneva, CH, Mar. 19-27, 2019, 8 pages.
JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.
JVET-Q0420-v1, Li, L., et al., "AHG12: Signaling of chroma presence in PPS and APS," Joint Video Experts Team (JVET) of ITU-T SG 16 WP 3 and ISO/IEC JTC 1/SC 29/WG 11 17th Meeting: Brussels, BE, Jan. 7-17, 2020, 3 pages.
JVET-R0338-v3, Wang, Y.K. et al., "AHG9: A summary of proposals on chroma deblocking tc and p offsets signalling," Joint

(56) References Cited

OTHER PUBLICATIONS

Video Experts Team (JVET) of ITU-T SG 16 WP 3 and ISO/IEC JTC 1/SC 29/WG 11 18th Meeting: by teleconference, Apr. 15-24, 2020, 5 pages.
JVET-Q0484-v1, Wan, W., et al., "AHG9: HIs control of chroma QP offset," Joint Video Experts Team (JVET) of ITU-T SG 16 WP 3 and ISO/IEC JTC 1/SC 29/WG 11 17th Meeting: Brussels, BE, Jan. 7-17, 2020, 2 pages.
JVET-P0539-V2, Xu, J., et al., "Non-CE5: A chroma deblocking clean-up," Joint Video Experts Team (JVET) of ITU-T SG 16 WP 3 and ISO/IEC JTC 1/SC 29/WG 11 16th Meeting: Geneva, CH, Oct. 1-11, 2019, 3 p.
JVET-R0077-v1, Xu, J., et al., "Chroma deblocking parameters based on chroma coding tools," Joint Video Experts Team (JVET) of ITU-T SG 16 WP 3 and ISO.IEC JTC 1/SC 29/WG 11 18th Meeting: by teleconference, Apr. 15-24, 2020, 3 pages.
JVET-O0616, Zhang, N., et al., "Non-CE: Various chroma format support in VVC," Joint Video Experts Team (JVET) of ITU-T SG 16 WP 3 and ISO.IEC JTC 1/SC 29/WG 11 15th Meeting: Gothenburg, SE, Jul. 3-12, 2019, 3 pages.
JVET-Q0593-v1, Wang, Y., et al., "AHG9: A summary of proposals on parameter sets cleanups," Joint Video Experts Team (JVET) of ITU-T SG 16 WP 3 and ISO.IEC JTC 1/SC 29/WG 11 17th Meeting: Brussels, BE, Jan. 7-17, 2020, 8 pages.
JVET-Q0291-v2 Document: JVET-Q0291-v2, Sarwer, M., et al., "CE2-related: On maximum palette size of VVC," Joint Video Experts Team (JVET) of ITU-T SG 16 WP 3 and ISO.IEC JTC 1/SC 29/WG 11 17th Meeting: Brussels, BE, Jan. 7-17, 2020, 4 pages.
JVET-R0412-v1 Document: JVET-R0412-v1, Chao, Y., et al., "AHG11: On maximum palette size and palette predictor size under local dual tree," Joint Video Experts Team (JVET) of ITU-T SG 16 WP 3 and ISO.IEC JTC 1/SC 29/WG 11 18th Meeting: by teleconference, Apr. 15-24, 2020, 2 pages.
Yu-Chen Sun, et al., "Analysis of Palette Mode on Versatile Video Coding", Proceedings of 2019 IEEE Conference on Multimedia Information Processing and Retrieval (MIPR), 2019.03.30, IEEE, pp. 455-458, ISBN: 978-1-7281-1198-8, DOI: 10.1109/MIPR.2019.00091.
Wei Pu, et al., "Palette Mode Coding in HEVC Screen Content Coding Extension", IEEE Journal on Emerging and Selected Topics in Circuits and Systems, 2016.11.18, IEEE, vol. 6, No. 4, pp. 420-432, ISSN: 2156-3357, DOI: 10.1109/JETCAS.2016.2605661.
Yu-Chen Sun, et al., "Palette Mode—A New Coding Tool in Screen Content Coding Extensions of HEVC", Proceedings of 2015 IEEE International Conference on Image Processing (ICIP), 2015.09.30, IEEE, pp. 2409-2413, ISBN: 978-1-4799-8339-1, DOI: 10.1109/ICIP.2015.7351234 .Sections 2.1, 3.1, 3.2 and Figures 2, 4.
JVET-L0336-v4, Chao, Y., et al., "CE15-2: Palette mode of HEVC SCC", Joint Video Experts Team (JVET) of ITU-T SG 16 WP 3 and ISO/IEC JTC 1/SC 29/WG 11 12th Meeting: Macao, CN, Oct. 3-12, 2018, 8 pages.
JVET-P0484-v1, Van, L., et al., "Non-CE3: Signalling unification of prediction mode and SCIPU mode," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-R0078, Sun, H., et al., "AHG9: On signaling of deblocking parameters for coding monochrome pictures," Joint Video Experts Team (JVET) of ITU-T SG 16 WP 3 and ISO/IEC JTC 1/SC 29/WG 11 18th Meeting: by teleconference, Apr. 15-24, 2020, 6 pages.
Interdigital et al: "CBG-based (re)-transmission", 3GPP Draft; R1-1718363 9R15 NR WI AI 7333 CBG-Based (Re)Transmission), 3rd Generation Partnership Project (3GPP), Mobile Competence Centre; 650, Route Des Lucioles;F-06921 Sophia-Antipolis Cedex; vol. RAN WG1, No. Prague, CZ; Oct. 9, 2017-Oct. 13, 2017 Oct. 8, 2017(Oct. 8, 2017).
NTT Docomo et al.: "Signalling design for CBG-based (re)-transmission", 3GPP Draft; R1-1718218, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017 Oct. 8, 2017 (Oct. 8, 2017).
International Search Report from International Application No. PCT/CN2021/075408 dated Apr. 25, 2021, 12 pages.
International Search Report from International Application No. PCT/CN2021/075443 dated Apr. 30, 2021, 14 pages.
Non-Final Office Action from U.S. Appl. No. 17/882,375 dated Jan. 4, 2023, 20 pages.
Extended European Search Report from European Application No. 21750205.3 dated May 24, 2023, 13 pages.
Extended European Search Report from European Application No. 21750399.4 dated May 8, 2023, 13 pages.
Non-Final Office Action from U.S. Appl. No. 17/882,359 dated Jan. 19, 2023, 22 pages.
Final Office Action from U.S. Appl. No. 17/882,359 dated May 5, 2023, 23 pages.
Brazilian Notice of Allowance from Brazilian Application No. 112021025871.0 dated Jun. 28, 2020, 6 pages.
Japanese Notice of Reasons for Refusal, Japanese Patent Application No. 2023-126598 dated Aug. 6, 2024, 27 pages.
Japanese Notice of Allowance, Japanese Patent Application No. 2022-547710 dated Aug. 13, 2024, 8 pages.
Japanese Notice of Allowance from Japanese Patent Application No. 2022-547711 dated Feb. 6, 2024, 6 pages.

* cited by examiner previous palette

| Index | G/Y | B/Cb | R/Cr |
|---|---|---|---|
| 0 | G0 | B0 | R0 |
| 1 | G1 | B1 | R1 |
| 2 | G2 | B2 | R2 |
| 3 | G3 | B3 | R3 |
| 4 | G4 | B4 | R4 |
| 5 | G5 | B5 | R5 | current palette

| Pred flag | Index | G/Y | B/Cb | R/Cr |
|---|---|---|---|---|
| 1 | 0 | G0 | B0 | R0 |
| 0 | | | | |
| 1 | 1 | G2 | B2 | R2 |
| 1 | 2 | G3 | B3 | R3 |
| 0 | | | | |
| 0 | | | | |
| | 3 | G3N | B3N | R3N |
| | 4 | G4N | B4N | R4N |

Re-used palette entries (3)

New palette entries (2), signalled

TECHNIQUES FOR MODIFYING QUANTIZATION PARAMETER IN TRANSFORM SKIP MODE

CROSS REFERENCE TO RELATED APPLICATIONS

This application is a continuation of U.S. application Ser. No. 17/528,312 filed on Nov. 17, 2021, which is a continuation of International Patent Application No. PCT/US2020/040028, filed on Jun. 28, 2020, which claims the priority to and benefits of International Patent Application No. PCT/CN2019/093852, filed on Jun. 28, 2019 and International Patent Application No. PCT/CN2019/094593, filed on Jul. 3, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments in which a palette coding mode is used for coding or decoding video.

In one example aspect, a video processing method is disclosed. The method includes performing a conversion between a current video block of a video and a coded representation of the current video block according to a rule, wherein the rule specifies that, due to use of an identity transform coding tool for representing the current video block into the coded representation, a syntax field indicative of a quantization parameter used for decoding the current video block is included such that a value of the quantization parameter is modified according to a rule, wherein the identity transform coding tool allows coefficient values at a transform domain of the current block to be same as values of a residual block of the current video block.

In another example aspect, another video processing method is disclosed. The method includes performing a conversion between a current video block of a video and a coded representation of the current video block, wherein the coded representation conforms to a formatting rule specifying a selective inclusion of a syntax element indicative of use of a coding tool using an identity transform based on quantization parameter included in the coded representation.

In yet another example aspect, another video processing method is disclosed. The method includes performing a conversion between a current video block of a video and a coded representation of the current video block, wherein the coded representation conforms to a formatting rule specifying that a syntax element indicative of an input bit depth of the video is included in the coded representation.

In yet another example aspect, another video processing method is disclosed. The method includes determining, for a conversion between a video block of a video unit of a video and a coded representation of the video, whether to perform a pre-processing operation or a post processing operation on the video block based on a quantization parameter associated with the video block or the video unit; and performing the conversion based on the determining.

In another example aspect, the above-described methods may be implemented by a video decoder apparatus that comprises a processor.

In another example aspect, the above-described methods may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 8 shows examples of pixels involved in filter on/off decision and strong/weak filter selection.

Figure 20:
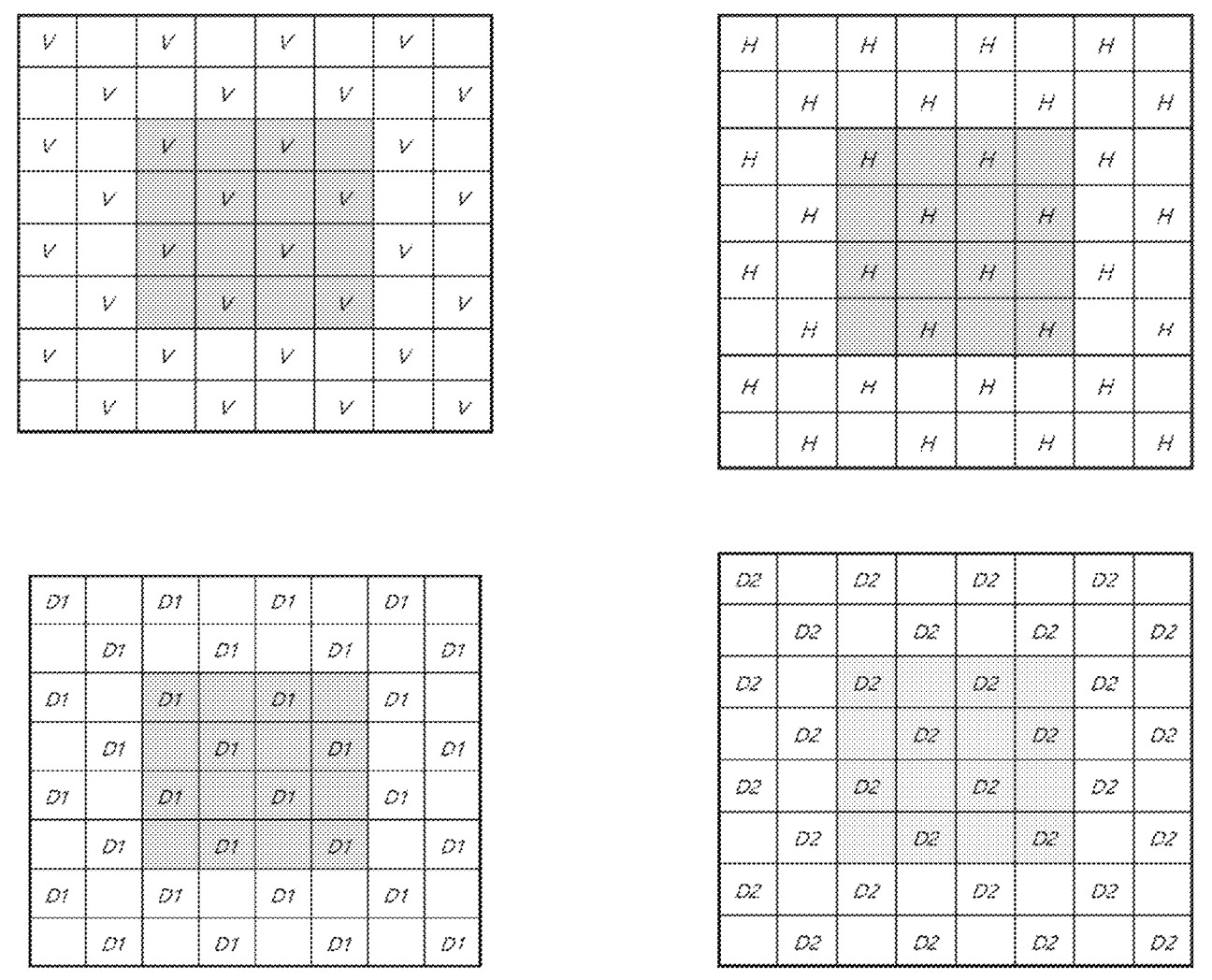

FIG. 20 shows (a) subsampled positions for vertical gradient (top left), (b) subsampled positions for horizontal gradient (top right), (c) subsampled positions for diagonal gradient (bottom left) and (d) subsampled positions for diagonal gradient (bottom right).

DETAILED DESCRIPTION

Figure 1:
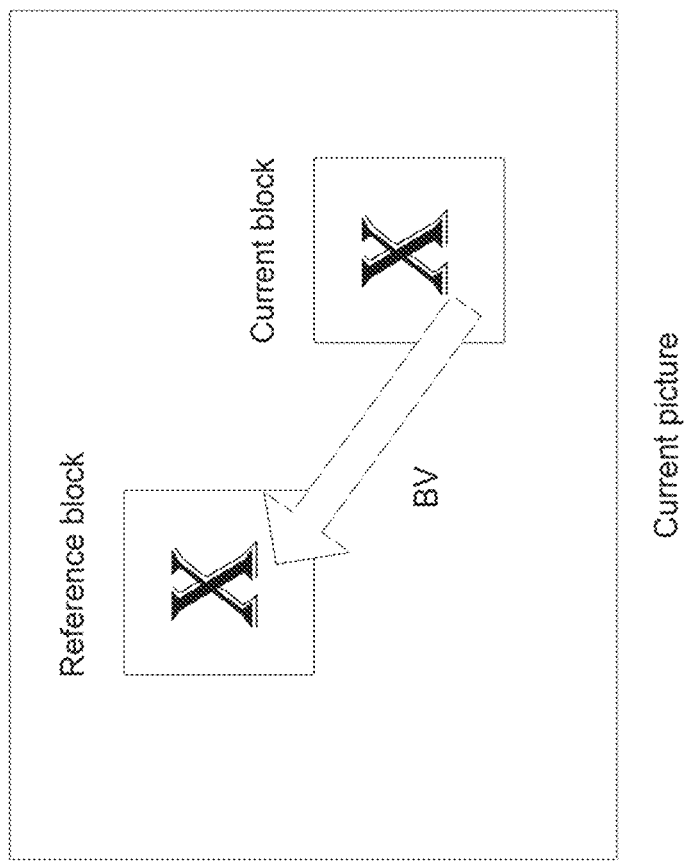
FIG. 1 shows an illustration of Intra block copy.

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1 Brief Summary

This patent document is related to video coding technologies. Specifically, it is related to the palette mode in video coding. It may be applied to the existing video coding standard like HEVC, or the standard (Versatile Video Coding) to be finalized. It may be also applicable to future video coding standards or video codec.

2 Initial Discussion

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM) [3,4]. In April 2018, the Joint Video Expert Team (JVET) between VCEG (Q6/16) and ISO/IEC joint technical committee (JTC)1 SC29/WG11 (MPEG) was created to work on the versatile video coding (VVC) standard targeting at 50% bitrate reduction compared to HEVC.

The latest version of VVC draft, i.e., Versatile Video Coding (Draft 4) could be found at:
phenix.it-sudparis.eu/jvet/doc_end_user/current_document.php?id=5755.

The latest reference software of VVC, named VVC test model (VTM), could be found at:
vcgit.hhi.fraunhofer.de/jvet/VVCSoftware_VTM/tags/VTM-4.0.

2.1 Intra Block Copy

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 1, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The motion vector (MV) is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/three dimensional (3D) video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

FIG. 1 shows an illustration of Intra block copy.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.2 IBC in HEVC Screen Content Coding Extensions

In the screen content coding extensions of HEVC, when a block uses current picture as reference, it should guarantee that the whole reference block is within the available reconstructed area, as indicated in the following spec text:

The variables offsetX and offsetY are derived as follows:

$$\text{offsetX} = (\text{ChromaArrayType}==0)?0:(\text{mvCLX}[0] \& 0x7?2:0) \quad (2\text{-}1)$$

$$\text{offsetY} = (\text{ChromaArrayType}==0)?0:(\text{mvCLX}[1] \& 0x7?2:0) \quad (2\text{-}2)$$

It is a requirement of bitstream conformance that when the reference picture is the current picture, the luma motion vector mvLX shall obey the following constraints:

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)−offsetX, yPb+(mvLX[1]>>2)−offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mvLX[1]>>2)+nPbH−1+offsetY) as inputs, the output shall be equal to TRUE.

One or both the following conditions shall be true:
The value of (mvLX[0]>>2)+nPbW+xB1+offsetX is less than or equal to 0.
The value of (mvLX[1]>>2)+nPbH+yB1+offsetY is less than or equal to 0.

The following condition shall be true:

$$(xPb+(mvLX[0]>>2)+nPbSw-1+offsetX)/CtbSizeY- \\ xCurr/CtbSizeY<=yCurr/CtbSizeY-(yPb+(mvLX \\ [1]>>2)+nPbSh-1+offsetY)/CtbSizeY \quad (2-3)$$

Thus, the case that the reference block overlaps with the current block or the reference block is outside of the picture will not happen. There is no need to pad the reference or prediction block.

2.3 IBC in VVC Test Model

In the current VVC test model, i.e. VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions depicted in A1, B1, B0, A0 and B2. The order of derivation is A1, B1, B0, A0 and B2. Position B2 is considered only when any PU of position A1, B1, B0, A0 is not available (e.g. because it belongs to another slice or tile) or is not coded with IBC mode. After candidate at position A1 is added, the insertion of the remaining candidates is subject to a redundancy check which ensures that candidates with same motion information are excluded from the list so that coding efficiency is improved.

After insertion of the spatial candidates, if the IBC merge list size is still smaller than the maximum IBC merge list size, IBC candidates from HMVP table may be inserted. A redundancy check is performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

Figure 2:
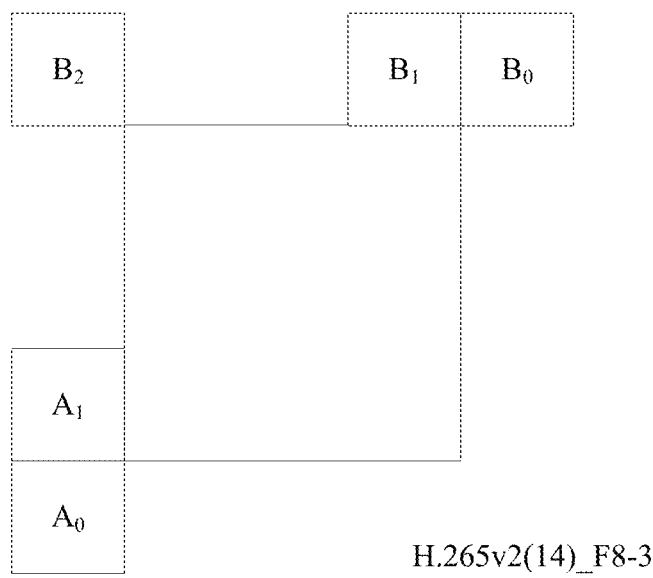
FIG. 2 shows an example of spatial neighboring candidates.

JVET-N0843 is adopted to the VVC. In the JVET-N0843. the BV predictors for merge mode and adaptive motion vector prediction (AMVP) mode in IBC will share a common predictor list, which consist of the following elements:
2 spatial neighboring positions (A1, B1 as in FIG. 2)
5 HMVP entries
Zero vectors by default For merge mode, up to first 6 entries of this list will be used; for AMVP mode, the first 2 entries of this list will be used. And the list conforms with the shared merge list region (SMR) requirement (shared the same list within the SMR).

In addition to the above-mentioned BV predictor candidate list, JVET-N0843 also proposed to simplify the pruning operations between HMVP candidates and the existing merge candidates (A1, B1). In the simplification there will be up to 2 pruning operations since it only compares the first HMVP candidate with spatial merge candidate(s).

In the latest VVC and VTM5, it is proposed to explicitly use syntax constraint for disabling 128×128 IBC mode on top of the current bitstream constraint in the previous VTM and VVC versions, which makes presence of IBC flag dependent on CU size<128×128.

2.3.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates
  Check $A_0$, $A_1$ until an available candidate is found.
  Check $B_0$, $B_1$, $B_2$ until an available candidate is found.
Step 2: Insertion of HMVP candidates
Step 3: Insertion of zero candidates After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.3.3 Chroma IBC Mode

In the current VVC, the motion compensation in the chroma IBC mode is performed at sub block level. The chroma block will be partitioned into several sub blocks. Each sub block determines whether the corresponding luma block has a block vector and the validity if it is present. There is encoder constrain in the current VTM, where the chroma IBC mode will be tested if all sub blocks in the current chroma CU have valid luma block vectors. For example, on a luma, blue projection, red projection (YUV) 420 video, the chroma block is N×M and then the collocated luma region is 2N×2M. The sub block size of a chroma block is 2×2. There are several steps to perform the chroma my derivation then the block copy process.

1) The chroma block will be first partitioned into (N>>1) *(M>>1) sub blocks.
2) Each sub block with a top left sample coordinated at (x,y) fetches the corresponding luma block covering the same top-left sample which is coordinated at (2x, 2y).
3) The encoder checks the block vector (bv) of the fetched luma block. If one of the following conditions is satisfied, the by is considered as invalid.
   a. A by of the corresponding luma block is not existing.
   b. The prediction block identified by a by is not reconstructed yet.
   c. The prediction block identified by a by is partially or fully overlapped with the current block.
4) The chroma motion vector of a sub block is set to the motion vector of the corresponding luma sub block.

The IBC mode is allowed at the encoder when all sub blocks find a valid by.

The decoding process of an IBC block is listed below. The part related to chroma my derivation in an IBC mode is highlighted as grey.

8.6.1 General Decoding Process for Coding Units Coded in IBC Prediction

Inputs to this process are:
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples, a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.7.1 is invoked with the luma location (xCb, yCb), the width of the current coding block in luma samples cbWidth and the height of the current coding block in luma samples cbHeight, and the variable treeType as inputs.

The decoding process for coding units coded in IBC prediction mode consists of the following ordered steps:
1. The motion vector components of the current coding unit are derived as follows:
   1. If treeType is equal to SINGLE_TREE or DUAL_TREE_LUMA, the following applies:
      The derivation process for motion vector components as specified in clause 8.6.2.1 is invoked with the luma coding block location (xCb, yCb), the luma coding block width cbWidth and the luma coding block height cbHeight as inputs, and the luma motion vector mvL[0][0] as output.
      When treeType is equal to SINGLE_TREE, the derivation process for chroma motion vectors in clause 8.6.2.4 is invoked with luma motion vector mvL[0][0] as input, and chroma motion vector mvC[0][0] as output.
      The number of luma coding subblocks in horizontal direction numSbX and in vertical direction numSbY are both set equal to 1.
   1. Otherwise, if treeType is equal to DUAL_TREE_CHROMA, the following applies:
      The number of luma coding subblocks in horizontal direction numSbX and in vertical direction numSbY are derived as follows:

numSbX=(cbWidth>>2)  (8-886)

numSbY=(cbHeight>>2)  (8-887)

The chroma motion vectors mvC[xSbIdx][ySbIdx] are derived as follows for xSbIdx=0 . . . numSbX−1, ySbIdx=0 . . . numSbY−1:
      The luma motion vector mvL[xSbIdx][ySbIdx] is derived as follows:
      The location (xCuY, yCuY) of the collocated luma coding unit is derived as follows:

xCuY=$xCb$+xSbIdx*4  (8-888)

yCuY=$yCb$+ySbIdx*4  (8-889)

If CuPredMode[xCuY][yCuY] is equal to MODE_INTRA, the following applies.

$mvL$[xSbIdx][ySbIdx][0]=0  (8-890)

$mvL$[xSbIdx][ySbIdx][1]=0  (8-891)

predFlagL0[xSbIdx][ySbIdx]=0  (8-892)

predFlagL1[xSbIdx][ySbIdx]=0  (8-893)

Otherwise (CuPredMode[xCuY][yCuY] is equal to MODE_IBC), the following applies:

$mvL$[xSbIdx][ySbIdx][0]=$MvL0$[xCuY][yCuY][0]  (8-894)

$mvL$[xSbIdx][ySbIdx][1]=$MvL0$[xCuY][yCuY][1]  (8-895)

predFlagL0[xSbIdx][ySbIdx]=1  (8-896)

predFlagL1[xSbIdx][ySbIdx]=0  (8-897)

The derivation process for chroma motion vectors in clause 8.6.2.9 is invoked with mvL[xSbIdx][ySbIdx] as inputs, and mvC[xSbIdx][ySbIdx] as output.
      It is a requirement of bitstream conformance that the chroma motion vector mvC[xSbIdx][ySbIdx] shall obey the following constraints:
      When the derivation process for block availability as specified in clause 6.4.X [Ed. (BB): Neighbouring blocks availability checking process tbd] is invoked with the current chroma location (xCurr, yCurr) set equal to (xCb/SubWidthC, yCb/SubHeightC) and the neighbouring chroma location (xCb/SubWidthC+(mvC[xSbIdx][ySbIdx][0]>>5), yCb/SubHeightC+(mvC[xSbIdx][ySbIdx][1]>>5)) as inputs, the output shall be equal to TRUE.
      When the derivation process for block availability as specified in clause 6.4.X [Ed. (BB): Neighbouring blocks availability checking process tbd] is invoked with the current chroma location (xCurr, yCurr) set equal to (xCb/SubWidthC, yCb/SubHeightC) and the neighbouring chroma location (xCb/SubWidthC+(mvC[xSbIdx][ySbIdx][0]>>5)+cbWidth/SubWidthC−1, yCb/SubHeightC+(mvC[xSbIdx][ySbIdx][1]>>5)+cbHeight/SubHeightC−1) as inputs, the output shall be equal to TRUE.
      One or both of the following conditions shall be true:
      (mvC[xSbIdx][ySbIdx][0]>>5)+xSbIdx*2+2 is less than or equal to 0.
      (mvC[xSbIdx][ySbIdx][1]>>5)+ySbIdx*2+2 is less than or equal to 0.
2. The prediction samples of the current coding unit are derived as follows:
   If treeType is equal to SINGLE_TREE or DUAL_TREE_LUMA, the prediction samples of the current coding unit are derived as follows:
   The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the luma motion vectors mvL[xSbIdx][ySbIdx] with xSbIdx=0 . . . numSbX−1, and ySbIdx=0 . . . numSbY−1, the variable cIdx set equal to 0 as inputs, and the ibc prediction samples (predSamples) that are an (cbWidth)×(cbHeight) array predSamples$_L$ of prediction luma samples as outputs.
   Otherwise if treeType is equal to SINGLE_TREE or DUAL_TREE_CHROMA, the prediction samples of the current coding unit are derived as follows:
   The decoding process ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0 . . . numSbX−1, and ySbIdx=0 . . . numSbY−1 and the variable cIdx set equal to 1 as inputs, and the ibc prediction samples (predSamples) that are an (cbWidth/2)×(cbHeight/2) array predSamples$_{Cb}$ of prediction chroma samples for the chroma components Cb as outputs.

The decoding process for ibc blocks as specified in clause 8.6.3.1 is invoked with the luma coding block location (xCb, yCb), the luma coding block width cbWidth and the luma coding block height cbHeight, the number of luma coding subblocks in horizontal direction numSbX and in vertical direction numSbY, the chroma motion vectors mvC[xSbIdx][ySbIdx] with xSbIdx=0 . . . numSbX−1, and ySbIdx=0 . . . numSbY−1 and the variable cIdx set equal to 2 as inputs, and the ibc prediction samples (predSamples) that are an (cbWidth/2)×(cbHeight/2) array predSamples$_{Cr}$ of prediction chroma samples for the chroma components Cr as outputs.

3. The variables NumSbX[xCb][yCb] and NumSbY[xCb][yCb] are set equal to numSbX and numSbY, respectively.

4. The residual samples of the current coding unit are derived as follows:

When treeType is equal to SINGLE_TREE or treeType is equal to DUAL_TREE_LUMA, the decoding process for the residual signal of coding blocks coded in inter prediction mode as specified in clause 8.5.8 is invoked with the location (xTb0, yTb0) set equal to the luma location (xCb, yCb), the width nTbW set equal to the luma coding block width cbWidth, the height nTbH set equal to the luma coding block height cbHeight and the variable cIdxset equal to 0 as inputs, and the array resSamples$_L$ as output.

When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 1 as inputs, and the array resSamples$_{Cb}$ as output.

When treeType is equal to SINGLE_TREE or treeType is equal to DUAL_TREE_CHROMA, the decoding process for the residual signal of coding blocks coded in inter prediction mode as specified in clause 8.5.8 is invoked with the location (xTb0, yTb0) set equal to the chroma location (xCb/2, yCb/2), the width nTbW set equal to the chroma coding block width cbWidth/2, the height nTbH set equal to the chroma coding block height cbHeight/2 and the variable cIdxset equal to 2 as inputs, and the array resSamples$_{Cr}$ as output.

5. The reconstructed samples of the current coding unit are derived as follows:

When treeType is equal to SINGLE_TREE or treeType is equal to DUAL_TREE_LUMA, the picture reconstruction process for a colour component as specified in clause 8.7.5 is invoked with the block location (xB, yB) set equal to (xCb, yCb), the block width bWidth set equal to cbWidth, the block height bHeight set equal to cbHeight, the variable cIdx set equal to 0, the (cbWidth)×(cbHeight) array predSamples set equal to predSamples$_L$ and the (cbWidth)×(cbHeight) array resSamples set equal to resSamples$_L$ as inputs, and the output is a modified reconstructed picture before in-loop filtering.

When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 1, the (cbWidth/2)×(cbHeight/2) array predSamples set equal to predSamples$_{Cb}$ and the (cbWidth/2)×(cbHeight/2) array resSamples set equal to resSamples$_{Cb}$ as inputs, and the output is a modified reconstructed picture before in-loop filtering.

When treeType is equal to SINGLE_TREE or treeType is equal to DUAL_TREE_CHROMA, the picture reconstruction process for a colour component as specified in clause 8.7.5 is invoked with the block location (xB, yB) set equal to (xCb/2, yCb/2), the block width bWidth set equal to cbWidth/2, the block height bHeight set equal to cbHeight/2, the variable cIdx set equal to 2, the (cbWidth/2)×(cbHeight/2) array predSamples set equal to predSamples$_{Cr}$ and the (cbWidth/2)×(cbHeight/2) array resSamples set equal to resSamples$_{Cr}$ as inputs, and the output is a modified reconstructed picture before in-loop filtering.

2.4 Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AMVP mode) for the current CU, the MVDs of the current CU can be adaptively selected as follows:

Normal AMVP mode: quarter-luma-sample, integer-luma-sample or four-luma-sample.

Affine AMVP mode: quarter-luma-sample, integer-luma-sample or 1/16 luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-luma-sample MVD precision is used for the CU. If the first flag is 0, no further signaling is needed and quarter-luma-sample MVD precision is used for the current CU. Otherwise, a second flag is signalled to indicate whether integer-luma-sample or four-luma-sample MVD precision is used for normal AMVP CU. The same second flag is used to indicate whether integer-luma-sample or 1/16 luma-sample MVD precision is used for affine AMVP CU. In order to ensure the reconstructed MV has the intended precision (quarter-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using rate distortion (RD) check. To avoid always performing CU-level RD check three times for each MVD resolution, in VTM4, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. For affine AMVP mode, if affine inter mode is not selected after checking rate-distortion costs of affine merge/skip mode, merge/skip mode, quarter-luma sample MVD precision normal AMVP mode and quarter-luma sample MVD precision affine AMVP mode, then 1/16 luma-sample MV precision and 1-pel MV precision affine inter modes are not checked. Furthermore, affine parameters obtained in quarter-luma-sample MV precision affine inter mode is used as starting search point in 1/16 luma-sample and quarter-luma-sample MV precision affine inter modes.

2.5 Palette Mode in HEVC Screen Content Coding Extensions (HEVC-SCC)

Figure 3:
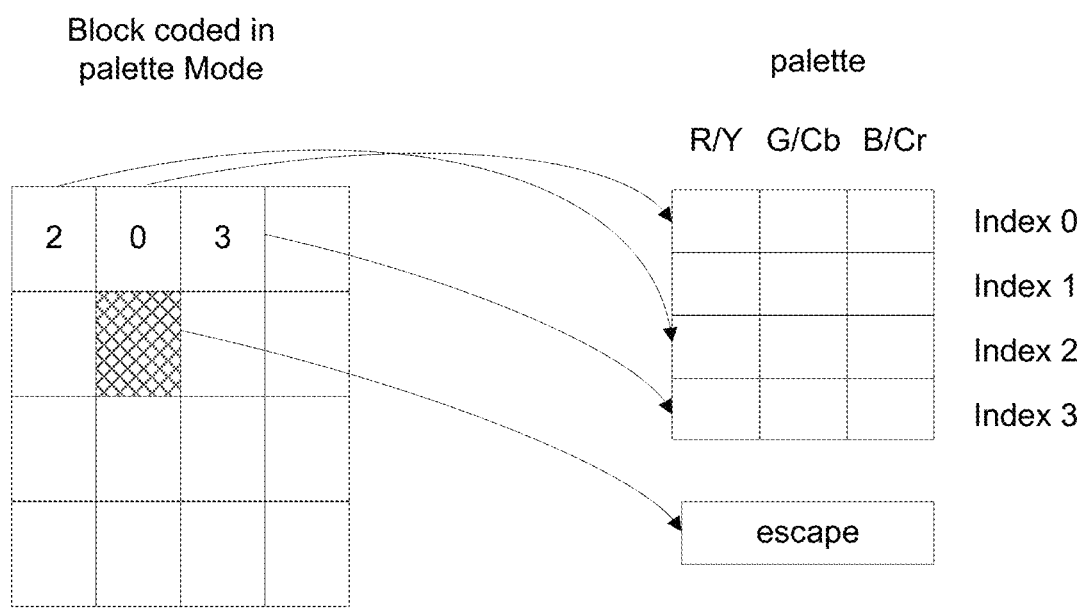
FIG. 3 shows an example of a block coded in palette mode.

The basic idea behind a palette mode is that the samples in the CU are represented by a small set of representative colour values. This set is referred to as the palette. It is also possible to indicate a sample that is outside the palette by signalling an escape symbol followed by (possibly quantized) component values. This is illustrated in FIG. 3.

In the palette mode in HEVC-SCC, a predictive way is used to code the palette and index map.

2.5.1 Coding of the Palette Entries

For coding of the palette entries, a palette predictor is maintained. The maximum size of the palette as well as the palette predictor is signalled in the SPS. In HEVC-SCC, a palette_predictor_initializer_present_flag is introduced in the picture parameter set (PPS). When this flag is 1, entries for initializing the palette predictor are signalled in the bitstream. The palette predictor is initialized at the beginning of each CTU row, each slice and each tile. Depending on the value of the palette_predictor_initializer_present_flag, the palette predictor is reset to 0 or initialized using the palette predictor initializer entries signalled in the PPS. In HEVC-SCC, a palette predictor initializer of size 0 was enabled to allow explicit disabling of the palette predictor initialization at the PPS level.

Figure 4:
FIG. 4 shows an example use of palette predictor to signal palette entries.
Figure 4:

For each entry in the palette predictor, a reuse flag is signalled to indicate whether it is part of the current palette. This is illustrated in FIG. 4. The reuse flags are sent using run-length coding of zeros. After this, the number of new palette entries are signalled using exponential Golomb code of order 0. Finally, the component values for the new palette entries are signalled.

2.5.2 Coding of Palette Indices

Figure 5:
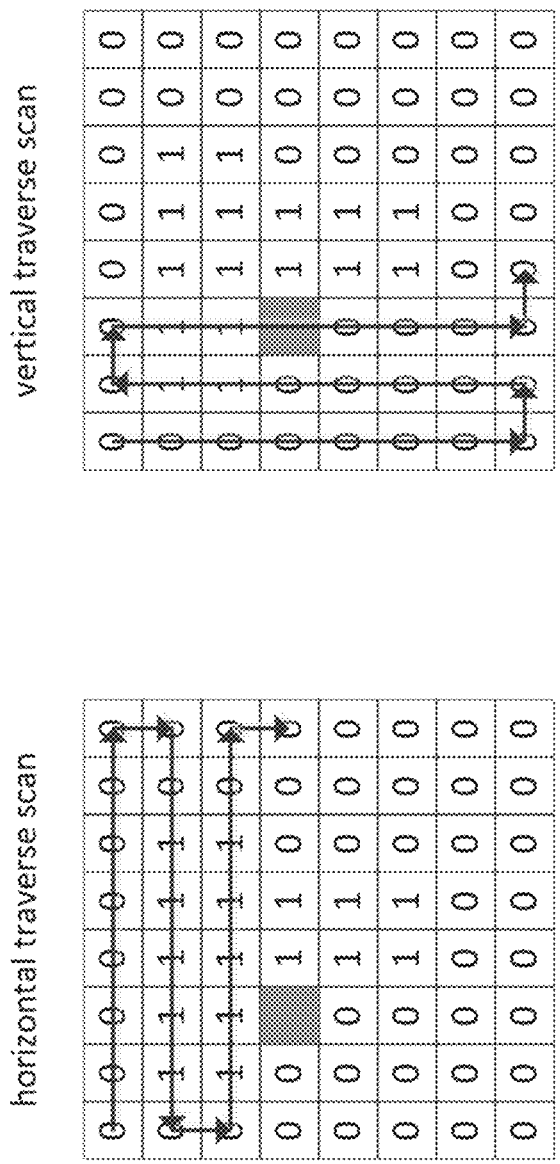
FIG. 5 shows examples of horizontal and vertical traverse scans.

The palette indices are coded using horizontal and vertical traverse scans as shown in FIG. 5. The scan order is explicitly signalled in the bitstream using the palette_transpose_flag. For the rest of the subsection it is assumed that the scan is horizontal.

Figure 6:
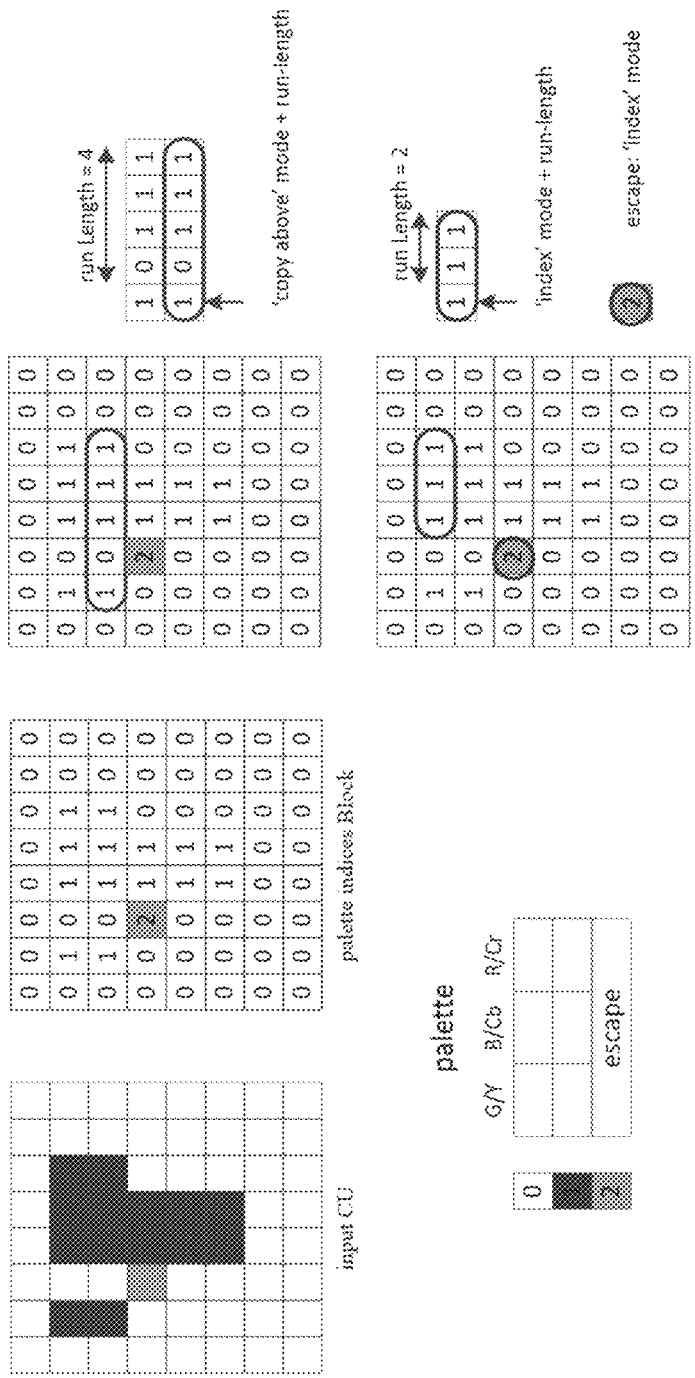
FIG. 6 shows an example of coding of palette indices.

The palette indices are coded using two main palette sample modes: 'INDEX' and 'COPY_ABOVE'. As explained previously, the escape symbol is also signalled as an 'INDEX' mode and assigned an index equal to the maximum palette size. The mode is signalled using a flag except for the top row or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number of subsequent samples that are also coded using the same mode. When escape symbol is part of the run in 'INDEX' or 'COPY_ABOVE' mode, the escape component values are signalled for each escape symbol. The coding of palette indices is illustrated in FIG. 6.

This syntax order is accomplished as follows. First the number of index values for the CU is signaled. This is followed by signaling of the actual index values for the entire CU using truncated binary coding. Both the number of indices as well as the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

2.6 Coefficients Coding in Transform Skip Mode

In JVET-M0464 and JVET-N0280, several modifications are proposed on the coefficients coding in transform skip (TS) mode in order to adapt the residual coding to the statistics and signal characteristics of the transform skip levels.

The proposed modifications are listed as follows.

No last significant scanning position: Since the residual signal reflects the spatial residual after the prediction and no energy compaction by transform is performed for TS, the higher probability for trailing zeros or insignificant levels at the bottom right corner of the transform block is not given anymore. Thus, last significant scanning position signalling is omitted in this case.

Subblock CBFs: The absence of the last significant scanning position signalling requires the subblock CBF signalling with coded_sub_block_flag for TS to be modified as follows:

Due to quantization, the aforementioned sequence of insignificance may still occur locally inside a transform block. Thus, the last significant scanning position is removed as described before and coded_sub_block_flag is coded for all sub-blocks except the case that all coding groups (CGs) except the last have zero coefficients, thus, no need to code the coded_sub_block_flag for the last CG.

The coded_sub_block_flag for the subblock covering the DC frequency position (top-left subblock) presents a special case. In VVC Draft 3, the coded_sub_block_flag for this subblock is never signaled and always inferred to be equal to 1. When the last significant scanning position is located in another subblock, it means that there is at least one significant level outside the DC subblock. Consequently, the DC subblock may contain only zero/non-significant levels although the coded_sub_block_flag for this subblock is inferred to be equal to 1. With the absence of the last scanning position information in TS, the coded_sub_block_flag for each subblock is signaled. This also includes the coded_sub_block_flag for the DC subblock except when all other coded_sub_block_flag syntax elements are already equal to 0. In this case, the DC coded_sub_block_flag is inferred to be equal to 1 (inferDcSbCbf=1). Since there has to be at least one significant level in this DC subblock, the sig_coeff_flag syntax element for the first position at (0,0) is not signaled and derived to be equal to 1 (inferSbDcSigCoeffFlag=1) instead if all other sig_coeff_flag syntax elements in this DC subblock are equal to 0.

The context modeling for coded_sub_block_flag is changed. The context model index is calculated as the sum of the coded_sub_block_flag to the left and the coded_sub_block_flag above the current subblock instead of and a logical disjunction of both.

sig_coeff_flag context modelling: The local template in sig_coeff_flag context modeling is modified to only include the neighbor to the left ($NB_0$) and the neighbor above ($NB_1$) the current scanning position. The context model offset is just the number of significant neighboring positions sig_coeff_flag[$NB_0$]+sig_coeff_flag[$NB_1$]. Hence, the selection of different context sets depending on the diagonal d within the current transform block is removed. This results in three context models and a single context model set for coding the sig_coeff_flag flag.

abs_level_gt1_flag and par_level_flag context modelling: a single context model is employed for abs_level_gt1_flag and par_level_flag.

abs_remainder coding: Although the empirical distribution of the transform skip residual absolute levels typically still fits a Laplacian or a Geometrical distribution, there exist larger instationarities than for transform coefficient absolute levels. Particularly, the variance within a window of consecutive realization is higher for the residual absolute levels. This motivates the following modifications of the abs_remainder syntax binarization and context modelling:

Using a higher cutoff value in the binarization, i.e., the transition point from the coding with sig_coeff_flag, abs_level_gt1_flag, par_level_flag, and abs_level_gt3_flag to the Rice codes for abs_remainder, and dedicated context models for each bin position yields higher compression efficiency. Increasing the cutoff will result in more "greater than X" flags, e.g. introducing abs_level_gt5_flag, abs_level_gt7_flag, and so on until a cutoff is reached. The cutoff itself is fixed to 5 (numGtFlags=5).

The template for the rice parameter derivation is modified, i.e., only the neighbor to the left and the neighbor above the current scanning position are considered similar to the local template for sig_coeff_flag context modeling.

coeff_sign_flag context modelling: Due to the instationarities inside the sequence of signs and the fact that the prediction residual is often biased, the signs can be coded using context models, even when the global empirical distribution is almost uniformly distributed. A single dedicated context model is used for the coding of the signs and the sign is parsed after sig_coeff_flag to keep all context coded bins together.

2.7 Quantized Residual Block Differential Pulse-Code Modulation (QR-BDPCM)

In JVET-M0413, a quantized residual block differential pulse-code modulation (QR-BDPCM) is proposed to code screen contents efficiently.

The prediction directions used in QR-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i = 0, \ 0 \leq j \leq (N-1) \\ Q(r_{i,j}) - Q(r_{(i-1),j}), & 1 \leq i \leq (M-1), \ 0 \leq j \leq (N-1) \end{cases}.$$

For horizontal prediction, similar rules apply, and the residual quantized samples are obtained by $$\tilde{r}_{i,j} = \begin{cases} Q(r_{i,j}), & 0 \leq i \leq (M-1), \ j = 0 \\ Q(r_{i,j}) - Q(r_{i,(j-1)}), & 0 \leq i \leq (M-1), \ 1 \leq j \leq (N-1) \end{cases}.$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $Q(r_{i,j}) = \Sigma_{k=0}^{i} \tilde{r}_{k,j}$, $0 \leq i \leq (M-1)$, $0 \leq j \leq (N-1)$.

For horizontal case, $Q(r_{i,j}) = \Sigma_{k=0}^{j} \tilde{r}_{i,k}$, $0 \leq i \leq (M-1)$, $0 \leq j \leq (N-1)$.

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

The draft text changes of QR-BDPCM are shown as follows.

7.3.6.5 Coding Unit Syntax

| | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 && | |
|       tile_group_type != I ) | |
|       pred_mode_flag | ae(v) |
|     if( ( ( tile_group_type == I && cu_skip_flag[ x0 ][ | |
|       y0 ] ==0 ) \|\| ( tile_group_type != I && | |
|       CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] == MODE_INTRA ) { | |
|     if( pred_mode_flag == MODE_INTRA && ( | |
|       cIdx == 0 ) && ( cbWidth <= 32 ) && ( CbHeight <= | |
|       32 )) { | |
|       bdpcm_flag[ x0 ][ y0 ] | ae(v) |
|       if( bdpcm_flag[ x0 ][ y0 ] ) { | |
|         bdpcm_dir_flag[ x0 ][ y0 ] | ae(v) |
|       } | |
|       else { | |
|     if( sps_pcm_enabled_flag && | |
|       cbWidth >= MinIpcmCbSizeY && cbWidth <= | |
|       MaxIpcmCbSizeY && cbHeight >= MinIpcmCbSizeY | |
|       && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType == SINGLE_TREE \|\| treeType == | |
|       DUAL_TREE_LUMA ) { | |
|         if( ( y0% CtbSizeY ) > 0 ) | |
|           intra_luma_ref_idx[ x0 ][ y0 ] | ae(v) |
|       if (intra_luma_ref_idx[ x0 ][ y0 ] == 0 && | |
|       ( cbWidth <= MaxTbSizeY \|\| cbHeight <= | |
|       MaxTbSizeY ) && ( cbWidth * cbHeight > | |
|       MinTbSizeY * MinTbSizeY )) | |
|         intra_subpartitions_mode_flag[ x0 ][ y0 ] | ae(v) |
|       if( intra_subpartitions_mode_flag[ x0 ][ y0 ] == 1 | |
|       && cbWidth <= MaxTbSizeY && cbHeight <= | |
|       MaxTbSizeY ) | |
|         intra_subpartitions_split_flag[ x0 ][ y0 ] | ae(v) |
|       if( intra_luma_ref_idx[ x0 ][ y0 ] == 0 && | |
|       intra_subpartitions_mode_flag[ x0 ][ y0 ] == 0 ) | |
|         intra_luma_mpm_flag[ x0 ][ y0 ] | ae(v) |
|       if( intra_luma_mpm_flag[ x0 ][ y0 ] ) | |
|         intra_luma_mpm_idx[ x0 ][ y0 ] | ae(v) |
|       else | |
|         intra_luma_mpm_remainder[ x0 ][ y0 ] | ae(v) |
|       } | |
|     } | |
|     if( treeType == SINGLE_TREE \|\| treeType == | |
|     DUAL_TREE_CHROMA ) | |
|       intra_chroma_pred_mode[ x0 ][ y0 ] | ae(v) |
|   } | |
|   } else if( treeType != DUAL_TREE_CHROMA ) { /* | |
| MODE_INTER or MODE_IBC */ | |
| ... | |
| } | | bdpcm_flag[x0][y0] equal to 1 specifies that a bdpcm_dir_flag is present in the coding unit including the luma coding block at the location (x0, y0)

bdpcm_dir_flag[x0][y0] equal to 0 specifies that the prediction direction to be used in a bdpcm block is horizontal, otherwise it is vertical.

2.8 Partition Structure

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four prediction units (Pus) according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

Figure 7:
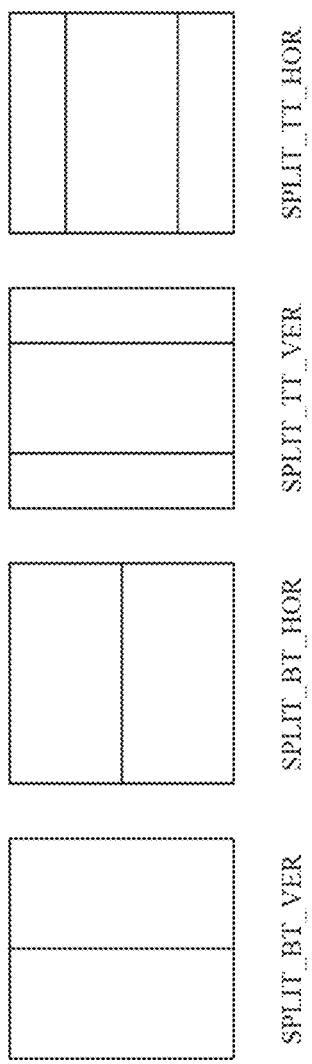
FIG. 7 shows examples of Multi-type tree splitting modes.

In VVC, a quadtree with nested multi-type tree using binary and ternary splits segmentation structure replaces the concepts of multiple partition unit types, i.e. it removes the separation of the CU, PU and transform unit (TU) concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. As shown in FIG. 7, there are four splitting types in multi-type tree structure, vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when maximum supported transform length is smaller than the width or height of the colour component of the CU. In addition, luma and chroma components have separate partition structures on I tiles. Moreover, JVET-K0353 and JVET-K0354 propose to signal a flag to determine whether to use the separate partition structures at CTU/CU level.

2.9 Deblocking Scheme in VTM-4.0

Figure 8:
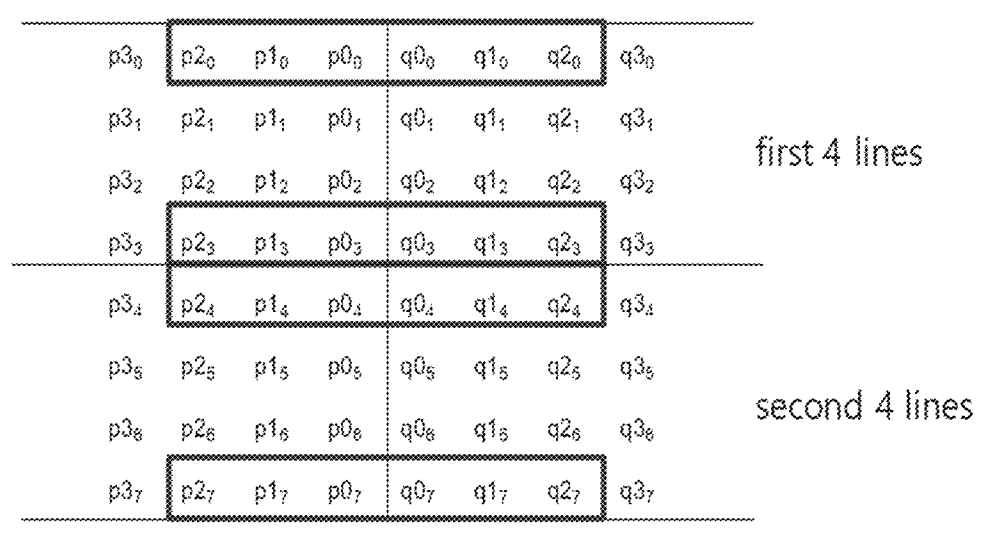

Note that, in the following descriptions, pNM denotes the left-side N-th sample in the M-th row relative to the vertical edge or the top-side N-th sample in the M-th column relative to the horizontal edge, qNM denotes the right-side N-th sample in the M-th row relative to the vertical edge or the bottom-side N-th sample in the M-th column relative to the horizontal edge. An example of pNM and qNM is depicted in FIG. 8.

Note that, in the following descriptions, pN denotes the left-side N-th sample in a row relative to the vertical edge or the top-side N-th sample in a column relative to the horizontal edge, qN denotes the right-side N-th sample in a row relative to the vertical edge or the bottom-side N-th sample in a column relative to the horizontal edge.

Filter on/off decision is done for four lines as a unit. FIG. 8 illustrates the pixels involving in filter on/off decision. The 6 pixels in the two red boxes for the first four lines are used to determine filter on/off for 4 lines. The 6 pixels in two red boxes for the second 4 lines are used to determine filter on/off for the second four lines.

In the current VTM, i.e., VTM-4.0, the deblocking scheme described in JVET-M0471 is used. The vertical edges in a picture are filtered first. Then the horizontal edges in a picture are filtered with samples modified by the vertical edge filtering process as input. The vertical and horizontal edges in the coding tree blocks (CTBs) of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

2.9.1 Boundary Decision

Filtering is applied to 8×8 block boundaries. In addition, it must be a transform block boundary or a coding subblock boundary (e.g., due to usage of Affine motion prediction, advance temporal motion vector prediction (ATMVP)). For those which are not such boundaries, filter is disabled.

2.9.2 Boundary Strength Calculation

For a transform block boundary/coding subblock boundary, if it is located in the 8×8 grid, it may be filtered and the setting of bS[xDi][yDj] (wherein [xDi][yDj] denotes the coordinate) for this edge is defined as follows:

If the sample $p_0$ or $q_0$ is in the coding block of a coding unit coded with intra prediction mode, $bS[xD_i][yD_j]$ is set equal to 2.

Otherwise, if the block edge is also a transform block edge and the sample $p_0$ or $q_0$ is in a transform block which contains one or more non-zero transform coefficient levels, $bS[xD_i][yD_j]$ is set equal to 1.

Otherwise, if the prediction mode of the coding subblock containing the sample $p_0$ is different from the prediction mode of the coding subblock containing the sample $q_0$, $bS[xD_i][yD_j]$ is set equal to 1.

Otherwise, if one or more of the following conditions are true, $bS[xD_i][yD_j]$ is set equal to 1:

The coding subblock containing the sample $p_0$ and the coding subblock containing the sample $q_0$ are both coded in IBC prediction mode, and the absolute difference between the horizontal or vertical component of the motion vectors used in the prediction of the two coding subblocks is greater than or equal to 4 in units of quarter luma samples.

For the prediction of the coding subblock containing the sample $p_0$ different reference pictures or a different number of motion vectors are used than for the prediction of the coding subblock containing the sample $q_0$.

NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.

NOTE 2—The number of motion vectors that are used for the prediction of a coding subblock with top-left sample covering (xSb, ySb), is equal to PredFlagL0[xSb][ySb]+PredFlagL1[xSb][ySb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 4 in units of quarter luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 4 in units of quarter luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 4 in units of quarter luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 4 in units of quarter luma samples.

Otherwise, the variable $bS[xD_i][yD_j]$ is set equal to 0.

Table 1 and Table 2 summarize the boundary strength (BS) calculation rules.

TABLE 1

| | Boundary strength (when SPS IBC is disabled) | | | |
|---|---|---|---|---|
| Priority | Conditions | Y | U | V |
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |

TABLE 1-continued

Boundary strength (when SPS IBC is disabled)

| Priority | Conditions | Y | U | V |
|---|---|---|---|---|
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

Boundary strength (when SPS IBC is enabled)

| Priority | Conditions | Y | U | V |
|---|---|---|---|---|
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

2.9.3 Deblocking Decision for Luma Component

The deblocking decision process is described in this sub-section.

Wider-stronger luma filter is filters are used only if all of the Condition1, Condition2 and Condition 3 are TRUE.

The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSidePisLargeBlk=((edge type is vertical and $p_0$ belongs to CU with width>=32)||(edge type is horizontal and $p_0$ belongs to CU with height>=32))?TRUE:FALSE bSideQisLargeBlk=((edge type is vertical and $q_0$ belongs to CU with width>=32)||(edge type is horizontal and $q_0$ belongs to CU with height>=32))?TRUE:FALSE Based on bSidePisLargeBlk and bSideQisLargeBlk, the condition 1 is defined as follows.

Condition1=(bSidePisLargeBlk||bSidePisLargeBlk) ?TRUE:FALSE

Next, if Condition 1 is true, the condition 2 will be further checked. First, the following variables are derived:
dp0, dp3, dq0, dq3 are first derived as in HEVC
if (p side is greater than or equal to 32)

$dp0=(dp0+Abs(p5_0-2*p4_0+p3_0)+1)>>1$ $dp3=(dp3+Abs(p5_3-2*p4_3+p3_3)+1)>>1$ if (q side is greater than or equal to 32)

$dq0=(dq0+Abs(q5_0-2*q4_0+q3_0)+1)>>1$ $dq3=(dq3+Abs(q5_3-2*q4_3+q3_3)+1)>>1$

Condition2=(d<β)?TRUE:FALSE where d=dp0+dq0+dp3+dq3, as shown in section 2.2.4.

If Condition1 and Condition2 are valid, whether any of the blocks uses sub-blocks is further checked:

```
If (bSidePisLargeBlk)
    If (mode block P == SUBBLOCKMODE)
        Sp =5
    else
        Sp =7
else
    Sp = 3
If (bSideQisLargeBlk)
    If (mode block Q == SUBBLOCKMODE)
        Sq =5
    else
        Sq =7
else
    Sq = 3
```

Finally, if both the Condition 1 and Condition 2 are valid, the proposed deblocking method will check the condition 3 (the large block strong filter condition), which is defined as follows.

In the Condition3 StrongFilterCondition, the following variables are derived:

```
dpq is derived as in HEVC.
sp₃ = Abs( p₃ - p₀ ), derived as in HEVC
if (p side is greater than or equal to 32)
    if(Sp==5)
        sp₃ = ( sp₃ + Abs( p₅ - p₃ ) + 1 ) >> 1
    else
        sp₃ = ( sp₃ + Abs( p₇ - p₃ ) + 1 ) >> 1
sq₃ = Abs( q₀ - q₃ ), derived as in HEVC
```

-continued

```
if (q side is greater than or equal to 32)
   If(Sq==5)
      sq₃ = ( sq₃ + Abs( q₅ - q₃ ) + 1 ) >> 1
   else
      sq₃ = ( sq₃ + Abs( q₇ - q₃ ) + 1 ) >> 1
```

As in HEVC, StrongFilterCondition=(dpq is less than ($\beta$>>2), sp$_3$+sq$_3$ is less than (3*$\beta$>>5), and Abs(p$_0$-q$_0$) is less than (5*t$_C$+1)>>1)?TRUE:FALSE.

2.9.4 Stronger Deblocking Filter for Luma (Designed for Larger Blocks)

Bilinear filter is used when samples at either one side of a boundary belong to a large block. A sample belonging to a large block is defined as when the width>=32 for a vertical edge, and when height>=32 for a horizontal edge.

The bilinear filter is listed below.

Block boundary samples p$_i$ for i=0 to Sp-1 and q$_i$ for j=0 to Sq-1 (pi and qi are the i-th sample within a row for filtering vertical edge, or the i-th sample within a column for filtering horizontal edge) in HEVC deblocking described above) are then replaced by linear interpolation as follows:

$$p_i'=(f_i*Middle_{s,t}+(64-f_i)*P_s+32)>>6), \text{clipped to } p_i \pm tcPD_i$$

$$q_j'=(g_j*Middle_{s,t}+(64-g_j)*Q_s+32)>>6), \text{clipped to } q_j \pm tcPD_j$$

where tcPD$_i$ and tcPD$_j$ term is a position dependent clipping described in Section 2.9.7 and g$_j$, f$_i$, Middle$_{s,t}$, P$_s$ and Q$_s$ are given in Table 3.

2.9.5 Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering as shown in Table 2. The conditions in Table 2 are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows.

In the second condition:

d is then derived as in HEVC luma deblocking.

The second condition will be TRUE when d is less than $\beta$.

In the third condition StrongFilterCondition is derived as follows:

dpq is derived as in HEVC.

spa=Abs(p$_3$-p$_0$), derived as in HEVC sq$_3$=Abs(q$_0$-q$_3$), derived as in HEVC

TABLE 3

Long tap deblocking filters

| Sp, Sq | |
|---|---|
| 7, 7 (p side: 7, q side: 7) | f$_i$ = 59 - i * 9, can also be described as f = {59, 50, 41, 32, 23, 14, 5}<br>g$_j$ = 59 - j * 9, can also be described as g = {59, 50, 41, 32, 23, 14, 5}<br>Middle$_{7,7}$ = (2 * (p$_0$ + q$_0$) + p$_1$ + q$_1$ + p$_2$ + q$_2$ + p$_3$ + q$_3$ + p$_4$ + q$_4$ + p$_5$ + q$_5$ + p$_6$ + q$_6$ + 8) » 4<br>P$_7$ = (p$_6$ + p$_7$ + 1) » 1, Q$_7$ = (q$_6$ + q$_7$ + 1) » 1 |
| 7, 3 (p side: 7 q side: 3) | f$_i$ = 59 - i * 9, can also be described as f = {59, 50, 41, 32, 23, 14, 5}<br>g$_j$ = 53 - j * 21, can also be described as g = {53, 32, 11}<br>Middle$_{7,3}$ = (2 * (p$_0$ + q$_0$) + q$_0$ + 2 * (q$_1$ + q$_2$) + p$_1$ + q$_1$ + p$_2$ + p$_3$ + p$_4$ + p$_5$ + p$_6$ + 8) » 4<br>P$_7$ = (p$_6$ + p$_7$ + 1) » 1, Q$_3$ = (q$_2$ + q$_3$ + 1) » 1 |
| 3, 7 (p side: 3 q side: 7) | g$_j$ = 59 - j * 9, can also be described as g = {59, 50, 41, 32, 23, 14, 5}<br>f$_i$ = 53 - i * 21, can also be described as f = {53, 32, 11}<br>Middle$_{3,7}$ = (2 * (q$_0$ + p$_0$) + p$_0$ + 2 * (p$_1$ + p$_2$) + q$_1$ + p$_1$ + q$_2$ + q$_3$ + q$_4$ + q$_5$ + q$_6$ + 8) » 4<br>Q$_7$ = (q$_6$ + q$_7$ + 1) » 1, P$_3$ = (p$_2$ + p$_3$ + 1) » 1 |
| 7, 5 (p side: 7 q side: 5) | g$_j$ = 58 - j * 13, can also be described as g = {58, 45, 32, 19, 6}<br>f$_i$ = 59 - i * 9, can also be described as f = {59, 50, 41, 32, 23, 14, 5}<br>Middle7,5 = (2 * (p$_0$ + q$_0$ + p$_1$ + q$_1$) + q$_2$ + p$_2$ + q$_3$ + p$_3$ + q$_4$ + p$_4$ + q$_5$ + p$_5$ + 8) » 4<br>Q$_5$ = (q$_4$ + q$_5$ + 1) » 1, P$_7$ = (p$_6$ + p$_7$ + 1) » 1 |
| 5, 7 (p side: 5 q side: 7) | g$_j$ = 59 - j * 9, can also be described as g = {59, 50, 41, 32, 23, 14, 5}<br>f$_i$ = 58 - i * 13, can also be described as f = {58, 45, 32, 19, 6}<br>Middle5,7 = (2 * (q$_0$ + p$_0$ + p$_1$ + q$_1$) + q$_2$ + p$_2$ + q$_3$ + p$_3$ + q$_4$ + p$_4$ + q$_5$ + p$_5$ + 8) » 4<br>Q$_7$ = (q$_6$ + q$_7$ + 1) » 1, P$_5$ = (p$_4$ + p$_5$ + 1) » 1 |
| 5, 5 (p side: 5 q side: 5) | g$_j$ = 58 - j * 13, can also be described as g = {58, 45, 32, 19, 6}<br>f$_i$ = 58 - i * 13, can also be described as f = {58, 45, 32, 19, 6}<br>Middle5,5 = (2 * (q$_0$ + p$_0$ + p$_1$ + q$_1$ + q$_2$ + p$_2$) + q$_3$ + p$_3$ + q$_4$ + p$_4$ + 8) » 4<br>Q$_5$ = (q$_4$ + q$_5$ + 1) » 1, P$_5$ = (p$_4$ + p$_5$ + 1) » 1 |
| 5, 3 (p side: 5 q side: 3) | g$_j$ = 53 - j * 21, can also be described as g = {53, 32, 11}<br>f$_i$ = 58 - i * 13, can also be described as f = {58, 45, 32, 19, 6}<br>Middle5,3 = (q$_0$ + p$_0$ + p$_1$ + q$_1$ + q$_2$ + p$_2$ + p$_3$ + p$_3$ + 4) » 3<br>Q$_3$ = (q$_2$ + q$_3$ + 1) » 1, P$_5$ = (p$_4$ + p$_5$ + 1) » 1 |
| 3, 5 (p side: 3 q side: 5) | g$_j$ = 58 - j * 13, can also be described as g = {58, 45, 32, 19, 6}<br>f$_i$ = 53 - i * 21, can also be described as f = {53, 32, 11}<br>Middle3,5 = (q$_0$ + p$_0$ + p$_1$ + q$_1$ + q$_2$ + p$_2$ + q$_3$ + p$_3$ + 4) » 3<br>Q$_5$ = (q$_4$ + q$_5$ + 1) » 1, P$_3$ = (p$_2$ + p$_3$ + 1) » 1 |

As in HEVC design, StrongFilterCondition=(dpq is less than (β>>2), sp3+sq3 is less than (β>>3), and Abs(p0−q0) is less than (5*tC+1)>>1)

2.9.6 Strong Deblocking Filter for Chroma

The following strong deblocking filter for chroma is defined:

$$p_2'=(3*p_3+2*p_2+p_1+p_0+q_0+4)>>3$$

$$p_1'=(2*p_3+p_2+2*p_1+p_0+q_0+q_1+4)>>3$$

$$p_0'=(p_3+p_2+p_1+2*p_0+q_0+q_1+q_2+4)>>3$$

The proposed chroma filter performs deblocking on a 4×4 chroma sample grid.

2.9.7 Position Dependent Clipping

The position dependent clipping (tcPD) is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in section 2.9.2, position dependent threshold table is selected from two tables (i.e., Tc7 and Tc3 tabulated below) that are provided to decoder as a side information:

$$Tc7=\{6,5,4,3,2,1,1\};$$

$$Tc3=\{6,4,2\};$$

$$tcPD=(Sp==3)?Tc3:Tc7;$$

$$tcQD=(Sq==3)?Tc3:Tc7;$$

For the P or Q boundaries being filtered with a short symmetrical filter, position dependent threshold of lower magnitude is applied:

$$Tc3=\{3,2,1\};$$

Following defining the threshold, filtered p'i and q'i sample values are clipped according to tcP and tcQ clipping values:

$$p''_i=Clip3(p'_i+tcP_i,p'_i-tcP_i,p'_i);$$

$$q''_j=Clip3(q'_j+tcQ_j,q'_j-tcQ_j,q'_j);$$

where $p'_i$ and $q'_i$ are filtered sample values, $p''_i$ and $q''_i$ are output sample value after the clipping and tcP, tcP, are clipping thresholds that are derived from the VVC tc parameter and tcPD and tcQD. The function Clip3 is a clipping function as it is specified in VVC.

2.9.8 Sub-Block Deblocking Adjustment

To enable parallel friendly deblocking using both long filters and sub-block deblocking the long filters is restricted to modify at most 5 samples on a side that uses sub-block deblocking (AFFINE or ATMVP or decoder side motion vector refinement (DMVR)) as shown in the luma control for long filters. Additionally, the sub-block deblocking is adjusted such that that sub-block boundaries on an 8×8 grid that are close to a CU or an implicit TU boundary is restricted to modify at most two samples on each side.

Following applies to sub-block boundaries that not are aligned with the CU boundary.

```
If (mode block Q == SUBBLOCKMODE && edge !=0) {
   if (!(implicitTU && (edge == (64 / 4))))
      if (edge == 2 || edge == (orthogonalLength − 2) || edge == (56 / 4) ||
      edge == (72 / 4))
         Sp = Sq = 2;
      else
         Sp = Sq = 3;
   else
      Sp = Sq = bSideQisLargeBlk ? 5:3
}
```

Where edge equal to 0 corresponds to CU boundary, edge equal to 2 or equal to orthogonalLength-2 corresponds to sub-block boundary 8 samples from a CU boundary etc. Where implicit TU is true if implicit split of TU is used.

2.9.9 Restriction to 4CTU/2CTU Line Buffers for Luma/Chroma

Filtering of horizontal edges is limiting Sp=3 for luma, Sp=1 and Sq=1 for chroma, when the horizontal edge is aligned with the CTU boundary.

2.10 Palette Mode Combining with Intra Prediction (PCIP)

In JVET-M0051, the palette mode combined with intra prediction is proposed. In this scheme, the decoder first derives the prediction block based on the intra prediction methods. Then, the decoder decodes a palette and an index map. Using the decoding palette information, the decoder refines the prediction block and reconstructs the block.

Figure 9:
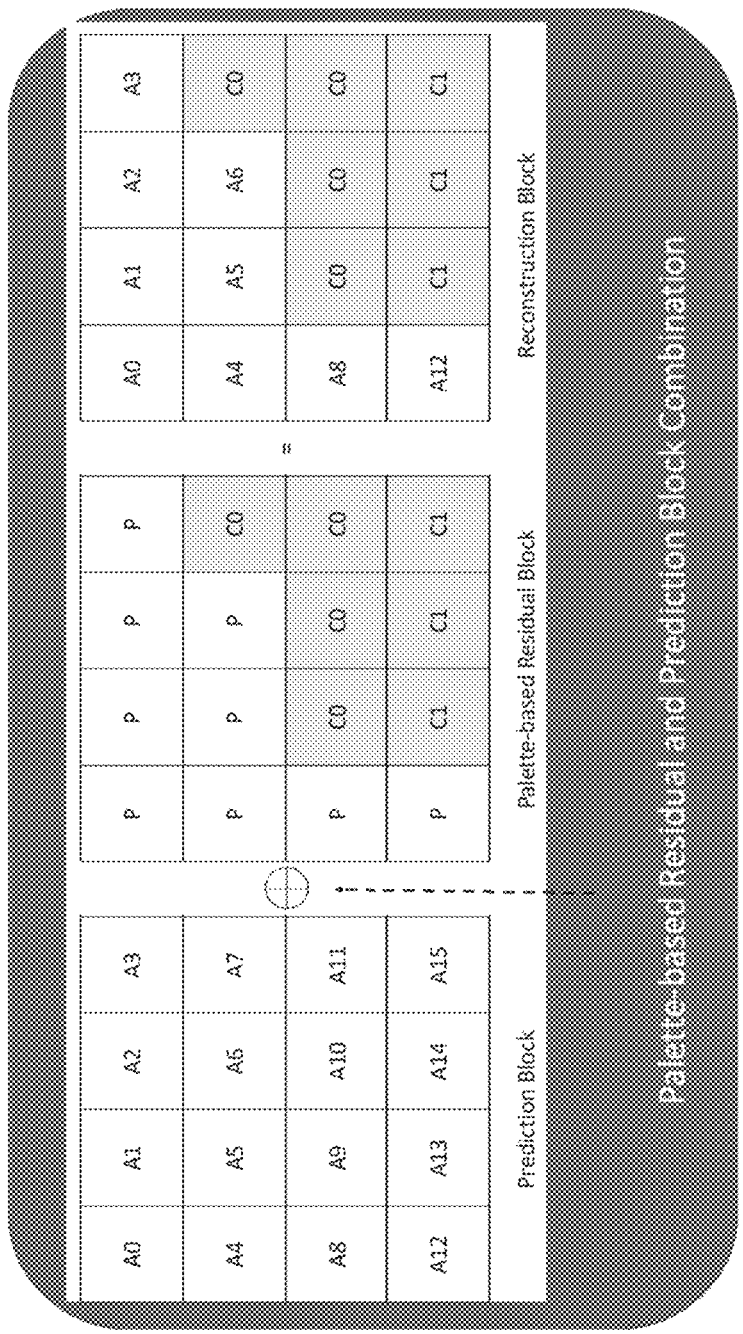
FIG. 9 shows an example method implementation of palette mode combining with intra prediction.

FIG. 9 shows an example combining the palette information and the intra prediction information. First, the decoder generates the prediction block (with pixel values A0~A15). And, the decoder decodes an index map in the palette mode. To reconstruct the block, if the decoded indices equal to "0", the corresponding pixels are marked as "P" as shown in FIG. 6. The pixels marked as "P" is reconstructed by pixel values in the intra prediction block. Otherwise, the pixels are reconstructed by palette colors, e.g. C0, C1.

2.11 Compound Palette Mode (CPM)

Figure 10:
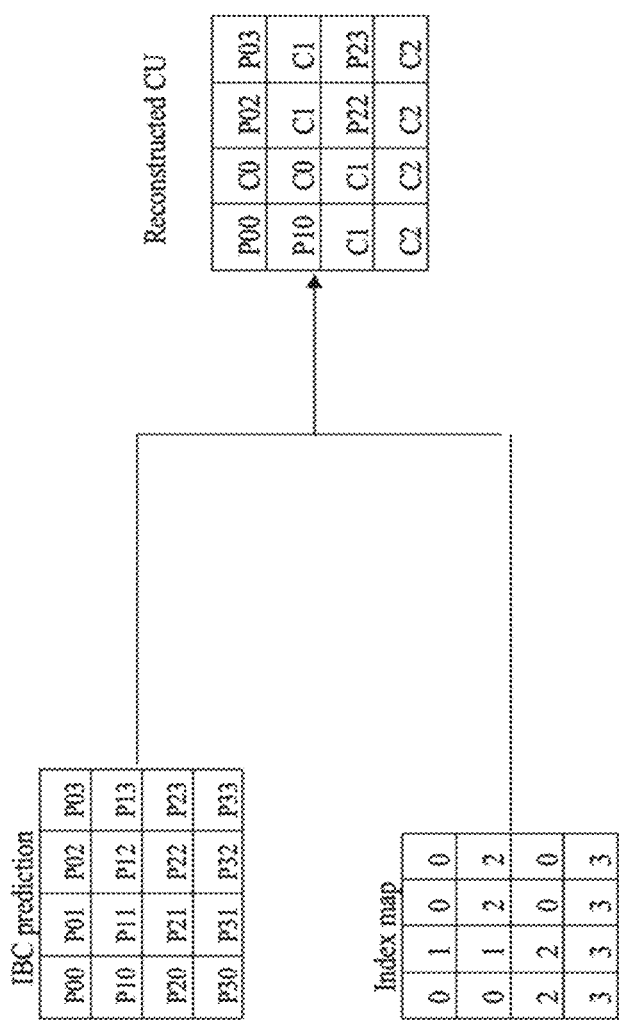
FIG. 10 shows an example implementation of the compound palette mode.

As in JVET-N0259, the samples in the compound palette mode can be reconstructed by copying the collocated sample in the IBC prediction when the current index is 0. Otherwise, the current sample will be reconstructed by the palette colors. FIG. 10 illustrates the proposed palette mode.

In the compound palette mode, on the luma blocks, IBC prediction is generated by using the first available merge candidate, so the motion information for the IBC prediction does not need to be signaled. On the chroma blocks, the motion compensation in CPM is same with that in VTM4.

In addition, the coding of escape pixels is modified as well. The quantized residue between the original sample and the collocated IBC prediction sample is signaled. At the decoder, every escape pixel in the proposed palette mode is reconstructed by combining the decoded residue and the IBC prediction.

2.12 Intra Mode Coding with 67 Intra Prediction Modes in JVET-N0185

Figure 11:
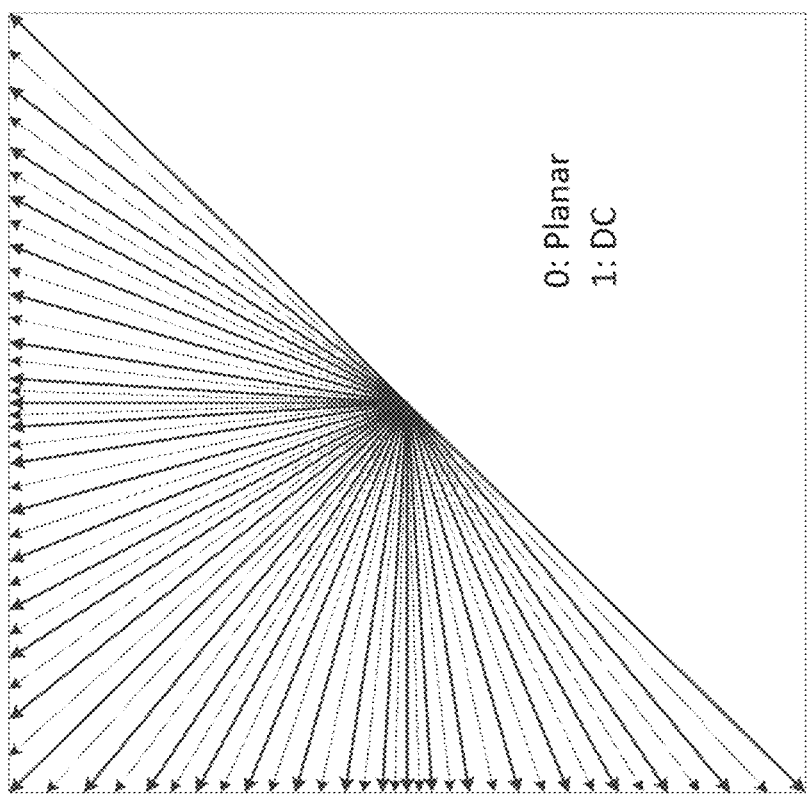
FIG. 11 shows an example of 67 modes (directions) for intra prediction.

To capture the arbitrary edge directions presented in natural video, the number of directional intra modes in VTM4 is extended from 33, as used in HEVC, to 65. The new directional modes not in HEVC are depicted as red dotted arrows in FIG. 11, and the planar and DC modes remain the same. These denser directional intra prediction modes apply for all block sizes and for both luma and chroma intra predictions.

Figure 12:
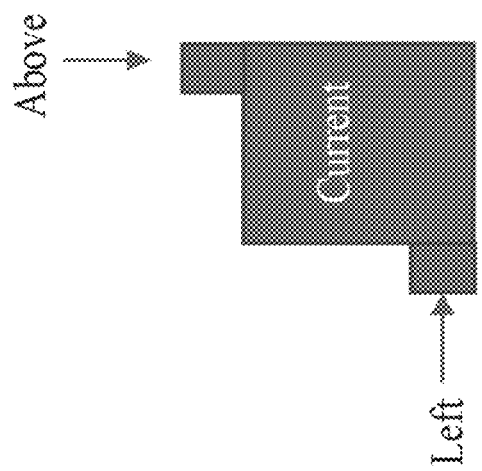
FIG. 12 shows an example of left and above neighbors of a current video block.

A unified 6-MPM list is proposed for intra blocks irrespective of whether MRL and ISP coding tools are applied or not. The MPM list is constructed based on intra modes of the left and above neighboring block as in VTM4.0, as shown in FIG. 12.

Suppose the mode of the left is denoted as Left and the mode of the above block is denoted as Above, the unified MPM list is constructed as with the following steps in order:

When the intra prediction mode of a neighboring block is invalid, its intra mode is set to Planar by default.

If Left and Above are the same and both angular:
MPM list→{Planar, Left, Left−1, Left+1, DC, Left−2}

If Left and Above are different and both angular:
Set a mode Max as the larger mode in Left and Above
if the difference of mode Left and Above is in the range of 2 to 62, inclusive
MPM list→{Planar, Left, Above, DC, Max−1, Max+1}

Otherwise
MPM list→{Planar, Left, Above, DC, Max−2, Max+2}

If Left and Above are different and one of modes Left and Above is angular mode, and the other is non-angular:
Set a mode Max as the larger mode in Left and Above
MPM list→{Planar, Max, DC, Max−1, Max+1, Max−2}

If both modes Left and Above are non-angular modes:
MPM list→{Planar, DC, V, H, V−4, V+4}

Note that when the mode index (e.g., Max+2) exceed the range [0, 66], it may be replaced by another valid mode index.

The first MPM candidate, i.e., the Planar mode is signaled separately from the remaining MPM candidates.

The more detailed syntax, semantics and decoding process are described as follows:

7.3.6.5 Coding Unit Syntax

| | Descriptor |
|---|---|
| coding_unit( x0, y0, cbWidth, cbHeight, treeType ) { | |
|   if( tile_group_type != I ‖ sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) ‖ | |
|       ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE ‖ treeType = = DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|           ( cbWidth <= MaxTbSizeY ‖ cbHeight <= MaxTbSizeY ) && | |
|           ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |
|           cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) { | |
|           if( intra_luma_ref_idx[ x0 ][ y0 ] = = 0 ) | |
|             intra_luma_not_planar_flag[ x0 ][ y0 ] | ae(v) |
|           if( intra_luma_not_planar_flag[ x0 ][ y0 ] ) | |
|             intra_luma_mpm_idx[ x0 ][ y0 ] | ae(v) |
|         } else | |
|           intra_luma_mpm_remainder[ x0 ][ y0 ] | ae(v) |
|       } | |
|       if( treeType = = SINGLE_TREE ‖ treeType = = DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER or MODE_IBC */ | |
|     ... | |
|   } | |
|   if( !pcm_flag[ x0 ][ y0 ] ) { | |
|     if( CuPredMode[ x0 ][ y0 ] != MODE_INTRA && merge_flag[ x0 ][ y0 ] = = 0 ) | |
|       cu_cbf | ae(v) |
|     if( cu_cbf ) { | |
|       if( CuPredMode[ x0 ][ y0 ] = = MODE_INTER && sps_sbt_enabled_flag && | |
|         !ciip_flag[ x0 ][ y0 ] ) { | |
|         if( cbWidth <= MaxSbtSize && cbHeight <= MaxSbtSize ) { | |
|           allowSbtVerH = cbWidth >= 8 | |
|           allowSbtVerQ = cbWidth >= 16 | |

```
        allowSbtHorH = cbHeight >= 8
        allowSbtHorQ = cbHeight >= 16
        if( allowSbtVerH || allowSbtHorH || allowSbtVerQ || allowSbtHorQ )
            cu_sbt_flag                                                              ae(v)
    }
    if( cu_sbt_flag ) {
        if( ( allowSbtVerH || allowSbtHorH ) && ( allowSbtVerQ || allowSbtHorQ ) )
            cu_sbt_quad_flag                                                         ae(v)
        if( ( cu_sbt_quad_flag && allowSbtVerQ && allowSbtHorQ ) ||
            ( !cu_sbt_quad_flag && allowSbtVerH && allowSbtHorH ) )
            cu_sbt_horizontal_flag                                                   ae(v)
        cu_sbt_pos_flag                                                              ae(v)
        }
    }
    transform_tree( x0, y0, cbWidth, cbHeight, treeType )
    }
  }
}
```

The syntax elements intra_luma_mpm_flag[x0][y0], intra_luma_not_planar_flag[x0][y0], intra_luma_mpm_idx[x0][y0] and intra_luma_mpm_remainder[x0][y0] specify the intra prediction mode for luma samples. The array indices x0, y0 specify the location (x0, y0) of the top-left luma sample of the considered coding block relative to the top-left luma sample of the picture. When intra_luma_mpm_flag[x0][y0] is equal to 1, the intra prediction mode is inferred from a neighbouring intra-predicted coding unit according to clause 8.4.2.

When intra_luma_mpm_flag[x0][y0] is not present (e.g., ISP enabled, or MRL enabled (with reference index>0)), it is inferred to be equal to 1.

When intra_luma_not_planar_flag[x0][y0] is not present (e.g., MRL is enabled), it is inferred to be equal to 1.

8.4.2 Derivation Process for Luma Intra Prediction Mode

Input to this process are:
- a luma location (xCb, yCb) specifying the top-left sample of the current luma coding block relative to the top-left luma sample of the current picture,
- a variable cbWidth specifying the width of the current coding block in luma samples,
- a variable cbHeight specifying the height of the current coding block in luma samples.

In this process, the luma intra prediction mode IntraPredModeY[xCb][yCb] is derived.

Table 8-1 specifies the value for the intra prediction mode IntraPredModeY[xCb][yCb] and the associated names.

TABLE 8-1

Specification of intra prediction mode and associated names

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

NOTE-:
The intra prediction modes INTRA_LT_CCLM, INTRA_L_CCLM and INTRA_T_CCLM are only applicable to chroma components.

IntraPredModeY[xCb][yCb] is derived as follows:
If intra_luma_not_planar_flag[xCb][yCb] is equal to 1, the following ordered steps:

1. The neighbouring locations (xNbA, yNbA) and (xNbB, yNbB) are set equal to (xCb-1, yCb+cbHeight-1) and (xCb+cbWidth-1, yCb-1), respectively.
2. For X being replaced by either A or B, the variables candIntraPredModeX are derived as follows:
    The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.
    The candidate intra prediction mode candIntraPredModeX is derived as follows:
        If one or more of the following conditions are true, candIntraPredModeX is set equal to INTRA_PLANAR.
        The variable availableX is equal to FALSE.
        CuPredMode[xNbX][yNbX] is not equal to MODE_INTRA and ciip_flag[xNbX][yNbX] is not equal to 1.
        pcm_flag[xNbX][yNbX] is equal to 1.
        X is equal to B and yCb-1 is less than ((yCb>>CtbLog2SizeY)<<CtbLog2SizeY).
        Otherwise, candIntraPredModeX is set equal to IntraPredModeY[xNbX][yNbX].
3. The candModeList[x] with x=0 . . . 4 is derived as follows:
    If candIntraPredModeB is equal to candIntraPredModeA and candIntraPredModeA is greater than INTRA_DC, candModeList[x] with x=0 . . . 4 is derived as follows:

$$candModeList[0]=candIntraPredModeA \quad (8\text{-}10)$$

$$candModeList[1]=2+((candIntraPredModeA+61)\%\ 64) \quad (8\text{-}12)$$

$$candModeList[2]=2+((candIntraPredModeA-1)\%\ 64) \quad (8\text{-}13)$$

$$candModeList[3]=INTRA\_DC \quad (8\text{-}11)$$

$$candModeList[4]=2+((candIntraPredModeA+60)\%\ 64) \quad (8\text{-}14)$$

Otherwise if candIntraPredModeB is not equal to candIntraPredModeA and candIntraPredModeA or candIntraPredModeB is greater than INTRA_DC, the following applies:
The variables minAB and maxAB are derived as follows:

min AB=Min(candIntraPredModeA,candIntraPredModeB)  (8-24)

max AB=Max(candIntraPredModeA,candIntraPredModeB)  (8-25)

If candIntraPredModeA and candIntraPredModeB are both greater than INTRA_DC, candModeList[x] with x=0 . . . 4 is derived as follows:

candModeList[0]=candIntraPredModeA  (8-27)

candModeList[1]=candIntraPredModeB  (8-29)

candModeList[2]=INTRA_DC  (8-29)

If maxAB−minAB is in the range of 2 to 62, inclusive, the following applies:

candModeList[3]=2+((max AB+61)% 64)  (8-30)

candModeList[4]=2+((max AB−1)% 64)  (8-31)

Otherwise, the following applies:

candModeList[3]=2+((max AB+60)% 64)  (8-32)

candModeList[4]=2+((max AB)% 64)  (8-33)

Otherwise (candIntraPredModeA or candIntraPredModeB is greater than INTRA_DC), candModeList[x] with x=0 . . . 4 is derived as follows:

candModeList[0]=max AB  (8-65)

candModeList[1]=INTRA_DC  (8-66)

candModeList[2]=2+((max AB+61)% 64)  (8-66)

candModeList[3]=2+((max AB−1)% 64)  (8-67)

candModeList[4]=2+((max AB+60)% 64)  (8-68)

Otherwise, the following applies:

candModeList[0]=INTRA_DC  (8-71)

candModeList[1]=INTRA_ANGULAR50  (8-72)

candModeList[2]=INTRA_ANGULAR18  (8-73)

candModeList[3]=INTRA_ANGULAR46  (8-74)

candModeList[4]=INTRA_ANGULAR54  (8-75)

4. IntraPredModeY[xCb][yCb] is derived by applying the following procedure:
If intra_luma_mpm_flag[xCb][yCb] is equal to 1, the IntraPredModeY[xCb][yCb] is set equal to candModeList[intra_luma_mpm_idx[xCb][yCb]].
Otherwise, IntraPredModeY[xCb][yCb] is derived by applying the following ordered steps:

1. When candModeList[i] is greater than candModeList[j] for i=0 . . . 3 and for each i, j= (i+1) . . . 4, both values are swapped as follows:

(candModeList[$i$],candModeList[$j$])=Swap(candModeList[$i$],candModeList[$j$])  (8-94)

2. IntraPredModeY[xCb][yCb] is derived by the following ordered steps:
i. IntraPredModeY[xCb][yCb] is set equal to intra_luma_mpm_remainder[xCb][yCb].
ii. The value of IntraPredModeY[xCb][yCb] is incremented by one
iii. For i equal to 0 to 4, inclusive, when IntraPredModeY[xCb][yCb] is greater than or equal to candModeList[i], the value of IntraPredModeY[xCb][yCb] is incremented by one.
Otherwise (intra_luma_not_planar_flag[xCb][yCb] is equal to 0), IntraPredModeY[xCb][yCb] is set equal to INTRA_PLANAR.
The variable IntraPredModeY[x][y] with x=xCb . . . xCb+cbWidth−1 and y=yCb . . . yCb+cbHeight−1 is set to be equal to IntraPredModeY[xCb][yCb].
For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table
3. Chroma mode coding directly depends on the intra prediction mode of the corresponding luma block. Since separate block partitioning structure for luma and chroma components is enabled in I slices, one chroma block may correspond to multiple luma blocks. Therefore, for Chroma derived mode (DM) mode, the intra prediction mode of the corresponding luma block covering the center position of the current chroma block is directly inherited.

TABLE 4

Derivation of chroma prediction mode from luma mode when cclm_is enabled

| | Corresponding luma intra prediction mode | | | | |
|---|---|---|---|---|---|
| Chroma prediction mode | 0 | 50 | 18 | 1 | X(0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

2.13 History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In VTM5 the HMVP table size S is set to be 5, which indicates up to 5 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial merge candidate.

2.14 Scaling Lists

Scaling lists (c.f quantization matrices) can be applied during the (inverse) quantization process. In HEVC, the user-defined scaling values are signaled in the PPS, and each possible TB size, color component and prediction type (intra/inter) can have its own scaling list, except for 32×32 chroma blocks, which is used only for the 4:4:4 RExt chroma format. For 16×16 and 32×32 scaling lists, the scaling lists are specified with an 8×8 grid of values which is value-repeated to the required size, along with a value used for the entry corresponding to the DC frequency location.

2.15 Triangle Partition Mode for Inter Prediction (TPM)

In VTM4, a triangle partition mode is supported for inter prediction. The triangle partition mode is only applied to CUs that are 8×8 or larger and are coded in skip or merge mode but not in merge mode with motion vector difference (MMVD) or combined inter-intra prediction (CIIP) mode. For a CU satisfying these conditions, a CU-level flag is signalled to indicate whether the triangle partition mode is applied or not.

Figure 14:
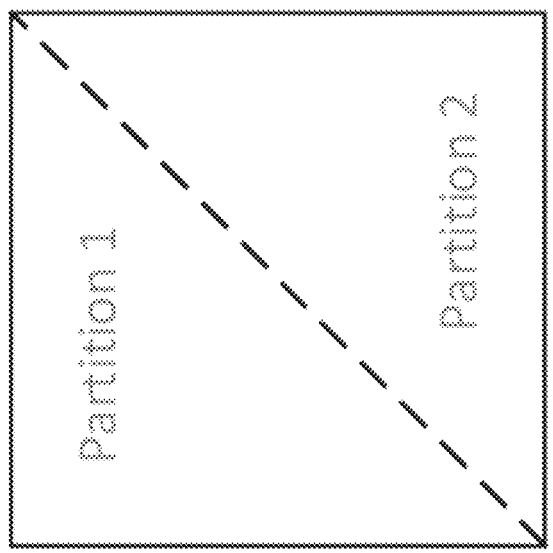
FIG. 14 shows an example of a triangle partition based inter prediction.
Figure 14:
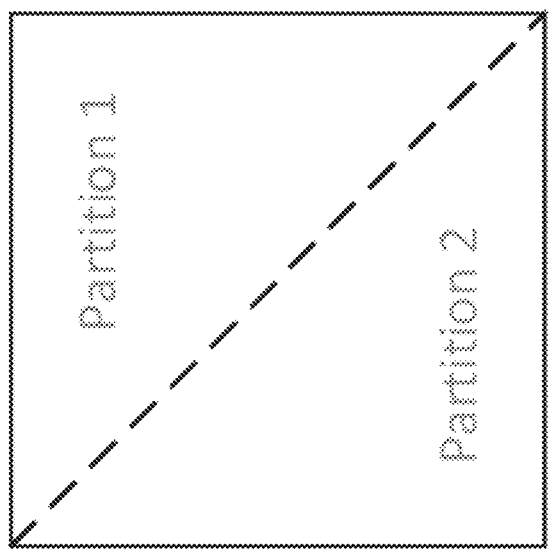

When this mode is used, a CU is split evenly into two triangle-shaped partitions, using either the diagonal split or the anti-diagonal split (FIG. 14). Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU. The uni-prediction motion for each partition is derived from a uni-prediction candidate list constructed using the process in 3.4.10.1.

If the CU-level flag indicates that the current CU is coded using the triangle partition mode. If triangle partition mode is used, then a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU, and transform and quantization process will be applied to the whole CU as in other prediction modes. Finally, the motion field of a CU predicted using the triangle partition mode is stored in 4×4 units as in 2.16.3.

2.15.1 Uni-Prediction Candidate List Construction

Figure 15:
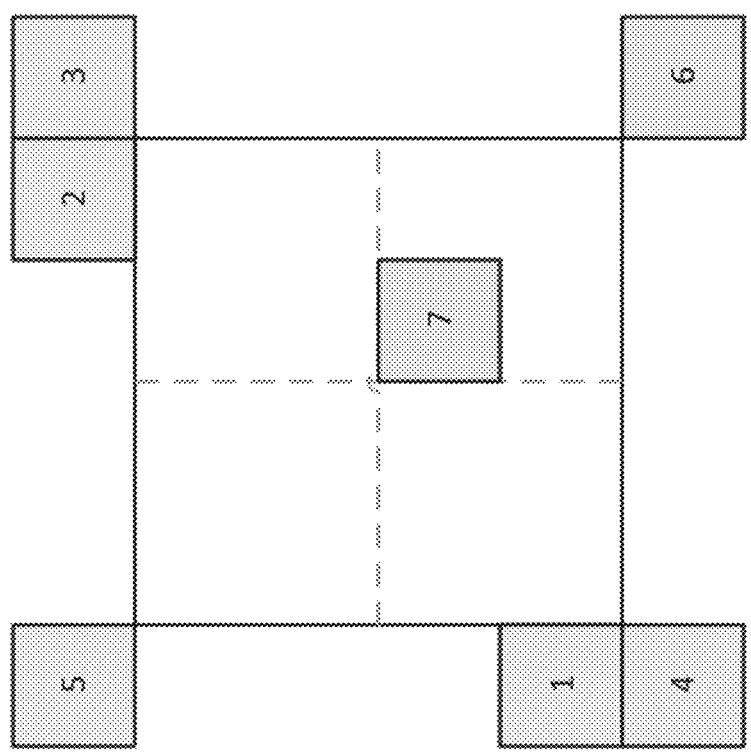
FIG. 15 shows an example of spatial and temporal neighboring blocks used to construct the uni-prediction candidate list.

The uni-prediction candidate list consists of five uni-prediction motion vector candidates. It is derived from seven neighboring blocks including five spatial neighboring blocks (labelled 1 to 5 in FIG. 15) and two temporal co-located blocks (labelled 6 to 7 in FIG. 15). The motion vectors of the seven neighboring blocks are collected and put into the uni-prediction candidate list according to the following order: first, the motion vectors of the uni-predicted neighboring blocks; then, for the bi-predicted neighboring blocks, the L0 motion vectors (that is, the L0 motion vector part of the bi-prediction MV), the L1 motion vectors (that is, the L1 motion vector part of the bi-prediction MV), and averaged motion vectors of the L0 and L1 motion vectors of the bi-prediction MVs. If the number of candidates is less than five, zero motion vector is added to the end of the list.

2.15.2 Blending Along the Triangle Partition Edge

Figure 16:
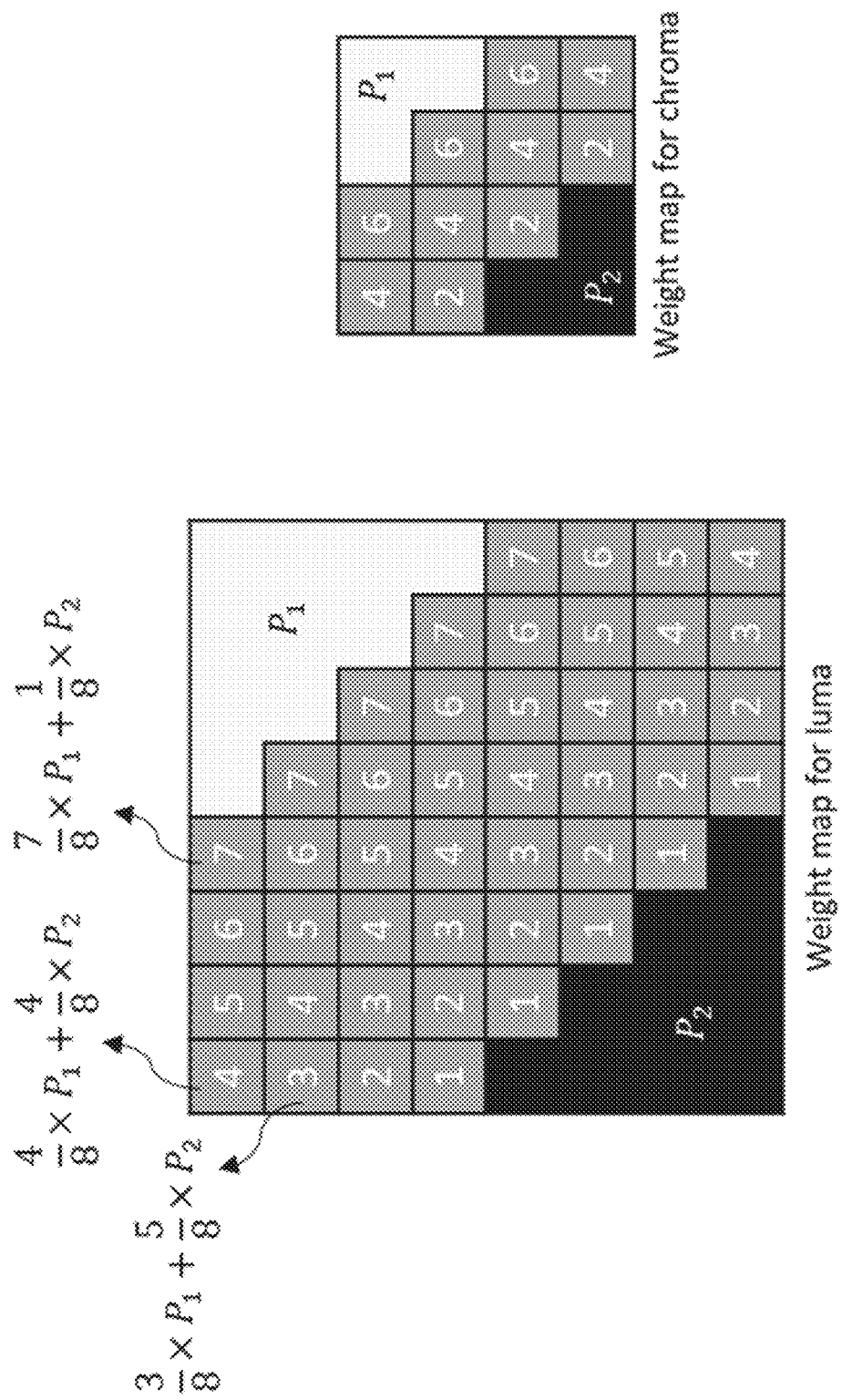
FIG. 16 shows an example of weights used in the blending process.

After predicting each triangle partition using its own motion, blending is applied to the two prediction signals to derive samples around the diagonal or anti-diagonal edge. The following weights are used in the blending process:

7/8, 6/8, 5/8, 4/8, 3/8, 2/8, 1/8} for luma and {6/8, 4/8, 2/8} for chroma, as shown in FIG. 16.

2.15.3 Motion Field Storage

The motion vectors of a CU coded in triangle partition mode are stored in 4×4 units. Depending on the position of each 4×4 unit, either uni-prediction or bi-prediction motion vectors are stored. Denote Mv1 and Mv2 as uni-prediction motion vectors for partition 1 and partition 2, respectively. If a 4×4 unit is located in the non-weighted area shown in the example of FIG. 16, either Mv1 or Mv2 is stored for that 4×4 unit. Otherwise, if the 4×4 unit is located in the weighted area, a bi-prediction motion vector is stored. The bi-prediction motion vector is derived from Mv1 and Mv2 according to the following process:

1) If Mv1 and Mv2 are from different reference picture lists (one from L0 and the other from L1), then Mv1 and Mv2 are simply combined to form the bi-prediction motion vector.

2) Otherwise, if Mv1 and Mv2 are from the same list, and without loss of generality, assume they are both from L0. In this case, a) If the reference picture of either Mv2 (or Mv1) appears in L1, then that Mv2 (or Mv1) is converted to a L1 motion vector using that reference picture in L1. Then the two motion vectors are combined to form the bi-prediction motion vector;

b) Otherwise, instead of bi-prediction motion, only uni-prediction motion Mv1 is stored.

2.16 In-Loop Filters

There are totally three in-loop filters in VTM5. Besides deblocking filter and SAO (the two loop filters in HEVC), adaptive loop filter (ALF) are applied in the VTM5. The order of the filtering process in the VTM5 is the deblocking filter, SAO and ALF.

In the VTM5, the SAO and deblocking filtering processes are almost same as those in HEVC.

In the VTM5, a new process called the luma mapping with chroma scaling was added (this process was previously known as the adaptive in-loop reshaper). This new process is performed before deblocking.

2.16.1 Adaptive Loop Filter

In the VTM5, an Adaptive Loop Filter (ALF) with block-based filter adaption is applied. For the luma component, one among 25 filters is selected for each 4×4 block, based on the direction and activity of local gradients.

2.16.1.1 Filter Shape

Figure 19:
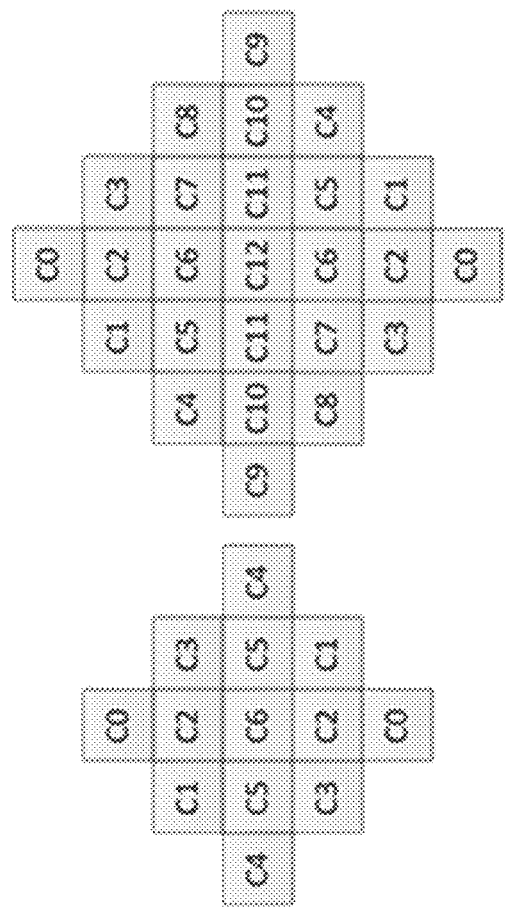
FIG. 19 shows example shapes of an adaptive loop filter ALF (chroma: 5×5 diamond, luma: 7×7 diamond).

In the VTM5, two diamond filter shapes (as shown in FIG. 19) are used. The 7×7 diamond shape is applied for luma component and the 5×5 diamond shape is applied for chroma components.

2.16.1.2 Block Classification

For luma component, each 4×4 block is categorized into one out of 25 classes. The classification index C is derived based on its directionality D and a quantized value of activity $\hat{A}$, as follows:

$$C = 5D + \hat{A} \tag{3-1}$$

To calculate D and Â, gradients of the horizontal, vertical and two diagonal direction are first calculated using 1-D Laplacian:

$$g_v = \Sigma_{k=i-2}^{i+3} \Sigma_{l=j-2}^{j+3} V_{k,l}, V_{k,l} = |2R(k,l) - R(k,l-1) - R(k,l+1)| \quad (3\text{-}2)$$

$$g_h = \Sigma_{k=i-2}^{i+3} \Sigma_{l=j-2}^{j+3} H_{k,l}, H_{k,l} = |2R(k,l) - R(k-1,l) - R(k+1,l)| \quad (3\text{-}3)$$

$$g_{d1} = \Sigma_{k=i-2}^{i+3} \Sigma_{l=j-3}^{j+3} D1_{k,l}, D1_{k,l} = |2R(k,l) - R(k-1,l-1) - R(k+1,l+1)| \quad (3\text{-}4)$$

$$g_{d2} = \Sigma_{k=i-2}^{i+3} \Sigma_{j=j-2}^{j+3} D2_{k,l}, D2_{k,l} = |2R(k,l) - R(k-1,l+1) - R(k+1,l-1)| \quad (3\text{-}5)$$

Where indices i and j refer to the coordinates of the upper left sample within the 4×4 block and R(i,j) indicates a reconstructed sample at coordinate (i,j).

To reduce the complexity of block classification, the subsampled 1-D Laplacian calculation is applied. As shown in FIG. 20, the same subsampled positions are used for gradient calculation of all directions.

Then D maximum and minimum values of the gradients of horizontal and vertical directions are set as:

$$g_{h,v}^{max} = \max(g_h, g_v), g_{h,v}^{min} = \min(g_h, g_v) \quad (3\text{-}6)$$

The maximum and minimum values of the gradient of two diagonal directions are set as:

$$g_{d0,d1}^{max}(g_{d0}, g_{d1}), g_{d0,d1}^{min} = \min(g_{d0}, g_{d1}) \quad (3\text{-}7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \Sigma_{k=i-2}^{i+3} \Sigma_{l=j-2}^{j+3} (V_{k,l} + H_{k,l}) \quad (3\text{-}8)$$

A is further quantized to the range of 0 to 4, inclusively, and the quantized value is denoted as Â.

For chroma components in a picture, no classification method is applied, i.e. a single set of ALF coefficients is applied for each chroma component.

2.16.1.3 Geometric Transformations of Filter Coefficients and Clipping Values

Before filtering each 4×4 luma block, geometric transformations such as rotation or diagonal and vertical flipping are applied to the filter coefficients f(k,l) and to the corresponding filter clipping values c(k,l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l) = f(l,k), c_D(k,l) = c(l,k)$, (3-9)

Vertical flip: $f_V(k,l) = f(k, K-l-1), c_V(k,l) = c(k, K-l-1)$ (3-10)

Rotation: $f_R(k,l) = f(K-l-1, k), c_R(k,l) = c(K-l-1, k)$ (3-11)

where K is the size of the filter and $0 \leq k, l \leq K-1$ are coefficients coordinates, such that location (0,0) is at the upper left corner and location (K-1, K-1) is at the lower right corner. The transformations are applied to the filter coefficients f(k,l) and to the clipping values c(k,l) depending on gradient values calculated for that block. The relationship between the transformation and the four gradients of the four directions are summarized in the following table.

TABLE 2-5

Mapping of the gradient calculated for one block and the transformations

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.16.1.4 Filter Parameters Signalling

In the VTM5, ALF filter parameters are signalled in Adaptation Parameter Set (APS). In one APS, up to 25 sets of luma filter coefficients and clipping value indexes, and up to one set of chroma filter coefficients and clipping value indexes could be signalled. To reduce bits overhead, filter coefficients of different classification can be merged. In slice header, the indices of the APSs used for the current slice are signaled.

Clipping value indexes, which are decoded from the APS, allow determining clipping values using a Luma table of clipping values and a Chroma table of clipping values. These clipping values are dependent of the internal bitdepth. More precisely, the Luma table of clipping values and Chroma table of clipping values are obtained by the following formulas:

$$AlfClip_L = \left\{ \text{round}\left(2^{B\frac{N-n+1}{N}}\right) \text{ for } n \in [1 \ldots N]\right\}, \quad (3\text{-}12)$$

$$AlfClip_C = \left\{ \text{round}\left(2^{(B-8)+8\frac{(N-n)}{N-1}}\right) \text{ for } n \in [1 \ldots N]\right\} \quad (3\text{-}13)$$

with B equal to the internal bitdepth and N equal to 4 which is the number of allowed clipping values in VTM5.0.

The filtering process can be controlled at CTB level. A flag is always signalled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

The filter coefficients are quantized with norm equal to 128. In order to restrict the multiplication complexity, a bitstream conformance is applied so that the coefficient value of the non-central position shall be in the range of −27 to 27−1, inclusive. The central position coefficient is not signalled in the bitstream and is considered as equal to 128.

2.16.1.5 Filtering Process

At decoder side, when ALF is enabled for a CTB, each sample R(i,j) within the CU is filtered, resulting in sample value R'(i,j) as shown below, $$R'(i,j) = R(i,j) + ((\Sigma_{k \neq 0} \Sigma_{l \neq 0} f(k,l) \times K(R(i+k, j+l) - R(i,j), c(k,l)) + 64) >> 7) \quad (3\text{-}14)$$

where f(k,l) denotes the decoded filter coefficients, K(x,y) is the clipping function and c(k,l) denotes the decoded clipping parameters. The variable k and l varies between −L/2 and L/2 where L denotes the filter length. The clipping function K(x,y)=min(y,max(−y,x)) which corresponds to the function Clip3(−y,y,x).

2.16.1.6 Virtual Boundary Filtering Process for Line Buffer Reduction

Figure 22:
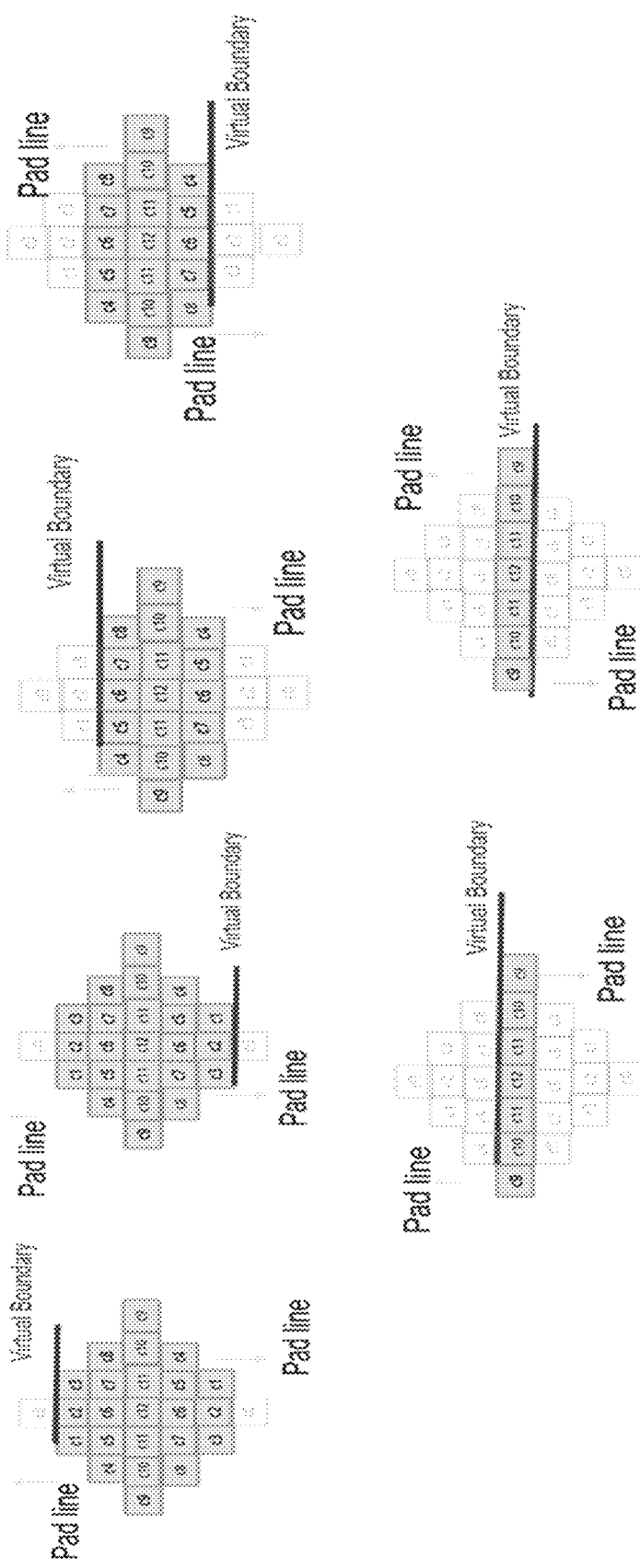
FIG. 22 shows an example of modified ALF filtering for Luma component at virtual boundaries.

In VTM5, to reduce the line buffer requirement of ALF, modified block classification and filtering are employed for the samples near horizontal CTU boundaries. For this purpose, a virtual boundary is defined as a line by shifting the horizontal CTU boundary with "N" samples as shown in FIG. 22, with N equal to 4 for the Luma component and 2 for the Chroma component.

Figure 21:
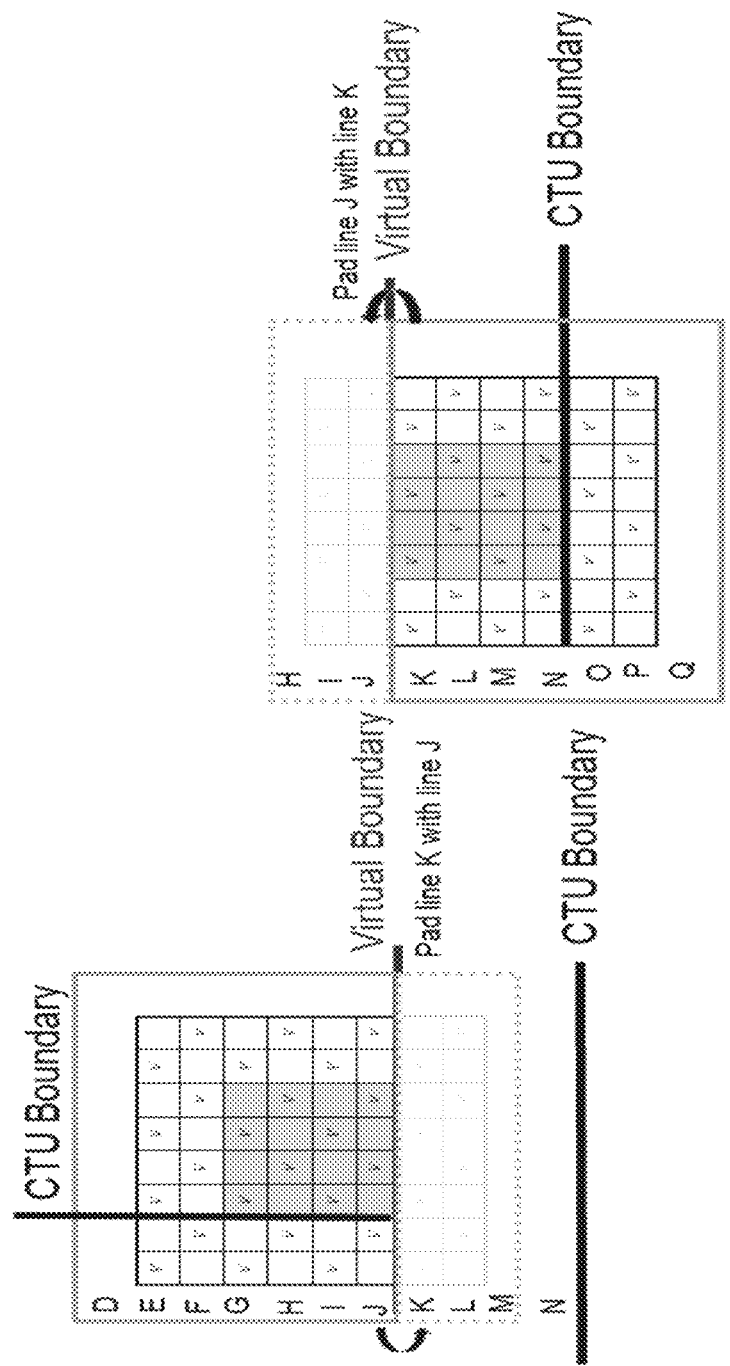
FIG. 21 shows an example of modified block classification at virtual boundaries.

Modified block classification is applied for the Luma component as depicted in FIG. 21. For the 1D Laplacian gradient calculation of the 4×4 block above the virtual boundary, only the samples above the virtual boundary are used. Similarly for the 1D Laplacian gradient calculation of the 4×4 block below the virtual boundary, only the samples below the virtual boundary are used. The quantization of activity value A is accordingly scaled by taking into account the reduced number of samples used in 1D Laplacian gradient calculation.

For filtering processing, symmetric padding operation at the virtual boundaries are used for both Luma and Chroma components. As shown in FIG. 22, when the sample being filtered is located below the virtual boundary, the neighboring samples that are located above the virtual boundary are padded. Meanwhile, the corresponding samples at the other sides are also padded, symmetrically.

2.16.2 Deblocking Filter

Figure 23:
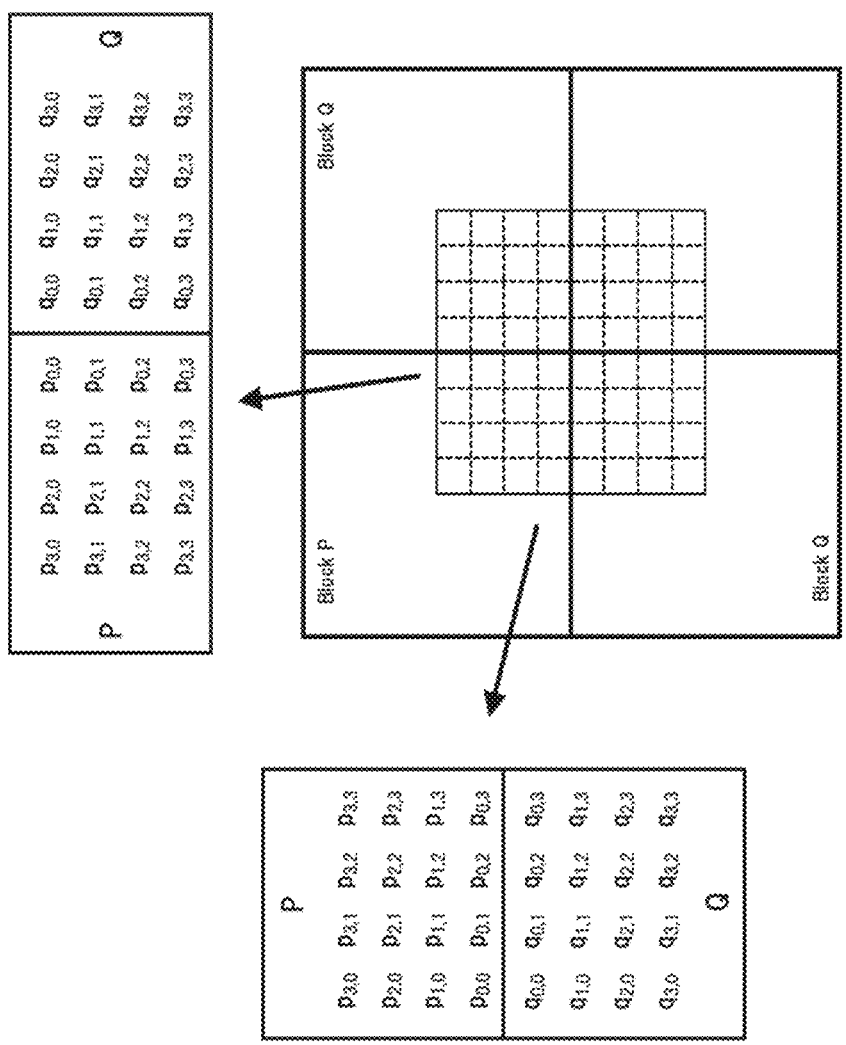
FIG. 23 shows examples of sample position of $p_{i,k}$ and $q_{i,k}$.

In the VTM5, deblocking filtering process is mostly the same to those in HEVC. However, the following modifications are added.

a) The filter strength of the deblocking filter dependent of the averaged luma level of the reconstructed samples.
b) Deblocking tC table extension
c) Stronger deblocking filter for luma
d) Stronger deblocking filter for chroma 2.16.2.1 Filter Strength Dependent on Reconstructed Average Luma Level In HEVC, the filter strength of the deblocking filter is controlled by the variables β and tC which are derived from the averaged quantization parameters qPL. In the VTM5, deblocking filter controls the strength of the deblocking filter by adding offset to qPL according to the luma level of the reconstructed samples. The reconstructed luma level (LL) is derived as follow:

$$LL=((p_{0,0}+p_{0,3}+q_{0,0}+q_{0,3})>>2)/(1<<bitDepth) \quad (3\text{-}15)$$

where, the sample values pi,k and qi,k with i=0 . . . 3 and k=0 and 3 are derived as shown in FIG. 23.

The variable qPL is derived as follows:

$$qP_L=((Qp_Q+Qp_P+1)>>1)+qp\text{Offset} \quad (3\text{-}16)$$

where $Qp_Q$ and $Qp_P$ denote the quantization parameters of the coding units containing the sample $q_{0,0}$ and $p_{0,0}$, respectively. The offset qpOffset dependent on transfer function, the values are signalled in the SPS.

2.16.2.2 Deblocking tC Table Extension

In VTM5, Maximum QP was changed from 51 to 63, and it is desired to reflect corresponding change to deblocking table, which derive values of deblocking parameters tC based on the block QP, The following is updated tC table to accommodate the extension of the QP range.

tC=[0,0,0,0,0,0,0,0,0,0,0,0,0,0,0,0,0,1,1,1,1,1,1,1,1, 1,2,2,2,2,3,3,3,3,4,4,4,5,5,6,6,7,8,9,10,11,13,14, 16,18,20,22,25,28,31,35,39,44,50,56,63,70,79, 88,99]

2.16.2.3 Stronger Deblocking Filter for Luma

A bilinear filter (stronger deblocking filter) is used when samples at either one side of a boundary belong to a large block. A sample belonging to a large block is defined as when the width is larger than or equal to 32 for a vertical edge, and when height is larger than or equal to 32 for a horizontal edge. Block boundary samples $p_i$ for i=0 to Sp−1 and $q_i$ for j=0 to Sq−1 are then replaced by linear interpolation as follows:

$$p_i'=(f_i*\text{Middle}_{s,t}+(64-f_i)*P_s+32)>>6), \text{clipped to } p_i \pm \text{tcPD}_i \quad (3\text{-}17)$$

$$q_j'=(g_j*\text{Middle}_{s,t}+(64-g_j)*Q_s+32)>>6), \text{clipped to } q_j \pm \text{tcPD}_j \quad (3\text{-}18)$$

where $\text{tcPD}_i$ and $\text{tcPD}_j$ term is a position dependent clipping and $g_j$, $f_i$, $\text{Middle}_{s,t}$, $P_s$ and $Q_s$ are given below:

TABLE 2-6

Derivation of stronger deblocking parameters for luma

| Sp, Sq | |
|---|---|
| 7, 7 (p side: 7, q side: 7) | $f_i = 59 - i * 9$, can also be described as f = {59, 50, 41, 32, 23, 14, 5}<br>$g_j = 59 - j * 9$, can also be described as g = {59, 50, 41, 32, 23, 14, 5}<br>$\text{Middle}_{7,7} = (2 * (p_0 + q_0) + p_1 + q_1 + p_2 + q_2 + p_3 + q_3 + p_4 + q_4 + p_5 + q_5 + p_6 + q_6 + 8) >> 4$<br>$P_7 = (p_6 + p_7 + 1) >> 1, Q_7 = (q_6 + q_7 + 1) >> 1$ |
| 7, 3 (p side: 7 q side: 3) | $f_i = 59 - i * 9$, can also be described as f = {59, 50, 41, 32, 23, 14, 5}<br>$g_j = 53 - j * 21$, can also be described as g = {53, 32, 11}<br>$\text{Middle}_{7,3} = (2 * (p_0 + q_0) + q_0 + 2 * (q_1 + q_2) + p_1 + q_1 + p_2 + p_3 + p_4 + p_5 + p_6 + 8) >> 4$<br>$P_7 = (p_6 + p_7 + 1) >> 1, Q_3 = (q_2 + q_3 + 1) >> 1$ |
| 3, 7 (p side: 3 q side: 7) | $g_j = 59 - j * 9$, can also be described as g = {59, 50, 41, 32, 23, 14, 5}<br>$f_i = 53 - i * 21$, can also be described as f = {53, 32, 11}<br>$\text{Middle}_{3,7} = (2 * (q_0 + p_0) + p_0 + 2 * (p_1 + p_2) + q_1 + p_1 + q_2 + q_3 + q_4 + q_5 + q_6 + 8) >> 4$<br>$Q_7 = (q_6 + q_7 + 1) >> 1, P_3 = (p_2 + p_3 + 1) >> 1$ |
| 7, 5 (p side: 7 q side: 5) | $g_j = 58 - j * 13$, can also be described as g = {58, 45, 32, 19, 6}<br>$f_i = 59 - i * 9$, can also be described as f = {59, 50, 41, 32, 23, 14, 5}<br>$\text{Middle}7,5 = (2 * (p_0 + q_0 + p_1 + q_1) + q_2 + p_2 + q_3 + p_3 + q_4 + p_4 + q_5 + p_5 + 8) >> 4$<br>$Q_5 = (q_4 + q_5 + 1) >> 1, P_7 = (p_6 + p_7 + 1) >> 1$ |
| 5, 7 (p side: 5 q side: 7) | $g_j = 59 - j * 9$, can also be described as g = {59, 50, 41, 32, 23, 14, 5}<br>$f_i = 58 - i * 13$, can also be described as f = {58, 45, 32, 19, 6}<br>$\text{Middle}_{5,7} = (2 * (q_0 + p_0 + p_1 + q_1) + q_2 + p_2 + q_3 + p_3 + q_4 + p_4 + q_5 + p_5 + 8) >> 4$<br>$Q_7 = (q_6 + q_7 + 1) >> 1, P_5 = (p_4 + p_5 + 1) >> 1$ |
| 5, 5 (p side: 5 q side: 5) | $g_j = 58 - j * 13$, can also be described as g = {58, 45, 32, 19, 6}<br>$f_i = 58 - i * 13$, can also be described as f = {58, 45, 32, 19, 6}<br>$\text{Middle}5,5 = (2 * (q_0 + p_0 + p_1 + q_1 + q_2 + p_2) + q_3 + p_3 + q_4 + p_4 + 8) >> 4$<br>$Q_5 = (q_4 + q_5 + 1) >> 1, P_5 = (p_4 + p_5 + 1) >> 1$ |

TABLE 2-6-continued

Derivation of stronger deblocking parameters for luma

| | |
|---|---|
| 5, 3 (p side: 5 q side: 3) | $g_j = 53 - j * 21$, can also be described as g = {53, 32, 11} <br> $f_i = 58 - i * 13$, can also be described as f = {58, 45, 32, 19, 6} <br> Middle$_{5,3}$ = $(q_0 + p_0 + p_1 + q_1 + q_2 + p_2 + q_3 + p_3 + 4) \gg 3$ <br> $Q_3 = (q_2 + q_3 + 1) \gg 1$, $P_5 = (p_4 + p_5 + 1) \gg 1$ |
| 3, 5 (p side: 3 q side: 5) | $g_j = 58 - j * 13$, can also be described as g = {58, 45, 32, 19, 6} <br> $f_i = 53 - i * 21$, can also be described as f = {53, 32, 11} <br> Middle$_{3,5}$ = $(q_0 + p_0 + p_1 + q_1 + q_2 + p_2 + q_3 + p_3 + 4) \gg 3$ <br> $Q_5 = (q_4 + q_5 + 1) \gg 1$, $P_3 = (p_2 + p_3 + 1) \gg 1$ |

Above mentioned stronger luma filters are used only if all of the Condition1, Condition 2 and Condition 3 are TRUE. The condition 1 is the "large block condition". This condition detects whether the samples at P-side and Q-side belong to large blocks. The condition 2 and condition 3 are determined by:

Condition2=$(d<\beta)$?TRUE:FALSE

Condition3=StrongFilterCondition=($dpq$ is less than $(\beta\gg2)$,$sp_3+sq_3$ is less than $(3*\beta\gg5)$, and Abs $(p_0-q_0)$ is less than $(5*t_C+1)\gg1$)?TRUE: FALSE

2.16.2.4 Strong Deblocking Filter for Chroma

The following strong deblocking filter for chroma is defined:

$$p_2'=(3*p_3+2*p_2+p_1+p_0+q_0+4)\gg3 \quad (3\text{-}19)$$

$$p_1'=(2*p_3+p_2+2*p_1+p_0+q_0+q_1+4)\gg3 \quad (3\text{-}20)$$

$$p_0'=(p_3+p_2+p_1+2*p_0+q_0+q_1+q_2+4)\gg3 \quad (3\text{-}21)$$

The above chroma filter performs deblocking on an 8×8 chroma sample grid. The chroma strong filters are used on both sides of the block boundary. Here, the chroma filter is selected when both sides of the chroma edge are greater than or equal to 8 (in unit of chroma sample), and the following decision with three conditions are satisfied. The first one is for decision of boundary strength as well as large block. The second and third one are basically the same as for HEVC luma decision, which are on/off decision and strong filter decision, respectively. In the first decision, boundary strength (bS) is modified for chroma filtering as shown in Table 1. The condition in Table 3-12 are checked sequentially. If a condition is satisfied then the remaining conditions with lower priorities are skipped.

TABLE 2-7

The modified boundary strength

| Priority | Conditions | Y | U | V |
|---|---|---|---|---|
| 5 | At least one of the adjacent blocks is intra | 2 | 2 | 2 |
| 4 | At least one of the adjacent blocks has non-zero transform coefficients | 1 | 1 | 1 |
| 3 | Absolute difference between the motion vectors that belong to the adjacent blocks is greater than or equal to one integer luma sample | 1 | N/A | N/A |
| 2 | Motion prediction in the adjacent blocks refers to vectors is different | 1 | N/A | N/A |
| 1 | Otherwise | 0 | 0 | 0 |

Chroma deblocking is performing when bS is equal to 2, or bS is equal to 1 when a large block boundary is detected. The second and third condition is basically the same as HEVC luma strong filter decision.

2.16.2.5 Deblocking Filter for Subblock Boundary

In VTM5, deblocking filter is enabled on 8×8 grid as HEVC. The deblocking filtering process are applied to the CU boundaries as well as the subblock boundaries, which are aligned with 8×8 grid. The subblock boundaries include the prediction unit boundaries introduced by STMVP and affine modes, and the transform unit boundaries introduced by subblock transform (SBT) and ISP modes.

For SBT and ISP subblocks on 8×8 grid, the same logic in TU in HEVC deblocking filter is applied. The deblocking filter is applied TU boundary on 8×8 grid when there are non-zero coefficients in either subblock across the edge.

For SbTMVP and affine subblocks on 8×8 grid, the same logic in PU in HEVC deblocking filter is applied. For PU boundaries, the deblocking filter is applied on 8×8 grid with the consideration of the difference between motion vectors and reference pictures of the neighboring subblock.

2.16.3 Luma Mapping with Chroma Scaling (LMCS)

Figure 24:
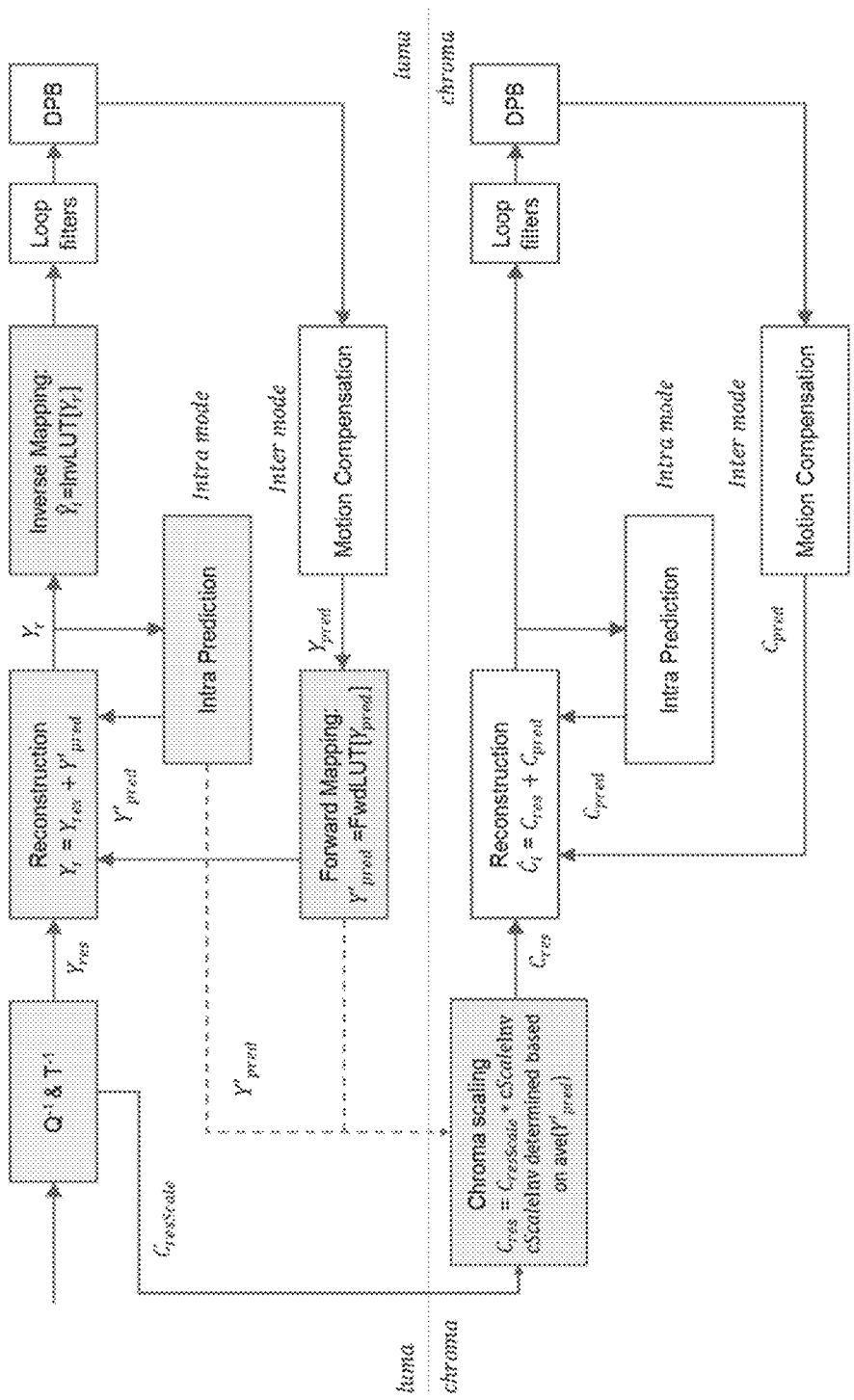
FIG. 24 shows an example of luma mapping with chroma scaling architecture.

In VTM5, a coding tool called the luma mapping with chroma scaling (LMCS) is added as a new processing block before the loop filters. LMCS has two main components: 1) in-loop mapping of the luma component based on adaptive piecewise linear models; 2) for the chroma components, luma-dependent chroma residual scaling is applied. FIG. 24 shows the LMCS architecture from decoder's perspective. The light-blue shaded blocks in FIG. 24 indicate where the processing is applied in the mapped domain; and these include the inverse quantization, inverse transform, luma intra prediction and adding of the luma prediction together with the luma residual. The unshaded blocks in FIG. 24 indicate where the processing is applied in the original (i.e., non-mapped) domain; and these include loop filters such as deblocking, ALF, and SAO, motion compensated prediction, chroma intra prediction, adding of the chroma prediction together with the chroma residual, and storage of decoded pictures as reference pictures. The light-yellow shaded blocks in FIG. 24 are the new LMCS functional blocks, including forward and inverse mapping of the luma signal and a luma-dependent chroma scaling process. Like most other tools in VVC, LMCS can be enabled/disabled at the sequence level using an SPS flag.

2.16.4 Luma Mapping with Piecewise Linear Model

The in-loop mapping of the luma component adjusts the dynamic range of the input signal by redistributing the codewords across the dynamic range to improve compression efficiency. Luma mapping makes use of a forward mapping function, FwdMap, and a corresponding inverse mapping function, InvMap. The FwdMap function is signalled using a piecewise linear model with 16 equal pieces. InvMap function does not need to be signalled and is instead derived from the FwdMap function.

The luma mapping model is signalled at the tile group level. A presence flag is signalled first. If luma mapping model is present in the current tile group, corresponding piecewise linear model parameters are signalled. The piecewise linear model partitions the input signal's dynamic range into 16 equal pieces, and for each piece, its linear mapping parameters are expressed using the number of codewords assigned to that piece. Take 10-bit input as an example. Each of the 16 pieces will have 64 codewords assigned to it by default. The signalled number of codewords is used to calculate the scaling factor and adjust the mapping function accordingly for that piece. At the tile group level, another LMCS enable flag is signalled to indicate if the LMCS process as depicted in FIG. 24 is applied to the current tile group.

Each i-th piece, i=0 . . . 15, of the FwdMap piecewise linear model is defined by two input pivot points InputPivot[ ] and two output (mapped) pivot points MappedPivot[ ].

The InputPivot[ ] and MappedPivot[ ] are computed as follows (assuming 10-bit video):
1) OrgCW=64
2) For i=0:16, InputPivot[i]=i*OrgCW
3) For i=0:16, MappedPivot[i] is calculated as follows:
   MappedPivot[0]=0; for (i=0; i<16; i++) MappedPivot[i+1]=MappedPivot[i]+SignalledCW[i]
where SignalledCW[i] is the signalled number of codewords for the i-th piece.

As shown in FIG. 24, for an inter-coded block, motion compensated prediction is performed in the mapped domain. In other words, after the motion-compensated prediction block $Y_{pred}$ is calculated based on the reference signals in the DPB, the FwdMap function is applied to map the luma prediction block in the original domain to the mapped domain, $Y'_{pred}=FwdMap(Y_{pred})$. For an intra-coded block, the FwdMap function is not applied because intra prediction is performed in the mapped domain. After reconstructed block $Y_r$ is calculated, the InvMap function is applied to convert the reconstructed luma values in the mapped domain back to the reconstructed luma values in the original domain ($\hat{Y}_i=InvMap(Y_r)$). The InvMap function is applied to both intra- and inter-coded luma blocks.

The luma mapping process (forward and/or inverse mapping) can be implemented using either look-up-tables (LUT) or using on-the-fly computation. If LUT is used, then FwdMapLUT and InvMapLUT can be pre-calculated and pre-stored for use at the tile group level, and forward and inverse mapping can be simply implemented as FwdMap($Y_{pred}$)=FwdMapLUT[$Y_{pred}$] and InvMap($Y_r$)=InvMapLUT[$Y_r$], respectively. Alternatively, on-the-fly computation may be used. Take forward mapping function FwdMap as an example. In order to figure out the piece to which a luma sample belongs, the sample value is right shifted by 6 bits (which corresponds to 16 equal pieces). Then, the linear model parameters for that piece are retrieved and applied on-the-fly to compute the mapped luma value. Let i be the piece index, a1, a2 be InputPivot[i] and InputPivot[i+1], respectively, and b1, b2 be MappedPivot[i] and MappedPivot[i+1], respectively. The FwdMap function is evaluated as follows:

$$FwdMap(Y_{pred})=((b2-b1)/(a2-a1))*(Y_{pred}-a1)+b1 \quad (3-22)$$

The InvMap function can be computed on-the-fly in a similar manner, except that conditional checks need to be applied instead of a simple right bit-shift when figuring out the piece to which the sample value belongs, because the pieces in the mapped domain are not equal sized.

2.16.4.1 Luma-Dependent Chroma Residual Scaling

Chroma residual scaling is designed to compensate for the interaction between the luma signal and its corresponding chroma signals. Whether chroma residual scaling is enabled or not is also signalled at the tile group level. If luma mapping is enabled and if dual tree partition (also known as separate chroma tree) is not applied to the current tile group, an additional flag is signalled to indicate if luma-dependent chroma residual scaling is enabled or not. When luma mapping is not used, or when dual tree partition is used in the current tile group, luma-dependent chroma residual scaling is disabled. Further, luma-dependent chroma residual scaling is always disabled for the chroma blocks whose area is less than or equal to 4.

Chroma residual scaling depends on the average value of the corresponding luma prediction block (for both intra- and inter-coded blocks). Denote avgY' as the average of the luma prediction block. The value of $C_{ScaleInv}$ is computed in the following steps:
1) Find the index $Y_{Idx}$ of the piecewise linear model to which avgY' belongs based on the InvMap function.
2) $C_{ScaleInv}$=cScaleInv[$Y_{Idx}$], where cScaleInv[ ] is a pre-computed 16-piece LUT.

If the current block is coded as intra, CIIP, or intra block copy (IBC, a.k.a. current picture referencing (CPR)) modes, avgY' is computed as the average of the intra-, CIIP-, or IBC-predicted luma values; otherwise, avgY' is computed as the average of the forward mapped inter predicted luma values ($Y'_{pred}$ in FIG. 24). Unlike luma mapping, which is performed on the sample basis, $C_{ScaleInv}$ is a constant value for the entire chroma block. With $C_{ScaleInv}$, chroma residual scaling is applied as follows:

Encoder side: $C_{ResScale}=C_{Res}*C_{Scale}=C_{Res}/C_{ScaleInv}$

Decoder side: $C_{Res}=C_{ResScale}/C_{Scale}=C_{ResScale}*C_{ScaleInv}$ 2.16.4.2 Encoder-Side LMCS Parameter Estimation A non-normative reference implementation is provided in the VTM5.0 encoder to estimate the LMCS model parameters. Because VTM anchors handle standard dynamic range (SDR) and high dynamic range (HDR) differently, the reference algorithm in VTM5.0 is designed differently for SDR and HDR sequences. For SDR, the encoder algorithm is based on local luma variance and optimized for PSNR metrics. For HDR PQ sequences, the encoder algorithm is based on luma values and optimized for wPSNR (weighted PSNR) metrics.

2.16.4.2.1 LMCS Parameter Estimation for SDR

The basic idea of the VTM5.0 reference implementation for SDR is to assign pieces with more codewords to those dynamic range segments that have lower than average variance, and to assign fewer codewords to those dynamic range segments that have higher than average variance. In this way, smooth areas of the picture will be coded with more codewords than average, and vice versa.

For SDR test sequences, the reference algorithm performs the following signal analysis:
1) Statistics of the input video are collected and analyzed assuming 10-bit internal coding bit-depth is used. If the internal coding bit-depth is not 10-bit, then bit-depth is first normalized to 10-bit.

2) Divide the dynamic range of [0, 1023] into 32 equal pieces.
3) For each luma sample location in the picture, the local spatial variance of luma sample values is calculated using a 5×5 neighborhood centered on the current position. Denote the specific piece (out of the 32 pieces) to which the current luma sample value belongs asp. This local variance is thus associated with the p-th piece.
4) For each of the 32 pieces, calculate the average local spatial variance (bin_var)
5) Set two thresholds Thr1, Thr2 based on sorted bin_var statistics and the cumulative distribution function.
6) Allocate one of four possible numbers of codewords to each piece depending on the bin_var statistic:
   a. if bin_var=0, allocate 0 codewords to the piece
   b. if bin_var<Thr1, allocate 36, 38, or 40 codewords depending on statistics
   c. if bin_var>Thr2, allocate 28 or 32 codewords depending on statistics
   d. otherwise, allocate the default number of 32 codewords
7) If the total number of allocated codewords exceeds 1023, adjust the total number of codewords to be equal 1023
8) If internal bit-depth is not 10-bit, normalize the number of codewords for each piece based on the actual internal bit-depth.
9) Calculate the number of codewords for 16 equal pieces SignalledCW[i], i=0 . . . 15 by combining the numbers of codewords assigned to two adjacent pieces in 32-piece allocation. For example, the 0-th piece and the $1^{st}$ piece are combined, the $2^{nd}$ piece and $3^{rd}$ piece are combined, and so on.
10) The SignalledCW [i] values are signaled at the tile group level.

When LMCS is applied, sum of squared errors (SSE) is used for luma for intra (I) tile groups and weighted SSE is used for luma for inter (P or B) tile groups. The weight, w_lmcs(k), is derived as follows based on the codeword assignment of the k-th piece in the piecewise linear model.

$$w\_lmcs[k]=(SignalledCW[k]/OrgCW)^2 \quad (3\text{-}23)$$

SSE is always used for chroma mode decision.

In terms of picture-level decision whether to enable LMCS or not, different considerations are given to the different coding configurations. For the Random Access (RA) test conditions, picture analysis is performed for each intra random access picture (IRAP) picture to obtain the bin_var values as explained above. Then, if all the bin_var values are considered low (i.e. below a threshold), then LMCS is disabled for the IRAP picture. For the other inter-coded pictures in the same IRAP period, it is determined whether all the bin_var values are within a narrow range (i.e., the difference between the max bin_var value and the min bin_var value is relatively small). If the bin_var range is narrow, then LMCS is enabled only for the pictures with temporal layer ID equal to 0. Otherwise, if the bin_var range is not narrow, then LMCS is enabled for all the inter-coded pictures.

For All Intra (AI) and low delay (LD) test conditions, LMCS is enabled for all pictures. For AI, the LCMS parameter estimation is performed for all pictures, and the model parameters are sent for all pictures. For LD, the LCMS parameters are estimated at every second interval, and the model parameters are sent in the tile groups of those pictures.

2.16.4.2.2 LMCS Parameter Estimation for HDR

In the JVET HDR common test conditions (CTC), two types of HDR sequences are included: perceptual quantize (PQ) and hybrid log gamma (HLG). These two types of sequences are treated differently in the VTM reference encoder. For the PQ sequences, the VTM reference encoder applies luma-based QP adaptation and allows the QP value to vary spatially. For the HLG sequences, static quantization is used. Correspondingly, LMCS is applied differently for these two types of sequences as well. For PQ, LMCS is applied using a default LMCS mapping function calculated as explained below. For HLG, LMCS is disabled.

The VTM reference encoder uses wPSNR (weighted PSNR) instead of the conventional PSNR as an objective quality metric in the HDR CTC. The default HDR LMCS curve is calculated to match the dQP function to maximize the wPSNR metric.

The luma-based QP adaptation derives a local delta QP (dQP) value per CTU based on the average of luma sample values:

$$dQP(Y)=\max(-3,\min(6,0.015*Y-1.5-6)) \quad (3\text{-}24)$$

where Y is the average luma value, Y ∈ [0, max Y], max Y=1023 for 10-bit video. The weight (W_SSE) used in wPSNR calculation is derived based on dQP values:

$$W\_SSE(Y)=2^{\wedge}(dQP(Y)/3) \quad (3\text{-}25)$$

The default LMCS curve is calculated based on luma sample value as follows:
1) Compute the slope of the reshaping curve: slope[Y]= sqrt(W_SSE(Y))=2^(dQP(Y)/6).
2) If signal is in narrow range (also called a standard range), set slope[Y]=0 for Y∈[0,64), or Y∈(940,1023].
3) Calculate F[Y] by integrating slope[Y], F[Y+1]=F[Y]+ slope[Y], Y=0 . . . max Y-1
4) FwdLUT[Y] is calculated by normalizing F[Y] to [0 max Y], FwdLUT[Y]=clip3(0, max Y, round(F[Y] *max Y/F[max Y]))
5) Calculate the number of codewords for the 16 equal pieces SignalledCW[i], i=0 . . . 15, as follows;

SignalledCW[15]=FwdLUT[1023]-FwdLUT[960];

for(i=14;i>=0;i--)

SignalledCW[i]=FwdLUT[(i+1)*OrgCW]-FwdLUT [i*OrgCW];

In terms of rate distortion optimized mode decision at the encoder, when LMCS is applied, for an intra (I) tile group, SSE is used for luma and weighted SSE is used for chroma as the distortion measure. For an inter (P or B) tile group, weighted SSE is used for both luma and chroma. LCMS is applied to all tile groups.

3 Examples of Technical Limitations of Conventional Art

Several problems are observed on a block coded with palate mode or its variants (e.g. PCIP or CPM).
1. The palette mode may need to be specially treated in the deblocking process.
2. The CPM and/or PCIP may be treated as an intra prediction mode for better coding efficiency.
3. The MV/BV of a block coded with CPM may be used as a MV/BV prediction of successive blocks for coding efficiency.

4. The intra prediction direction of a block coded with PCIP may be used as an intra mode prediction of successive blocks for coding efficiency.
5. As in VTM, the chroma CPM needs to perform motion vector derivation at sub block level, which increases the complexity.
6. The signaling of chroma PCIP does not consider the availability of chroma IBC mode.
7. When non-transform mode (i.e., a block is not coded with transform; or coded with identity transform), e.g. transform skip, bdpcm mode is used, some QPs may be inefficient.
8. How to handle DM mode for chroma, when the corresponding luma block used to derive the mode is coded in IBC, is not clear.

4 Example Embodiments

The listing of embodiments below should be considered as examples to explain general concepts. These embodiments should not be interpreted in a narrow way. Furthermore, the listed techniques can be combined in any manner, for example, to improve coding efficiency and reduce decoding or coding complexity.

The methods described below may be applied to current palette mode, PCIP, CPM or other coding methods that may rely on palette for residual coding.

1. The palette mode may be treated as a separate mode (e.g. MODE_PLT) in addition to existing coding modes (e.g., intra, inter, IBC) in the deblocking process.
    a. In one example, the boundary strength may be set to 0 if the blocks at P-side and Q-side are both coded with palette mode.
    b. In one example, if a block A at one side is coded with palette mode and a block B at the other side is not coded with palette mode, the boundary strength may only depend on the information of the block B.
        i. In one example, the block B is coded with intra mode. In such a case, the boundary strength may be set to 2.
        ii. In one example, the block B is coded with IBC mode. In such a case, the boundary strength may be set to 1 if the block B has one non-zero coefficient at least.
        iii. In one example, the block B is coded with IBC mode. In such a case, the boundary strength may be set to 0 if all coefficients in the block B are 0.
    c. In one example, the above methods may be also applied on PCIP, CPM or other palette-related methods.
2. CPM may be treated in the same way as the IBC mode in the deblocking process (e.g., the boundary strength derivation).
    a. Alternatively, CPM may be treated in the same way as the Palette mode in the deblocking process (e.g., the boundary strength derivation).
    b. Alternatively, CPM may be treated in the same way as the intra mode in the deblocking process (e.g., the boundary strength derivation).
    c. Alternatively, how to apply deblocking filter may depend on the usage of CPM.
3. PCIP may be treated in the same way as the intra mode in the deblocking process (e.g., the boundary strength derivation).
    a. Alternatively, PCIP may be treated in the same way as the Palette mode in the deblocking process (e.g., the boundary strength derivation).
    b. Alternatively, how to apply deblocking filter may depend on the usage of PCIP.
4. The coded block flag of a palette coded block/CPM/PCIP may be set to a fixed value or depend on the existence of escape pixels in the block.
    a. In one example, the coded block flag may be set to 0.
    b. In one example, the coded block flag may be set to 1.
    c. In one example, the coded block flag may be set to 0 if the current block does not have any escape pixels.
    d. In one example, the coded block flag may be set to 1 if the current block has at least one escape pixel.
5. The samples coded with palette mode, and/or CPM and/or PCIP may be not deblocked.
    a. In one example, if a block at P-side or Q-side is coded with CPM and/or PCIP, the samples at P-side and/or Q-side may be not deblocked.
    b. In one example, if a block at P-side is coded with CPM and/or PCIP and a block at Q-side is not coded with these modes, the samples at P-side may be not deblocked, vice versa.
    c. In one example, for the CPM mode, the deblocking filters may be only performed on the samples copied from IBC predictions. Other samples from the palette entries may be not deblocked.
    d. In one example, for the PCIP mode, the deblocking filters may be only performed on the samples copied from intra predictions. Other samples from the palette entries may be not deblocked.
6. Indication of usage of CPM for a transform unit/prediction unit/coding block/region may be coded separately from the existing prediction modes which may include the intra mode, inter mode, IBC mode and palette mode
    a. In one example, the prediction modes related syntax elements (e.g cu_skip_flag, pred_mode_flag, pred_mode_ibc_flag and cu_palette_flag) may be coded before the indication of usage of CPM.
        i. Alternatively, furthermore, the indication of usage of CPM may be conditionally signaled based on the prediction mode.
            1. In one example, when the prediction mode is the intra block copy mode (i.e., MODE_IBC), the signaling of the indication of usage of CPM mode may be skipped. Furthermore, the indication of usage of CPM may be inferred to be false when the current prediction mode is MODE_IBC.
7. Whether to signal CPM and/or PCIP related syntax for a color component may depend on the partition structure and/or color format and/or separate plane coding.
    a. In one example, for a chroma component, signaling of CPM and/or PCIP related syntax may be skipped if single tree is applied.
    b. Alternatively, for a chroma component, CPM and/or PCIP related syntax may be signaled if dual tree is applied.
    c. Alternatively, signaling of CPM and/or PCIP related syntax may be skipped for chroma blocks if color format is 4:0:0.
        i. Alternatively, furthermore, they may still be signaled, but are not used in the decoding process.
8. The signaling of the indication of usage of CPM mode for chroma blocks may be based on the coded information (e.g., prediction mode) of one or more selected blocks in the corresponding luma block.
  a. In one example, the indication of CPM for a chroma block may be signaled when at least one of the selected luma blocks is coded with IBC mode.
    i. Alternatively, the indication of CPM for a chroma block may be signaled when all of the selected luma blocks are coded with IBC mode.
    ii. Alternatively, the indication of usage of chroma CPM may be not signaled if a selected block is not coded with intra block copy mode (i.e., MODE_IBC). Furthermore, the indication of usage of CPM may be inferred to be default values (e.g., false) when the prediction mode of a selected block is not MODE_IBC.
    iii. Alternatively, the indication of usage of chroma CPM may be not signaled if all of selected blocks are not coded with intra block copy mode (i.e., MODE_IBC). Furthermore, the indication of usage of CPM may be inferred to be default values (e.g., false) when all of the selected blocks are not coded with IBC mode.
  b. In one example, the size of the selected luma block may be the smallest CU/PU/TU size or the unit for motion/mode storage (such as 4×4).
  c. In one example, a selected luma block may be the CU/PU/TU covering the center, top left, top right, bottom left or bottom right position of the corresponding luma region. An example of a corresponding luma region is shown in FIG. 4-1.
    i. In one example, suppose the top-left coordinate of current chroma block is (x0, y0), width and height of the current chroma block is w0 and h0, respectively. The coordinate of top-left sample in the corresponding luma region, width and height of the corresponding luma region may be scaled according to the color format.
      a) for the 4:2:0 color format, the top-left coordinate of the collocated luma region is (2*x0, 2*y0), and its width and height are 2*w0 and 2*h0, respectively.
      b) for the 4:4:4 color format, the top-left coordinate of the collocated luma region is (x0, y0), and its width and height are w0 and h0, respectively.
    ii. Suppose the top-left coordinate of the collocated luma region is (x,y) and its width and height are W and H, then coordinate of the center position may be:
      a) (x+W/2, y+H/2)
      b) (x+W/2−1, y+H/2−1)
      c) (x+W/2, y+H/2−1)
      d) (x+W/2−1, y+H/2)
    iii. Suppose the top-left coordinate of the collocated luma region is (x,y) and its width and height are W and H, then coordinate of the top-left position may be (x,y).
    iv. Suppose the top-left coordinate of the collocated luma region is (x,y) and its width and height are W and H, then coordinate of the top-right position may be:
      a) (x+W, y)
      b) (x+W−1, y)
    v. Suppose the top-left coordinate of the collocated luma region is (x,y) and its width and height are W and H, then coordinate of the bottom-left position may be:
      a) (x, y+H)
      b) (x, y+H−1)
    vi. Suppose the top-left coordinate of the collocated luma region is (x,y) and its width and height are W and H, then coordinate of the bottom-right position may be:
      a) (x+W, y+H)
      b) (x+W, y+H−1)
      c) (x+W−1, y+H)
      d) (x+W−1, y+H−1)

Figure 13:
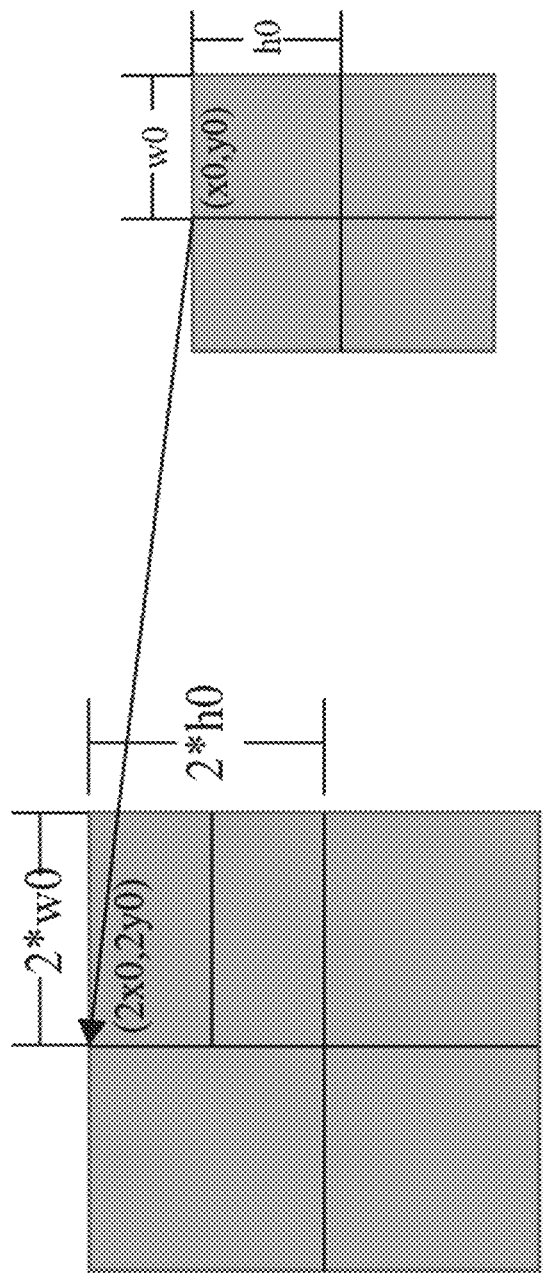
FIG. 13 shows an example of a corresponding luma region of a chroma block.

FIG. 13 shows an example of a corresponding luma region.

9. The signaling of usage of chroma PCIP mode may depend on coded information of one or more selected luma blocks.
  a. In one example, if a selected block in the corresponding luma block is coded with intra block copy mode (i.e., MODE_IBC), the indication of usage of chroma PCIP may be not signaled. Furthermore, the indication of usage of PCIP may be inferred to be false when the prediction mode of a selected block of corresponding luma block is MODE_IBC.
    i. Alternatively, the indication of PCIP for a chroma block may be not signaled when all of the selected luma blocks are coded with IBC mode.
    ii. Alternatively, the indication of PCIP for a chroma block may be not signaled when all samples in the corresponding luma region are coded with IBC mode.
  b. In one example, the size of the selected luma block may be the smallest CU/PU/TU size or the unit for motion/mode storage (such as 4×4).
  c. In one example, a selected luma block may be the CU/PU/TU covering the center, top left, top right, bottom left or bottom right position of the corresponding luma region as shown in FIG. 4-1.
    i. In one example, suppose the top-left coordinate of current chroma block is (x0, y0), width and height of the current chroma block is w0 and h0, respectively. The coordinate of top-left sample in the corresponding luma region, width and height of the corresponding luma region may be scaled according to the color format.
      a) for the 4:2:0 color format, the top-left coordinate of the collocated luma region is (2*x0, 2*y0), its width and height are 2*w0 and 2*h0, respectively.
      b) for the 4:4:4 color format, the top-left coordinate of the collocated luma region is (x0, y0), its width and height are w0 and h0, respectively.
    ii. Suppose the top-left coordinate of the collocated luma region is (x,y) and its width and height are W and H, then coordinate of the center position may be:
      a) (x+W/2, y+H/2)
      b) (x+W/2−1, y+H/2−1)
      c) (x+W/2, y+H/2−1)
      d) (x+W/2−1, y+H/2)
    iii. Suppose the top-left coordinate of the collocated luma region is (x,y) and its width and height are W and H, then coordinate of the top-left position may be (x,y).

iv. Suppose the top-left coordinate of the collocated luma region is (x,y) and its width and height are W and H, then coordinate of the top-right position may be:
  a) (x+W, y)
  b) (x+W−1, y)
v. Suppose the top-left coordinate of the collocated luma region is (x,y) and its width and height are W and H, then coordinate of the bottom-left position may be:
  a) (x, y+H)
  b) (x, y+H−1)
vi. Suppose the top-left coordinate of the collocated luma region is (x,y) and its width and height are W and H, then coordinate of the bottom-right position may be:
  a) (x+W, y+H)
  b) (x+W, y+H−1)
  c) (x+W−1, y+H)
  d) (x+W−1, y+H−1)

10. It is proposed to treat CPM mode as a separate prediction mode (e.g., denoted by MODE_PLT_IBC) in addition to existing prediction modes.
  a. In one example, the prediction modes may include intra, intra block copy, palette modes and CPM mode for intra slices/I pictures/intra tile groups.
  b. Alternatively, the prediction modes may include intra, palette modes, CPM modes for intra slices/I pictures/intra tile groups.
  c. In one example, the prediction modes may include intra, inter, intra block copy, palette modes and CPM modes for inter slices/P and/or B pictures/inter tile groups.
  d. Alternatively, the prediction modes may include at least two of intra, inter, intra block copy, palette mode and CPM mode.
  e. In one example, when the prediction mode is the inter mode (i.e., MODE_INTER), the signaling of the indication of usage of CPM mode may be skipped. Furthermore, the indication of usage of CPM mode may be inferred to be false when the current prediction mode is MODE_INTER.

11. CPM may be treated as a special case to existing prediction mode. In this case, the CPM mode related syntax may be further signaled under certain conditions of usage of existing prediction mode.
  a. In one example, when the prediction mode is the intra mode (i.e., MODE_INTRA), the signaling of CPM related syntax may be skipped. Furthermore, the indication of usage of CPM mode may be inferred to be false when the current prediction mode is MODE_INTRA.
  b. In one example, when the prediction mode is the skip mode (i.e., the skip flag equal to 1), the signaling of the CPM related syntax may be skipped. Furthermore, the indication of usage of CPM may be inferred to be false when the skip mode is employed on the current CU.
  c. In one example, when the prediction mode is the palette mode (e.g. MODE_PLT), the indication of usage of CPM and CPM related syntax may be signaled.
  d. Alternatively, when the prediction mode is the intra mode, inter mode or intra block copy mode, the CPM related syntax may be skipped.
  e. Alternatively, when the prediction mode is the intra mode and not the Pulse-code modulation (PCM) mode, the CPM related syntax may be signaled.
  f. In one example, when the prediction mode is the palette mode (e.g. MODE_PLT), the indication of usage of CPM and CPM related syntax may be signaled before or after the indication of usage of the PCM mode. In one example, when CPM mode is applied, the signaling of CPM related syntax may be signaled.
  g. when the prediction mode is intra mode, inter mode or intra block copy mode, the signaling of CPM related syntax may be skipped.
  h. Alternatively, when the prediction mode is the intra mode and not the Pulse-code modulation (PCM) mode, the CPM related syntax may be signaled.
  i. In one example, when the prediction mode is the intra block copy mode, the CPM related syntax may be signaled.
  j. Alternatively, when the prediction mode is the palette mode, inter mode or intra mode, the signaling of CPM related syntax may be skipped.
  k. The above methods may be also applied on PCIP or other palette related methods.

12. The MV of a block coded with CPM may be also used as a MV prediction for the subsequent blocks.
  a. In one example, the MV of a block coded with CPM may be used as a merge candidate for other blocks.
  b. In one example, the MV of a block coded with CPM may be used as a HMVP candidate for other blocks.
    i. Alternatively, furthermore, the HMVP table may be updated after coding a block coded with CPM.
  c. In one example, the MV of a block coded with CPM may be used as an AMVP candidate for other blocks.
  d. Alternatively, the HMVP table updating process is disallowed after coding one CPM-coded block.
  e. Alternatively, the BV of a CPM-coded block may be disallowed to be used as motion vector predictors for subsequent blocks.

13. The intra prediction direction of a block coded with PCIP may be also used as an intra mode predictor of the subsequent blocks.
  a. In one example, the intra prediction direction of a block coded with PCIP may be used as a MPM mode for subsequent blocks.
    i. In one example, if a block coded with PCIP selects horizontal direction, the intra mode may be set to VER_IDX and may be used as an MPM mode for subsequent blocks.
    ii. In one example, if a block coded with PCIP selects vertical direction, the intra mode may be set to HOR_IDX and may be used as an MPM mode for subsequent blocks.
  b. Alternatively, the intra prediction direction of a CPM-coded block may be disallowed to be used as a MPM for subsequent blocks.

14. Maximum number of entries in the palette to be used may be changed from one video unit (e.g., CTB, CU, PU, TU) to another video unit. Binarization may be changed according to the maximum number of entries in the palette to be used.
  a. In one example, it may depend on the coded information.
    i. In one example, it may depend on the block dimension.
      a) In one example, the sizes of larger block coded with palette mode may have larger maximum number of entries while the sizes of smaller block coded with palette mode may have smaller maximum number of entries.
  b) In one example, for 4×4 blocks, only N0 palette entries may be allowed.
  c) In one example, for 8×4 block and/or 4×8 blocks, only N1 palette entries may be allowed.
  d) In one example, for 8×8 blocks, only N2 palette entries may be allowed.
  e) In one example, for 16×16 blocks, only N3 palette entries may be allowed.
  f) In one example, N0, N1, N2 and N3 are fixed number (e.g. 3, 7 or 15) and they may be same or different.
  g) In one example, the relationship between maximum of palette entries and block dimension is tabulated as follows, where the W and H denote the current block width and block height respectively and Max is an operation to get a larger one between two inputs.

TABLE 4-1

One example of relationship between maximum palette entries and block dimension

| Max(W, H) | Maximum of palette entries |
| --- | --- |
| 4 | 3 |
| 8 | 7 |
| 16 | 15 |
| 32 | 31 |
| 64 | 31 |
| 128 | 31 | h) In one example, the relationship between maximum of palette entries and block dimension is tabulated as follows, where the W and H denote the current block width and block height respectively and Max is a operation to get a larger one between two inputs.

TABLE 4-2

One example of relationship between maximum palette entries and block dimension

| Max(W, H) | Maximum of palette entries |
| --- | --- |
| 4 | 3 |
| 8 | 15 |
| 16 | 15 |
| 32 | 31 |
| 64 | 31 |
| 128 | 31 | b. In one example, it may depend on the color component.
  i. In one example, luma blocks coded with palette mode may have larger maximum number of entries while chroma blocks coded with palette mode may have smaller maximum number of entries.
    a) In one example, the maximum number of entries of luma blocks may be N, thus the maximum number of entries of chroma blocks may be M.
      i. In one example, M is a fixed number (e.g 3, 7 or 15) and M may be smaller than N.
c. In one example, it may depend on partitioning structures, such as dual tree or single tree.

15. It is proposed to disallow scaling matrix (e.g., user-defined scaling matrix) for palette/CPM/PCIP coded blocks.
  a. Alternatively, scaling matrix may be applied to palette/CPM/PCIP coded blocks.
  b. In one example, how to select scaling matrix for palette/CPM/PCIP coded blocks may be performed in the same way as transform skip coded blocks.
16. Context modeling for coding the usage of IBC mode (e.g., cu_skip_flag and/or pred_mode_ibc_flag) may depend on coded information of current block, such as block dimension/block shape/partitioning tree depth (e.g., quad tree (QT)/binary tree (BT)/triple tree (TT)/ multi-type tree (MTT) depth) and/or slice types.
  a. In one example, the contexts for coding the indication of IBC flags may be derived based on the block size.
    i. In one example, the indication of usage of IBC mode under different block size may be signaled by using different contexts.
    ii. Alternatively, the indication of usage of IBC mode of blocks with block size smaller than or no greater than T may use one context. The blocks with other block sizes may use the other contexts (e.g., only one).
    iii. Alternatively, the indication of usage of IBC mode of blocks with block size greater than or no smaller than T may use one context. The blocks with other block sizes may use the other contexts (e.g., only one).
    iv. In one example, T may be based on
      1. Video contents (e.g. screen contents or natural contents)
      2. A message signaled in the DPS/SPS/VPS/PPS/ APS/picture header/slice header/tile group header/Largest coding unit (LCU)/Coding unit (CU)/LCU row/group of LCUs/TU/PU
      3. Indication of the color format (such as 4:2:0, 4:4:4)
      4. Coding tree structure
      5. Slice/tile group type and/or picture type
      6. Color component (e.g. may be only applied on chroma components or luma component)
      7. Temporal layer ID
      8. Profiles/Levels/Tiers of a standard
      9. Signaled to the decoder
  b. In one example, the context modeling for coding the usage of IBC mode may be derived based on the block shape (e.g., square or non-square; ratios between width and height).
    i. Alternatively, the indication of IBC flags under different block shape may be signaled by using different context.
  c. In one example, the context modeling of cu_skip_flag for I slices may be different from that for P/B slices.
    i. In one example, the context modeling of cu_skip_flag may be dependent on the neighboring blocks' cu_skip_flag information. While for PB slices, only one context may be used for coding cu_skip_flag. Or vice versa.
  d. In one example, only one context may be utilized to code the usage of IBC mode.
  e. The above methods may be only applied to those used for a specific slice/picture type 17. The context modeling of cu_skip_flag may depend on whether a neighboring block is coded with IBC mode or not.
   a. In one example, a context may be used when at least one or both of neighboring blocks are coded with IBC mode.
18. Context coding of a bin associated with a first syntax element may depend on the values of a second syntax element associated with neighboring blocks (adjacent or non-adjacent).
   a. In one example, the first syntax element may be that used for indications of combined intra-inter prediction mode/triangular prediction mode.
   b. In one example, the second syntax element may be those related to IBC usage or context coding of a bin associated with a first syntax element may depend on the usage of IBC mode of neighboring blocks.
   c. Alternatively, the message may indicate whether the current slice/tile/sequence is screen content.
19. The coded block flag (cbf) may be inferred for a block coded with QR-BDPCM mode instead of being signaled.
   a. Alternatively, in one example, the cbf may be inferred to 1 on a block coded with QR-BDPCM mode.
   b. The above method may be applied on luma cbf and/or chroma cbf.
20. The chroma DM mode may be not allowed when the corresponding luma block covering the center position of the current chroma block and/or used to derive DM mode is not coded with an intra mode (e.g. MODE_INTRA). Let A be the corresponding luma block to be used in the DM mode derivation process (e.g., the one covering the corresponding center position of the current chroma block).
   a. In one example, the chroma DM mode may be not allowed when A is coded with IBC and/or variance of IBC mode.
   b. In one example, the chroma DM mode may be not allowed when A is coded with palette and/or variance of palette mode.
   c. In one example, the chroma DM mode may be not allowed when A is coded with PCM and/or variance of PCM mode.
   d. In above examples, if the chroma DM mode is not allowed (e.g., due to the prediction mode of corresponding luma block equal to certain mode), the indication of chroma DM mode/or may be not signaled.
      i. Alternatively, the indication of chroma DM mode may be signaled. However, a conformance bitstream should satisfy that when the chroma DM mode is not allowed (e.g., due to the prediction mode of corresponding luma block equal to certain mode), the decoded intra_chroma_pred_mode is not equal to a specific value (e.g., 4 when cross component linear model (CCLM) is off; 7 when CCLM is on).
   e. In one example, the intra prediction mode in the chroma DM mode may be derived based on the intra prediction direction (e.g., bdpcm_dir_flag) of A if A is coded with QR-BDPCM mode.
      i. In one example, the intra prediction mode in the chroma DM mode may be vertical mode (e.g., VER_IDX) if the intra prediction direction of A is vertical (e.g., bdpcm_dir_flag is equal to 1).
      ii. In one example, the intra prediction mode in the chroma DM mode may be horizontal mode (e.g., HOR_IDX) if the intra prediction direction of A is horizontal (e.g., bdpcm_dir_flag is equal to 0).
   f. In one example, the intra prediction mode in the chroma DM mode may be derived based on the usage of compound IBC and Palette mode.
      i. In one example, DM may be set to Planar or Horizontal/Vertical prediction mode.
21. The prediction block of a chroma block with DM mode may be filled by the prediction block generated from an intra prediction method when the corresponding luma block covering the center position of the current chroma block and/or used to derive the DM mode is not coded with an intra mode (e.g. MODE_INTRA). Let A be the corresponding luma block to be used in the DM mode derivation process (e.g., the one covering the corresponding center position of the current chroma block).
   a. In one example, intra prediction method may be that used for vertical intra prediction when A is coded with palette and/or variance of palette mode.
      i. Alternatively, in one example, the predictions of chroma DM mode may be filled by horizontal predictions when A is coded with palette and/or variance of palette mode.
      ii. Alternatively, in one example, the predictions of chroma DM mode may be filled by planar predictions when A is coded with palette and/or variance of palette mode.
      iii. Alternatively, in one example, the predictions of chroma DM mode may be filled by direct current (DC) predictions when A is coded with palette and/or variance of palette mode.
      iv. Alternatively, in one example, the predictions of chroma DM mode may be filled by any intra prediction mode when A is coded with palette and/or variance of palette mode.
   b. In one example, the prediction of a chroma block may be generated based on the intra prediction mode of the neighboring (adjacent or non-adjacent) luma block and/or the intra prediction mode of the neighboring (adjacent or non-adjacent) chroma block in current color component or the other color component.
   c. In one example, the intra prediction method may be corresponding to the intra prediction mode assigned to PCM blocks during MPM list construction.
   d. In one example, the intra prediction method may be corresponding to the intra prediction mode assigned to luma PCM blocks.
   e. In one example, the intra prediction method may be corresponding to the intra prediction mode assigned to chroma PCM blocks.
   f. In one example, the intra prediction method may be corresponding to the $1^{st}$ intra prediction mode in the MPM list of A.
   g. The above methods may be applied when A is coded with IBC and/or variance of IBC mode.
      i. Alternatively, the above methods may be applied when A is coded with PCM and/or variance of PCM mode.
      ii. Alternatively, the above methods may be applied when A is coded with QR-BDPCM and/or variance of QR-BDPCM mode.

22. The prediction block of a chroma block with DM mode may be derived following the way of handling chroma blocks with invalid block vectors.
    a. In one example, the prediction block of a chroma block with DM mode may be filled with default values.
        i. Alternatively, furthermore, the default values may be fixed to be M.
        ii. Alternatively, furthermore, the default values may be dependent on input and/or internal bit-depth.
    b. In one example, the above method may be applied when the prediction mode of the corresponding luma block is not intra mode.
        i. In one example, the above method may be applied when the prediction mode of the corresponding luma block is IBC mode and/or variance of IBC mode.
        ii. In one example, the above method may be applied when the prediction mode of the corresponding luma block is Palette mode and/or variance of Palette mode.
23. A block may have a default intra mode.
    a. In one example, the default mode may be DC/PLANAR/vertical (VER)/horizontal (HOR) mode.
    b. In one example, the default mode may be any intra mode.
    c. In one example, the default mode may be used as a most probable mode (MPM) in the intra modes coding process.
        i. Alternatively, in one example, when fetching the intra modes from neighboring blocks, the default mode of a neighboring block is used if this block and the current block are in different video coding unit (e.g. Tile, slice and brick).
    d. In one example, in the chroma DM mode, the default mode of the corresponding luma block may be used to derive the DM mode.
    e. The above methods may be used if the block is not coded with an intra mode.
        i. Alternatively, the above methods may be used if the block is coded with IBC/Inter/QRDPCM/PCM/Palette mode.
        ii. Alternatively, the above methods may be used if the intra mode of the current block is not decoded.
24. During MPM list construction, if a neighboring block is coded in PCM mode, it may be considered as DC prediction mode.
25. How to apply the TPM and/or TPM blending process and/or storage of motion information may be based on the coded information of neighboring blocks.
    a. In one example, if its neighboring blocks (e.g. left and above neighboring blocks in FIG. 12) are coded with IBC/palette/TS/QR-BDPCM mode, TPM blending process may be disabled for the current block.
    b. In one example, if its neighboring blocks (e.g. left and above neighboring blocks in FIG. 12) are coded with IBC/palette/TS/QR-BDPCM mode, a different blending process/motion storage process for the current block may be applied.

Quantization Parameters for Blocks Coded with Identity Transform (e.g., Transform Skip Mode, QR-BDPCM etc. al)

26. Signaling of indications of coding tools using identity transform may depend on decoded quantization parameter from the bitstream.
    a. In one example, transform_skip_flag may be not signaled for some QPs; then the flag is inferred to be 0.
        i. In one example, when QP is smaller than (4+QpBdOffsetY), transform_skip_flag may be not signaled.
    b. intra_bdpcm_flag may be not signaled for some QPs; then the flag is inferred to be 0.
        i. In one example, when QP is smaller than (4+QpBdOffsetY), intra_bdpcm_flag may be not signaled.
27. Decoded quantization parameter from the bitstream for a block coded with identity transform may be modified according to the luma/chroma quantization parameter range offset (QpBdOffsetY, QpBdOffsetC).
    a. In one example, if transform_skip_flag is equal to 1, a QP clipping may be applied.
        i. In one example, when transform_skip_flag is equal to 1, QP value may be set to (4+QpBdOffsetY) if it is smaller than (4+QpBdOffsetY).
        ii. In one example, when transform_skip_flag is equal to 1, QP value may be set to a certain value QT if it is smaller than QT.
    b. If transform_skip_flag is equal to 1, an offset may be added to the decoded QP values, denoted by QPdec.
        i. In one example, QPdec+4+QpBdOffsetY instead of QPdec may be applied to blocks with transform_skip_flag being 1.
    c. The above methods may be also applicable to quantized residual differential pulse-code modulation (QR-DPCM) coded blocks, e.g., when intra_bdpcm_flag is equal to 1.
    d. In one example, the modified quantization parameter may be used in the quantization/de-quantization/filtering/prediction of delta QP signaling of subsequent blocks.
28. Decoded quantization parameter from the bitstream for a block coded with identity transform may be modified according to a fixed offset.
    a. In one example, if transform_skip_flag is equal to 1, a QP clipping may be applied.
        i. In one example, when transform_skip_flag is equal to 1, QP value may be set to 4 if it is smaller than 4.
        ii. In one example, when transform_skip_flag is equal to 1, QP value may be set to a certain value QT if it is smaller than QT.
    b. If transform_skip_flag is equal to 1, an offset may be added to the decoded QP values, denoted by QPdec.
        i. In one example, QPdec+4 instead of QPdec may be applied to blocks with transform_skip_flag being 1.
    c. The above methods may be also applicable to QR-DPCM coded blocks, e.g., when intra_bdpcm_flag is equal to 1.
    d. In one example, the modified quantization parameter may be used in the quantization/de-quantization/filtering/prediction of delta QP signaling of subsequent blocks.
29. Decoded quantization parameter from the bitstream for a block coded with identity transform may be modified according to input bitdepth, denoted as bdi.
    a. In one example, if transform_skip_flag is equal to 1, a QP clipping may be applied.
        i. In one example, when transform_skip_flag is equal to 1, QP value may be set to (4+6*(bdi−8)) if it is smaller than (4+6*(bdi−8)).

b. If transform_skip_flag is equal to 1, an offset may be added to the decoded QP values, denoted by QPdec.
   i. In one example, QPdec+(4+6*(bdi-8)) instead of QPdec may be applied to blocks with transform_skip_flag being 1.
c. The above methods may be also applicable to QR-DPCM coded blocks, e.g., when intra_bdpcm_flag is equal to 1.
d. In one example, the modified quantization parameter may be used in the quantization/de-quantization/filtering/prediction of delta QP signalling of subsequent blocks.

30. Decoded quantization parameter from the bitstream for a block coded with identity transform may be modified according to internal bitdepth (bd) and input bitdepth denoted as (bdi).
   a. In one example, if transform_skip_flag is equal to 1, a QP clipping may be applied.
      i. In one example, when transform_skip_flag is equal to 1, QP value may be set to (4+6*(bd−bdi)) if it is smaller than (4+6*(bd−bdi)).
   b. If transform_skip_flag is equal to 1, an offset may be added to the decoded QP values, denoted by QPdec.
      i. In one example, QPdec+(4+6*(bd−bdi)) instead of QPdec may be applied to blocks with transform_skip_flag being 1.
   c. The above methods may be also applicable to QR-DPCM coded blocks, e.g., when intra_bdpcm_flag is equal to 1.
   d. In one example, the modified quantization parameter may be used in the quantization/de-quantization/filtering/prediction of delta QP signalling of subsequent blocks.

31. Whether to enable or disable preprocessing (e.g., LMCS) and/or postprocessing (e.g., filters after reconstruction of a block) for a block may depend on the quantization parameter associated with a block or a video unit containing the block.
   a. In one example, preprocessing and/or postprocessing may be disallowed when the decoded QP is smaller than a threshold.
      i. In one example, the threshold may be pre-defined.
      ii. Alternatively, furthermore, preprocessing and/or postprocessing may be disallowed when the decoded QP is smaller than a threshold which leads to QP modification according to above methods.
   b. In one example, when QP<(4+6*(bd−$bd_i$)), deblocking may be disallowed.
      i. Alternatively, a bitstream constrain may be set to bypass deblocking.
   c. In one example, when QP<(4+6*(bd−$bd_i$)), adaptive loop filter may be disallowed.
      i. Alternatively, a bitstream constrain may be set to bypass adaptive loop filter.
   d. In one example, when QP<(4+6*(bd−$bd_i$)), sample-adaptive offset may be disallowed.
      i. Alternatively, a bitstream constrain may be set to bypass sample adaptive offset.
   e. In one example, when QP<(4+6*(bd−$bd_i$)), LMCS may be disallowed.
      i. Alternatively, a bitstream constrain may be set to bypass LMCS.

32. The decoded quantization parameter mentioned above may be the quantization parameter without considering internal bitdepth QP offset (e.g., without adding QpBdOffsetY).
   a. Alternatively, the decoded quantization parameter mentioned above may be the quantization parameter considering internal bitdepth QP offset.

33. It is proposed to indicate the input bitdepth in the bitstream.
   a. In one example, a syntax element input_bitdepth_minus8 that is equal to (input_bitdepth−8) may be signalled in SPS/VPS to indicate the bitdepth of input video.
      i. In one example, the syntax element has a range 0 ... dQP, where dQP is a fixed value.
   b. In one example, a syntax element bitdepth_minus_input_bitdepth that is equal to (internal_bitdepth−input_bitdepth) may be signalled in SPS/VPS to indicate the bitdepth of input video.
      i. In one example, the syntax element has a range 0 ... dQP, where dQP is a fixed value.

34. Whether to and/or how to apply above methods may be based on:
   a. Video contents (e.g. screen contents or natural contents)
   b. A message signaled in the dependency parameter set (DPS)/SPS/VPS/PPS/APS/picture header/slice header/tile group header/Largest coding unit (LCU)/Coding unit (CU)/LCU row/group of LCUs/TU/PU block/Video coding unit
   c. Position of CU/PU/TU/block/Video coding unit
   d. Block dimension of current block and/or its neighboring blocks
      i. In one example, the above methods may be applied only when both the width and height of current block is smaller than T (e.g. 32 or 64).
   e. Block shape of current block and/or its neighboring blocks
   f. Prediction mode (e.g. pred_mode_ibc_flag) of the current block and/or its neighboring blocks
   g. The intra mode of the current block and/or its neighboring blocks
   h. The motion/block vectors of the current block and/or its neighboring blocks
   i. Indication of the color format (such as 4:2:0, 4:4:4)
   j. Coding tree structure
   k. Slice/tile group type and/or picture type
   l. Color component (e.g. may be only applied on chroma components or luma component)
   m. Temporal layer ID
   n. Profiles/Levels/Tiers of a standard 5 Embodiment on Top of JVET-N1001-v6

The following changes on top of the draft provided by JVET-N1001-v6 are highlighted in boldface italics. Deleted texts are marked with double brackets (e.g., [[a]] denotes the deletion of the character "a").

Sequence Parameter Set RBSP Syntax

|  | Descriptor |
|---|---|
| seq_parameter_set_rbsp( ) { |  |
|   sps_max_sub_layers_minus1 | u(3) |
|   ... |  |
|   sps_ibc_enabled_flag | u(1) |
|   *sps_palette_enabled_flag* | u(1) |
|   ... | u(1) |
| } |  |

Coding Unit Syntax

| | Descriptor |
|---|---|
| coding_unit( x0, y0, cbWidth, cbHeight, treeType ) { | |
|   if( slice_type != I \|\| sps_ibc_enabled_flag ) { | |
|     if( treeType != DUAL_TREE_CHROMA && | |
|       !( cbWidth = = 4 && cbHeight = = 4 && !sps_ibc_enabled_flag ) ) | |
|       cu_skip_flag[ x0 ][ y0 ] | ae(v) |
| [[ if( cu_skip_flag[ x0 ][ y0 ] = = 0 && slice_type != I | |
|     && !( cbWidth = = 4 && cbHeight = = 4 ) ) | |
|     pred_mode_flag | ae(v) |
|   if( ( ( slice_type = = I && cu_skip_flag[ x0 ][ y0 ] = =0 ) \|\| | |
|     ( slice_type != I && ( CuPredMode[ x0 ][ y0 ] != MODE_INTRA \|\| | |
|     ( cbWidth = = 4 && cbHeight = = 4 && cu_skip_flag[ x0 ][ y0 ] = = 0 ) ) ) ) && | |
|     sps_ibc_enabled_flag && ( cbWidth != 128 \|\| cbHeight != 128 ) ) | |
|     pred_mode_ibc_flag | ae(v)]] |
| } | |
|     *if(cu_skip_flag[ x0 ][ y0 ] == 0)* | |
|       *pred_modes( x0, y0, cbWidth, cbHeight)* | |
|     *if(cu_palette_flag [ x0 ][ y0 ])•{* | |
|       *cu_palette_ibc_mode* | |
|     *if(treeType = = SINGLE_TREE) {* | |
|       *palette_coding( x0, y0, , nWidth, nHeight, 0, 3)* | |
|     *} else {* | |
|   *if(treeType = = DUAL_TREE_LUMA )* | |
|     *palette_coding( x0, y0, , nWidth, nHeight, 0, 1 )* | |
|   *if(treeType = = DUAL_TREE_CHROMA)* | |
|     *palette_coding( x0, y0, , nWidth/SubWidthC, nHeight/SubHeightC , 1, 2)* | |
|   *}* | |
| } else { | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | |
| ... | |
|   } | |
| } | |

Prediction Mode Syntax
The entire text and tables hereafter are proposed to be new additions to the current version of VVC.

| | Descriptor |
|---|---|
| pred_modes ( x0, y0, cbWidth, cbHeight) { | |
|   if(sps_ibc_enabled_flag) { | |
|     if(slice_type == I \|\|( cbWidth == 4 && cbHeight == 4)){ | |
|       if(cbWidth < 128 \|\| cbHeight < 128) | |
|         pred_mode_ibc_flag | ae(v) |
|       if(!pred_mode_ibc_flag && sps_plt_enabled_flag && cbWidth <=64 && cbHeight <= 64) | |
|         cu_palette_flag | |
|     }else{ | ae(v) |
|       pred_mode_flag | |
|       if(CuPredMode[ x0 ][ y0 ] == MODE_INTRA){ | |
|         if(sps_plt_enabled_flag && cbWidth <=64 && cbHeight <= 64) | |
|           cu_palette_flag | ae(v) |
|       } | |
|       else{ | |
|         if(cbWidth < 128 \|\| cbHeight < 128) | |
|           pred_mode_ibc_flag | ae(v) |
|       } | |
|     } | |
|   } | |
| } | |

|  | Descriptor |
|---|---|
| ```
    else{
        if(slice_type == I ||( cbWidth == 4 && cbHeight == 4)){
            if(sps_plt_enabled_flag && cbWidth <=64 && cbHeight <= 64)
                cu_palette_flag
        }else{
            pred_mode_flag
            if(CuPredMode[ x0 ][ y0 ] != MODE_INTRA && sps_plt_enabled_flag && cbWidth
            <=64 && cbHeight <= 64)
                cu_palette_flag
        }
    }
}
``` | |

Palette Syntax

The entire text and tables hereafter are proposed to be new additions to the current version.

|  | Descriptor |
|---|---|
| ```
palette_coding( x0, y0, nWidth, nHeight, startComp, numComps) {
    palettePredictionFinished = 0
    NumPredictedPaletteEntries = 0
    for( predictorEntryIdx = 0; predictorEntryIdx < PredictorPaletteSize [startComp] &&
        !palettePredictionFinished && NumPredictedPaletteEntries [startComp] < palette_max_size;
        predictorEntryIdx++ ) {
        palette_predictor_run
``` | ae(v) |
| ```
        if( palette_predictor_run != 1 ) {
            if( palette_predictor_run > 1 )
                predictorEntryIdx += palette_predictor_run − 1
            PalettePredictorEntryReuseFlags[startComp][ predictorEntryIdx ] = 1
            NumPredictedPaletteEntries[startComp]++
        } else
            palettePredictionFinished = 1
    }
    if( NumPredictedPaletteEntries[startComp] < palette_max_size )
        num_signalled_palette_entries[ startComp ]
``` | ae(v) |
| ```
    for( cIdx = startComp; cIdx < ( startComp + numComps); cIdx++ )
        for( i = 0; i < num_signalled_palette_entries[ startComp ]; i++ )
            new_palette_entries[ startComp ][ i ]
``` | ae(v) |
| ```
    if( CurrentPaletteSize != 0 )
        palette_escape_val_present_flag[ startComp ]
``` | ae(v) |
| ```
    if( MaxPaletteIndex > 1 ) {
        num_palette_indices_minus1
``` | ae(v) |
| ```
        adjust = 0
        for( i = 0; i <= num_palette_indices_minus1; i++ ) {
            if( MaxPaletteIndex − adjust > 1 ) {
                palette_index_idc
``` | ae(v) |
| ```
                PaletteIndexIdc [ i ] = palette_index_idc
            }
            adjust = 1
        }
        copy_above_indices_for_final_run_flag
``` | ae(v) |
| ```        palette_transpose_flag[ startComp ]``` | ae(v) |
| ```
    }
    remainingNumIndices = num_palette_indices_minus1 + 1
    PaletteScanPos = 0
    while( PaletteScanPos <nWidth*nHeightt) {
        xC = x0 + ScanOrder[nWidth][nHeight][ 3 ][ PaletteScanPos ][ 0 ]
        yC = y0 + ScanOrder[nWidth][nHeight][ 3 ][ PaletteScanPos ][ 1 ]
        if( PaletteScanPos > 0) {
            xcPrev = x0 + ScanOrder[nWidth][nHeight][ 3 ][ PaletteScanPos − 1 ][ 0 ]
            ycPrev = y0 + ScanOrder[nWidth][nHeight][ 3 ][ PaletteScanPos − 1 ][ 1 ]
        }
        PaletteRun = nWidth * nHeight − PaletteScanPos − 1
        CopyAboveIndicesFlag[ xC ][ yC ] = 0
        if( MaxPaletteIndex > 1 )
            if( ((!palette_transpose_flag && PaletteScanPos>=nWidth) || ( (palette_transpose_flag &&
PaletteScanPos>=nHeight)) && CopyAboveIndicesFlag[ xcPrev ][ ycPrev ] = = 0 )
``` | |

|  | Descriptor |
|---|---|
| ``` |  |
|             if( remainingNumIndices > 0 && PaletteScanPos < nWidth* nHeight − 1 ) { | |
|                 copy_above_palette_indices_flag | ae(v) |
|                 CopyAboveIndicesFlag[ xC ][ yC ] = copy_above_palette_indices_flag | |
|             } else | |
|                 if( PaletteScanPos = = nWidth * nHeight − 1 && remainingNumIndices > 0 ) | |
|                     CopyAboveIndicesFlag[ xC ][ yC ] = 0 | |
|                 Else | |
|                     CopyAboveIndicesFlag[ xC ][ yC ] = 1 | |
|         if ( CopyAboveIndicesFlag[ xC ][ yC ] = = 0 ) { | |
|             currNumIndices = num_palette_indices_minus1 + 1 − remainingNumIndices | |
|             CurrPaletteIndex = PaletteIndexIdc[ currNumIndices ] | |
|         } | |
|         if( MaxPaletteIndex > 1 ) { | |
|             if ( CopyAboveIndicesFlag[ xC ][ yC ] = = 0 ) | |
|                 remainingNumIndices − = 1 | |
|             PaletteMaxRun = nCbS * nCbS − PaletteScanPos − 1 − remainingNumIndices − | |
|                 copy_above_indices_for_final_run_flag | |
|             if( remainingNumIndices > 0 || CopyAboveIndicesFlag[ xC ][ yC ] != | |
|                 copy_above_indices_for_final_run_flag ) | |
|                 if( PaletteMaxRun > 0 ) { | |
|                     palette_run_prefix | ae(v) |
|                     if( ( palette_run_prefix > 1 ) && ( PaletteMaxRun != | |
|                         ( 1 << ( palette_run_prefix − 1 ) ) ) ) | |
|                         palette_run_suffix | ae(v) |
|                 } | |
|         } | |
|         runPos = 0 | |
|         while ( runPos <= PaletteRun ) { | |
|             xR = x0 + ScanOrder[nWidth][nHeight][ 3 ][ PaletteScanPos ][ 0 ] | |
|             yR = y0 + ScanOrder[nWidth][nHeight][ 3 ][ PaletteScanPos ][ 1 ] | |
|             if( CopyAboveIndicesFlag[ xC ][ yC ] = = 0 ) { | |
|                 CopyAboveIndicesFlag[ xR ][ yR ] = 0 | |
|                 PaletteIndexMap[ startComp ][ xR ][ yR ] = CurrPaletteIndex | |
|             } else { | |
|                 CopyAboveIndicesFlag[ xR ][ yR ] = 1 | |
|                 if (!palette_transpose_flag) | |
|                     PaletteIndexMap[ startComp ] [xR][yR] = PaletteIndexMap[ startComp ] [xR][yR − 1] | |
|                 else | |
|                     PaletteIndexMap[ startComp ] [xR][yR] = PaletteIndexMap[ startComp ] [xR − 1][yR] | |
|             } | |
|             runPos++ | |
|             PaletteScanPos++ | |
|         } | |
|     } | |
|     if( palette_escape_val_present_flag ) { | |
|         for( cIdx = startComp; cIdx < (startComp + numComps); cIdx++ ) | |
|             for(sPos = 0; sPos < nWidth* nHeight; sPos++ ) { | |
|                 xC = x0 + ScanOrder[ nWidth][nHeight][ 3 ][ sPos ][ 0 ] | |
|                 yC = y0 + ScanOrder[ nWidth][nHeight][ 3 ][ sPos ][ 1 ] | |
|                 if( PaletteIndexMap[ startComp ] [ xC ][ yC ] = = (MaxPaletteIndex − 1)){ | |
|                     if( cIdx = = 0 || startComp != 0){ | |
|                         palette_escape_sign | u(1) |
|                         palette_escape_val | ue3 (v) |
|                         PaletteEscapeVal[ cIdx ][ xC ][ yC ] = palette_escape_sign > 0 ? palette_escape_val : -palette_escape_val | |
|                     } | |
|                     if(startComp == 0 && cIdx != 0 && xC % 2 = = 0 && yC %2 = = 0 ){ | |
|                         palette_escape_sign | u(1) |
|                         palette_escape_val | ue3 (v) |
|                 PaletteEscapeVal[ cIdx ][ xC ][ yC ] = palette_escape_sign > 0 ? palette_escape_val : -palette_escape_val | |
|                     } | |
|                 } | |
|             } | |
|     } | |
| } | |

Palette Semantics

In the following semantics, the array indices x0, y0 specify the location (x0, y0) of the top-left luma sample of the considered coding block relative to the top-left luma sample of the picture.

cu_palette_flag specifies the use of palette mode in the current coding unit. cu_palette_flag==1 indicates that palette mode is applied in the current coding unit. cu_palette_flag==0 indicates that palette mode is not applied for the current coding unit.

palette_predictor_run is used to determine the number of zeros that precede a non-zero entry in the array PalettePredictorEntryReuseFlags.

It is a requirement of bitstream conformance that the value of palette_predictor_run shall be in the range of 0 to (PredictorPaletteSize−predictorEntryIdx), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries shall be in the range of 0 to palette_max_size, inclusive.

num_signalled_palette_entries [startComp] specifies the number of entries in the current palette that are explicitly signalled for the first colour component of the current palette table startComp. When num_signalled_palette_entries [startComp] is not present, it is inferred to be equal to 0. The variable CurrentPaletteSize specifies the size of the current palette and is derived as follows:

CurrentPaletteSize[startComp]=NumPredictedPaletteEntries[startComp]+num_signalled_palette_entries[startComp]     (XX)

The value of CurrentPaletteSize [startComp] shall be in the range of 0 to palette_max_size, inclusive.

new_palette_entries[cIdx][i] specifies the value for the i-th signalled palette entry for the colour component cIdx.

The variable PredictorPaletteEntries[cIdx][i] specifies the i-th element in the predictor palette for the colour component cIdx.

The variable CurrentPaletteEntries[cIdx][i] specifies the i-th element in the current palette for the colour component cIdx and is derived as follows:

```
numPredictedPaletteEntries = 0
for( i = 0; i < PredictorPaletteSize[ startComp]; i++ )
    if( PalettePredictorEntryReuseFlags[ i ] ) {
        for( cIdx =startComp; cIdx < (startComp + numComps); cIdx++ )
            CurrentPaletteEntries[ cIdx ][ numPredictedPaletteEntries ] =
                PredictorPaletteEntries[ cIdx ][ i ]
            numPredictedPaletteEntries++
    }
    for( i = 0; i < num_signalled_palette_entries[startComp]; i++ )
        for( cIdx = startComp; cIdx < (startComp + numComps); cIdx++)
            CurrentPaletteEntries[ cIdx ][ numPredictedPaletteEntries + i ] =
                new_palette_entries[ cIdx ][ i ]   (XX)
``` palette_escape_val_present_flag equal to 1 specifies that the current coding unit contains at least one escape coded sample. escape_val_present_flag equal to 0 specifies that there are no escape coded samples in the current coding unit. When not present, the value of palette_escape_val_present_flag is inferred to be equal to 1.

The variable MaxPaletteIndex specifies the maximum possible value for a palette index for the current coding unit. The value of MaxPaletteIndex is set equal to CurrentPaletteSize+palette_escape_val_present_flag if the cu_palette_ibc_mode is 0. Otherwise, if the cu_palette_ibc_mode is 1, the MaxPaletteIndex is set equal to CurrentPaletteSize+palette_escape_val_present_flag+1 num_palette_indices_minus1 plus 1 is the number of palette indices explicitly signalled or inferred for the current block.

When num_palette_indices_minus1 is not present, it is inferred to be equal to 0.

palette_index_idc is an indication of an index to the array represented by CurrentPaletteEntries. The value of palette_index_idc shall be in the range of 0 to MaxPaletteIndex, inclusive, for the first index in the block and in the range of 0 to (MaxPaletteIndex−1), inclusive, for the remaining indices in the block.

When palette_index_idc is not present, it is inferred to be equal to 0.

The variable PaletteIndexIdc[i] stores the i-th palette_index_idc explicitly signalled or inferred.

All elements of the array PaletteIndexIdc[i] are initialized to 0.

copy_above_indices_for_final_run_flag equal to 1 specifies that the palette indices of the last positions in the coding unit are copied from the palette indices in the row above if horizontal traverse scan is used or the palette indices in the left column if vertical traverse scan is used. copy_above_indices_for_final_run_flag equal to 0 specifies that the palette indices of the last positions in the coding unit are copied from PaletteIndexIdc[num_palette_indices_minus1].

When copy above indices for final run flag is not present, it is inferred to be equal to 0.

palette_transpose_flag equal to 1 specifies that vertical traverse scan is applied for scanning the indices for pixels in the current coding unit. palette_transpose_flag equal to 0 specifies that horizontal traverse scan is applied for scanning the indices for pixels in the current coding unit.

copy_above_palette_indices_flag equal to 1 specifies that the palette index is equal to the palette index at the same location in the row above if horizontal traverse scan is used or the same location in the left column if vertical traverse scan is used. copy_above_palette_indices_flag equal to 0 specifies that an indication of the palette index of the sample is coded in the bitstream or inferred. The variable CopyAboveIndicesFlag[xC][yC] equal to 1 specifies that the palette index is copied from the palette index in the row above (horizontal scan) or left column (vertical scan). CopyAboveIndicesFlag[xC][yC] equal to 0 specifies that the palette index is explicitly coded in the bitstream or inferred. The array indices xC, yC specify the location (xC, yC) of the sample relative to the top-left luma sample of the picture.

The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC][yC] shall be in the range of 0 to MaxPaletteIndex, inclusive.

The variable PaletteRun specifies the number of consecutive locations minus 1 with the same palette index as the position in the above row (horizontal scan) or in the left column (vertical scan) when CopyAboveIndicesFlag[xC][yC] is equal to 1 or specifies the number of consecutive locations minus 1 with the same palette index when CopyAboveIndicesFlag[xC][yC] is equal to 0.

The variable PaletteMaxRun represents the maximum possible value for PaletteRun. It is a requirement of bitstream conformance that the value of PaletteMaxRun shall be greater than or equal to 0.

palette_run_prefix specifies the prefix part in the binarization of PaletteRun.

palette_run_suffix specifies the suffix part in the binarization of PaletteRun. When palette_run_suffix is not present, the value of palette run suffix is inferred to be equal to 0.

The value of PaletteRun is derived as follows:
If palette run prefix is less than 2, the following applies:

PaletteRun=palette_run_prefix    (XX)

Otherwise (palette run prefix is greater than or equal to 2), the following applies:

PrefixOffset=1<<(palette_run_prefix−1)

PaletteRun=PrefixOffset+palette_run_suffix    (XX)

palette_escape_val specifies the quantized escape coded sample value for a component.

The variable PaletteEscapeVal[cIdx][xC][yC] specifies the escape value of a sample for which PaletteIndexMap [xC][yC] is equal to (MaxPaletteIndex−1) and palette_escape_val_present_flag is equal to 1. The array index cIdx specifies the colour component. The array indices xC, yC specify the location (xC, yC) of the sample relative to the top-left luma sample of the picture.

It is a requirement of bitstream conformance that PaletteEscapeVal[cIdx][xC][yC] shall be in the range of 0 to $(1<<(BitDepth_Y+1))-1$, inclusive, for cIdx equal to 0, and in the range of 0 to $(1<<(BitDepth_C+1))-1$, inclusive, for cIdx not equal to 0.

General Decoding Process for Coding Units Coded in Intra Prediction Mode

Inputs to this process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples,
a variable treeType specifying whether a single or a dual tree is used and if a dual tree is used, it specifies whether the current tree corresponds to the luma or chroma components.

Output of this process is a modified reconstructed picture before in-loop filtering.

The derivation process for quantization parameters as specified in clause 8.4.1 is invoked with the luma location (xCb, yCb), the width of the current coding block in luma samples cbWidth and the height of the current coding block in luma samples cbHeight, and the variable treeType as inputs.

When treeType is equal to SINGLE_TREE or treeType is equal to DUAL_TREE_LUMA, the decoding process for luma samples is specified as follows:
If pcm_flag[xCb][yCb] is equal to 1, the reconstructed picture is modified as follows:

$S_L[xCb+i][yCb+j]$=pcm_sample_luma[(cbHeight*$j$)+ $i$]<<(BitDepth$_Y$−PcmBitDepth$_Y$),    (8-1)

with i=0 . . . cbWidth−1, j=0 . . . cbHeight−1

Otherwise, if cu_palette_flag[xCb][yCb] is equal to 1, the following applies:
If treeType is equal to SINGLE_TREE, the following applies
1. The general decoding process for palette blocks as specified in clause XXX is invoked with the luma location (xCb, yCb), the variable startComp set equal to 0, the variable cIdx set to 0, the variable nTbW set equal to cbWidth, the variable nTbH set equal to cbHeight.
Otherwise, the following applies
1. The general decoding process for palette blocks as specified in clause XXX is invoked with the luma location (xCb, yCb), the variable startComp set equal to 0, the variable cIdx set to 0, the variable nTbW set equal to cbWidth, the variable nTbH set equal to cbHeight.
2. The general palette predictor updating process for palette blocks as specified in clause 8.X.X is invoked with the luma location (xCb, yCb), the variable startComp set equal to 0, the variable numComps set equal to 1.
Otherwise, the following applies:
1. The derivation process for the luma intra prediction mode as specified in clause 8.2.2 is invoked with the luma location (xCb, yCb), the width of the current coding block in luma samples cbWidth and the height of the current coding block in luma samples cbHeight as input.
2. The general decoding process for intra blocks as specified in clause 8.2.4.1 is invoked with the luma location (xCb, yCb), the tree type treeType, the variable nTbW set equal to cbWidth, the variable nTbH set equal to cbHeight, the variable predModeIntra set equal to IntraPredModeY[xCb][yCb], and the variable cIdx set equal to 0 as inputs, and the output is a modified reconstructed picture before in-loop filtering.

When treeType is equal to SINGLE_TREE or treeType is equal to DUAL_TREE_CHROMA, the decoding process for chroma samples is specified as follows:
If pcm_flag[xCb][yCb] is equal to 1, the reconstructed picture is modified as follows:

$S_{Cb}[xCb/\text{SubWidthC}+i][yCb/\text{SubHeightC}+j]$=pcm_sample_chroma[(cbHeight/SubWidthC*$j$)+$i$]<< (BitDepth$_C$−PcmBitDepth$_C$)    (8-2)

with i=0 . . . cbWidth/SubWidthC−1 and j=0 . . . cbHeight/SubHeightC−1

$S_{Cr}[xCb/\text{SubWidthC}+i][yCb/\text{SubHeightC}+j]$=pcm_sample_chroma[(cbHeight/SubWidthC*($j$+ cbHeight/SubHeightC))+$i$]<<(BitDepth$_C$−PcmBitDepth$_C$),    (8-3)

with i=0 . . . cbWidth/SubWidthC−1 and j=0 . . . cbHeight/SubHeightC−1

Otherwise, if cu_palette_flag[xCb][yCb] is equal to 1, the following applies:
If treeType is equal to SINGLE_TREE, the following applies
1. The general decoding process for palette blocks as specified in clause XXX is invoked with the luma location (xCb, yCb), the variable startComp set equal to 0, the variable cIdx set to 1, the variable nTbW set equal to (cbWidth/2), the variable (cbHeight/2) set equal to cbHeight.
2. The general decoding process for palette blocks as specified in clause XXX is invoked with the luma location (xCb, yCb), the variable startComp set equal to 0, the variable cIdx set to 2, the variable nTbW set equal to (cbWidth/2), the variable (cbHeight/2) set equal to cbHeight.
3. The general palette predictor updating process for palette blocks as specified in clause 8.X.X is invoked with the luma location (xCb, yCb), the variable startComp set equal to 0, the variable numComps set equal to 3.
Otherwise, the following applies
1. The general decoding process for palette blocks as specified in clause XXX is invoked with the luma location (xCb, yCb), the variable startComp set equal to 1, the variable cIdx set to 1, the variable nTbW set equal to (cbWidth/2), the variable (cbHeight/2) set equal to cbHeight.
2. The general decoding process for palette blocks as specified in clause XXX is invoked with the luma location (xCb, yCb), the variable startComp set equal to 1, the variable cIdx set to 2, the variable nTbW set equal to (cbWidth/2), the variable (cbHeight/2) set equal to cbHeight.
3. The general palette predictor updating process for palette blocks as specified in clause XXX is invoked with the luma location (xCb, yCb), the variable startComp set equal to 1, the variable numComps set equal to 2.

Otherwise, the following applies:
1. The derivation process for the chroma intra prediction mode as specified in clause 8.2.3 is invoked with the luma location (xCb, yCb), the width of the current coding block in luma samples cbWidth and the height of the current coding block in luma samples cbHeight as input.
2. The general decoding process for intra blocks as specified in clause 8.2.4.1 is invoked with the chroma location (xCb/2, yCb/2), the tree type treeType, the variable nTbW set equal to (cbWidth/2), the variable nTbH set equal to (cbHeight/2), the variable predModeIntra set equal to IntraPredModeC[xCb][yCb], and the variable cIdx set equal to 1, and the output is a modified reconstructed picture before in-loop filtering.
3. The general decoding process for intra blocks as specified in clause 8.2.4.1 is invoked with the chroma location (xCb/2, yCb/2), the tree type treeType, the variable nTbW set equal to (cbWidth/2), the variable nTbH set equal to (cbHeight/2), the variable predModeIntra set equal to IntraPredModeC[xCb][yCb], and the variable cIdx set equal to 2, and the output is a modified reconstructed picture before in-loop filtering.

Decoding Process for Palette Mode

Inputs to this process are:
a location (xCb, yCb) specifying the top-left luma sample of the current block relative to the top-left luma sample of the current picture,
a variable startComp specifies the first colour component in the palette table,
a variable cIdx specifying the colour component of the current block,
two variables nTbW and nTbH specifying the width and height of the current block, respectively.

Output of this process is an array recSamples[x][y], with x=0 . . . nTbW−1, y=0 . . . nTbH−1 specifying reconstructed sample values for the block.

Depending on the value of cIdx, the variables nSubWidth and nSubHeight are derived as follows:
If cIdx is equal to 0, nSubWidth is set to 1 and nSubHeight is set to 1.
If startComp is equal to 1 and if cIdx>1, nSubWidth is set to 1 and nSubHeight is set to 1.
Otherwise, nSubWidth is set to SubWidthC and nSubHeight is set to SubHeightC.

If cu_palette_ibc_mode[xCb][yCb] is equal to 1 the following applies:
The derivation process for the motion vectors as specified in clause 8.6.2 is invoked with a luma location (xCb, yCb) of the top-left sample of the current luma coding block relative to the top-left luma sample of the current picture, a variable cbWidth specifying the width of the current coding block in luma samples, and a variable cbHeight specifying the height of the current coding block in luma samples. The outputs are the luma motion vector in 1/16 fractional-sample accuracy mvL.

The general IBC prediction process as specified in clause 8.6.3 is invoked with a luma location (xCb, yCb) specifying the top-left sample of the current coding block relative to the top-left luma sample of the current picture, a variable cbWidth specifying the width of the current coding block in luma samples, a variable cbHeight specifying the height of the current coding block in luma samples, variables numSbX and numSbY specifying the number of luma coding subblocks in horizontal and vertical direction, the motion vectors mv[xSbIdx][ySbIdx] with xSbIdx=0 numSbX−1, and ySbIdx=0 numSbY−1, a variable cIdx specifying the colour component index of the current block. The output is an array predSamples of prediction samples predSamples[x][y].

The (nTbW×nTbH) block of the reconstructed sample array recSamples at location (xCb, yCb) is represented by recSamples[x][y] with x=0 . . . nTbW−1 and y=0 . . . nTbH−1, and the value of recSamples[x][y] for each x in the range of 0 to nTbW−1, inclusive, and each y in the range of 0 to nTbH−1, inclusive, is derived as follows:

The variables xL and yL are derived as follows:

$$xL = \text{palette\_transpose\_flag} ? x * n\text{SubHeight} : x * n\text{SubWidth} \quad (5\text{-}4)$$

$$yL = \text{palette\_transpose\_flag} ? y * n\text{SubWidth} : y * n\text{SubHeight} \quad (5\text{-}5)$$

The variable bIsEscapeSample is derived as follows:
If PaletteIndexMap[xCb+xL][yCb+yL] is equal to MaxPaletteIndex and palette_escape_val_present_flag is equal to 1, bIsEscapeSample is set equal to 1.
Otherwise, bIsEscapeSample is set equal to 0.

If bIsEscapeSample is equal to 0, the following applies:
If cu_palette_ibc_mode[xCb][yCb] is equal to 1 the following applies:
If PaletteIndexMap[xCb+xL][yCb+yL] is equal to 0, the following applies:

$$recSamples[x][y] = predSamples[x][y]$$

Otherwise, the following applies:

$$recSamples[x][y] = \text{CurrentPaletteEntries}[cIdx][\text{PaletteIndexMap}[xCb+xL][yCb+yL]-1] \quad (5\text{-}6)$$

Otherwise, the following applies:

$$recSamples[x][y] = \text{CurrentPaletteEntries}[cIdx][\text{PaletteIndexMap}[xCb+xL][yCb+yL]-1] \quad (5\text{-}7)$$

Otherwise, if cu_transquant_bypass_flag is equal to 1, the following applies:

$$recSamples[x][y] = \text{PaletteEscapeVal}[cIdx][xCb+xL][yCb+yL] \quad (5\text{-}8)$$

Otherwise (bIsEscapeSample is equal to 1 and cu_transquant_bypass_flag is equal to 0), the following ordered steps apply:
1. The derivation process for quantization parameters is invoked with the location (xCb, yCb) specifying the top-left sample of the current block relative to the top-left sample of the current picture.

2. The quantization parameter qP is derived as follows:
If cIdx is equal to 0, $$qP = \text{Max}(0, Qp'_Y) \qquad (5\text{-}9)$$

Otherwise, if cIdx is equal to 1, $$qP = \text{Max}(0, Qp'_{Cb}) \qquad (5\text{-}10)$$

Otherwise (cIdx is equal to 2), $$qP = \text{Max}(0, Qp'_{Cr}) \qquad (5\text{-}11)$$

3. The variables bitDepth is derived as follows:

$$\text{bitDepth} = (\text{cIdx} == 0)?\text{BitDepth}_Y : \text{BitDepth}_C \qquad (5\text{-}12)$$

4. The list levelScale[ ] is specified as levelScale[k]=40, 45, 51, 57, 64, 72 with k=0 ... 5.
5. The following applies:

$$\text{tmpVal} = (\text{PaletteEscapeVal}[\text{cIdx}][xCb+xL][yCb+yL] * \text{levelScale}[qP\%6]) << (qP/6) + 32) >> 6 \qquad (5\text{-}13)$$

$$\text{recSamples}[x][y] = \text{Clip3}(0, (1<<\text{bitDepth})-1, \text{tmpVal}) \qquad (5\text{-}14)$$

Palette Predictor Update Process for Palette Mode
Inputs to this process are:
a location (xCb, yCb) specifying the top-left luma sample of the current block relative to the top-left luma sample of the current picture,
a variable startComp specifies the first colour component in the palette table,
a variable numComps specifies the number of colour components in the palette table,
Output of this process is a variable PredictorPaletteSize [startComp] specifying the size of the updated palette predictor, and an array PredictorPaletteEntries [cIdx][i], with cIdx=startComp, ... , startComp+numComps−1, i=0 ... PredictorPaletteSize−1 specifying the updated palette predictor for the next block.
The variable PredictorPaletteSize and the array PredictorPaletteEntries are derived or modified as follows:

```
for( i = 0; i < CurrentPaletteSize; i++ )
    for( cIdx = startComp; cIdx < (startComp + numComps); cIdx++ )
        newPredictorPaletteEntries[ cIdx ][ i ] =
        CurrentPaletteEntries[ cIdx ][ i ]
newPredictorPaletteSize = CurrentPaletteSize
for( i = 0; i < PredictorPaletteSize && newPredictorPaletteSize <
PaletteMaxPredictorSize; i++ )
    if( !PalettePredictorEntryReuseFlags[ i ] ) {
        for( cIdx = startComp; cIdx < (startComp + numComps); cIdx++ )
        (5-15)
            newPredictorPaletteEntries[ cIdx ][ newPredictorPaletteSize ] =
            PredictorPaletteEntries[ cIdx ][ i ]
        newPredictorPaletteSize++
    }
for( cIdx = startComp; cIdx < (startComp + numComps); cIdx++ )
    for( i = 0; i < newPredictorPaletteSize; i++ )
        PredictorPaletteEntries[ cIdx ][ i ] =
        newPredictorPaletteEntries[ cIdx ][ i ]
PredictorPaletteSize = newPredictorPaletteSize
```

It is a requirement of bitstream conformance that the value of PredictorPaletteSize shall be in the range of 0 to PaletteMaxPredictorSize, inclusive.

5.1 Embodiment #2

5.1.1 Scaling Process for Transform Coefficients
Inputs to this process are:
a luma location (xTbY, yTbY) specifying the top-left sample of the current luma transform block relative to the top-left luma sample of the current picture,
a variable nTbW specifying the transform block width,
a variable nTbH specifying the transform block height,
a variable cIdx specifying the colour component of the current block,
a variable bitDepth specifying the bit depth of the current colour component.
Output of this process is the (nTbW)×(nTbH) array d of scaled transform coefficients with elements d[x][y].
The quantization parameter qP is derived as follows:
If cIdx is equal to 0, the following applies:
if transform_skip_flag[xTbY][yTbY] is equal to 1 or intra_bdpcm_flag[xTbY][yTbY] is equal to 1, the following applies:

$$qP = \text{Max}(4 + QpBdOffset_Y, Qp'_Y) \qquad (8\text{-}954)$$

Otherwise $$qP = Qp'_Y \qquad (8\text{-}954)$$

Otherwise, if cIdx is equal to 1 and tu_joint_cbcr_residual [xTbY][yTbY] is equal to 1, the following applies:

$$qP = Qp'_{CbCr} \qquad (8\text{-}955)$$

Otherwise, if cIdx is equal to 1, the following applies:

$$qP = Qp'_{Cb} \qquad (8\text{-}956)$$

Otherwise (cIdx is equal to 2), the following applies:

$$qP = Qp'_{Cr}$$

In one example, the highlighted conditions may be further changed to:
if transform_skip_flag[xTbY][yTbY] is equal to 1, the following applies:

5.2 Embodiment #3

5.2.1 Scaling Process for Transform Coefficients
Inputs to this process are:
a luma location (xTbY, yTbY) specifying the top-left sample of the current luma transform block relative to the top-left luma sample of the current picture,
a variable nTbW specifying the transform block width,
a variable nTbH specifying the transform block height,
a variable cIdx specifying the colour component of the current block,
a variable bitDepth specifying the bit depth of the current colour component.
Output of this process is the (nTbW)×(nTbH) array d of scaled transform coefficients with elements d[x][y].
The quantization parameter qP is derived as follows:
If cIdx is equal to 0, the following applies:
if transform_skip_flag[xTbY][yTbY] is equal to 1 or intra_bdpcm_flag[xTbY][yTbY] is equal to 1, the following applies:

$$qP = \text{Max}(4 + (6*(\text{input\_bit\_depth}-8)), Qp'_Y) \qquad (8\text{-}954)$$

Otherwise $$qP = Qp'_Y \qquad (8\text{-}954)$$

Otherwise, if cIdx is equal to 1 and tu_joint_cbcr_residual [xTbY][yTbY] is equal to 1, the following applies:

$$qP = Qp'_{CbCr} \qquad (8\text{-}955)$$

Otherwise, if cIdx is equal to 1, the following applies:

$$qP = Qp'_{Cb} \qquad (8\text{-}956)$$

Otherwise (cIdx is equal to 2), the following applies:

$$qP = Qp'_{Cr}$$

In one example, the highlighted conditions may be further changed to:
if transform_skip_flag[xTbY][yTbY] is equal to 1, the following applies:

5.3 Embodiment #4

5.3.1 Scaling Process for Transform Coefficients
Inputs to this process are:
a luma location (xTbY, yTbY) specifying the top-left sample of the current luma transform block relative to the top-left luma sample of the current picture,
a variable nTbW specifying the transform block width,
a variable nTbH specifying the transform block height,
a variable cIdx specifying the colour component of the current block,
a variable bitDepth specifying the bit depth of the current colour component.
Output of this process is the (nTbW)×(nTbH) array d of scaled transform coefficients with elements d[x][y].
The quantization parameter qP is derived as follows:
If cIdx is equal to 0, the following applies:
if transform_skip_flag[xTbY][yTbY] is equal to 1 or intra_bdpcm_flag[xTbY][yTbY] is equal to 1, the following applies:

$qP = \text{Max}(4, Qp'_Y)$  (8-954)

Otherwise $qP = Qp'_Y$  (8-954)

Otherwise, if cIdx is equal to 1 and tu_joint_cbcr_residual[xTbY][yTbY] is equal to 1, the following applies:

$qP = Qp'_{CbCr}$  (8-955)

Otherwise, if cIdx is equal to 1, the following applies:

$qP = Qp'_{Cb}$  (8-956)

Otherwise (cIdx is equal to 2), the following applies:

$qP = Qp'_{Cr}$

Figure 17A:
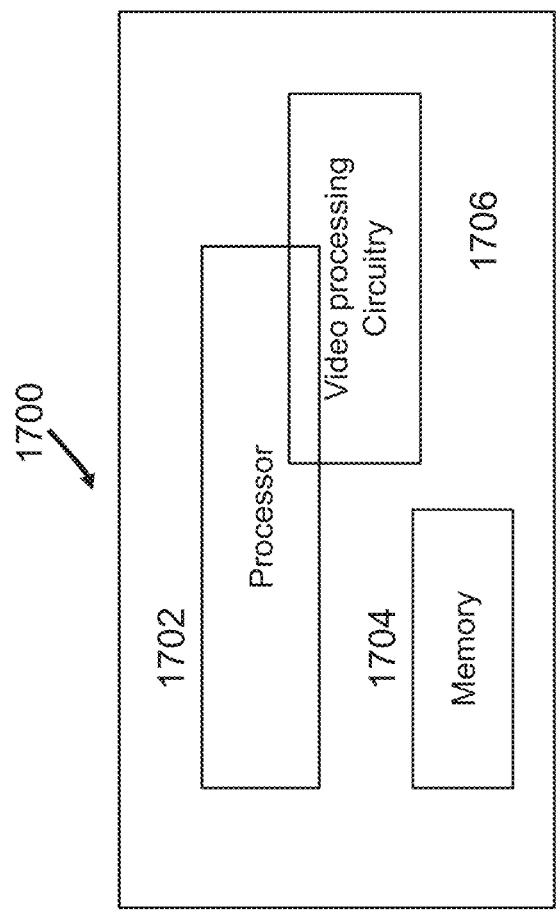
FIGS. 17A and 17B are block diagrams of examples of a video processing apparatus.

In one example, the highlighted conditions may be further changed to:
if transform_skip_flag[xTbY][yTbY] is equal to 1, the following applies:

FIG. 17A is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods described in the present document. The memory (memories) 1704 may be used for storing data and code used for implementing the methods and techniques described herein. The video processing hardware 1706 may be used to implement, in hardware circuitry, some techniques described in the present document. The video processing hardware 1706 may be partially or completely included within the processor(s) 1702 in the form of dedicated hardware, or graphical processor unit (GPU) or specialized signal processing blocks.

Figure 17B:
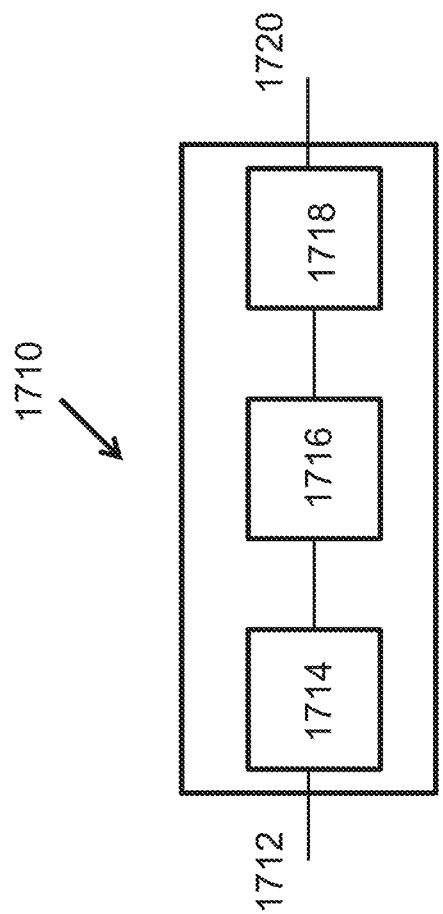

FIG. 17B is another example of a block diagram of a video processing system in which disclosed techniques may be implemented. FIG. 17B is a block diagram showing an example video processing system 1710 in which various techniques disclosed herein may be implemented. Various implementations may include some or all of the components of the system 1710. The system 1710 may include input 1712 for receiving video content. The video content may be received in a raw or uncompressed format, e.g., 8 or 10 bit multi-component pixel values, or may be in a compressed or encoded format. The input 1712 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1710 may include a coding component 1714 that may implement the various coding or encoding methods described in the present document. The coding component 1714 may reduce the average bitrate of video from the input 1712 to the output of the coding component 1714 to produce a coded representation of the video. The coding techniques are therefore sometimes called video compression or video transcoding techniques. The output of the coding component 1714 may be either stored, or transmitted via a communication connected, as represented by the component 1716. The stored or communicated bitstream (or coded) representation of the video received at the input 1712 may be used by the component 1718 for generating pixel values or displayable video that is sent to a display interface 1720. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 18A:
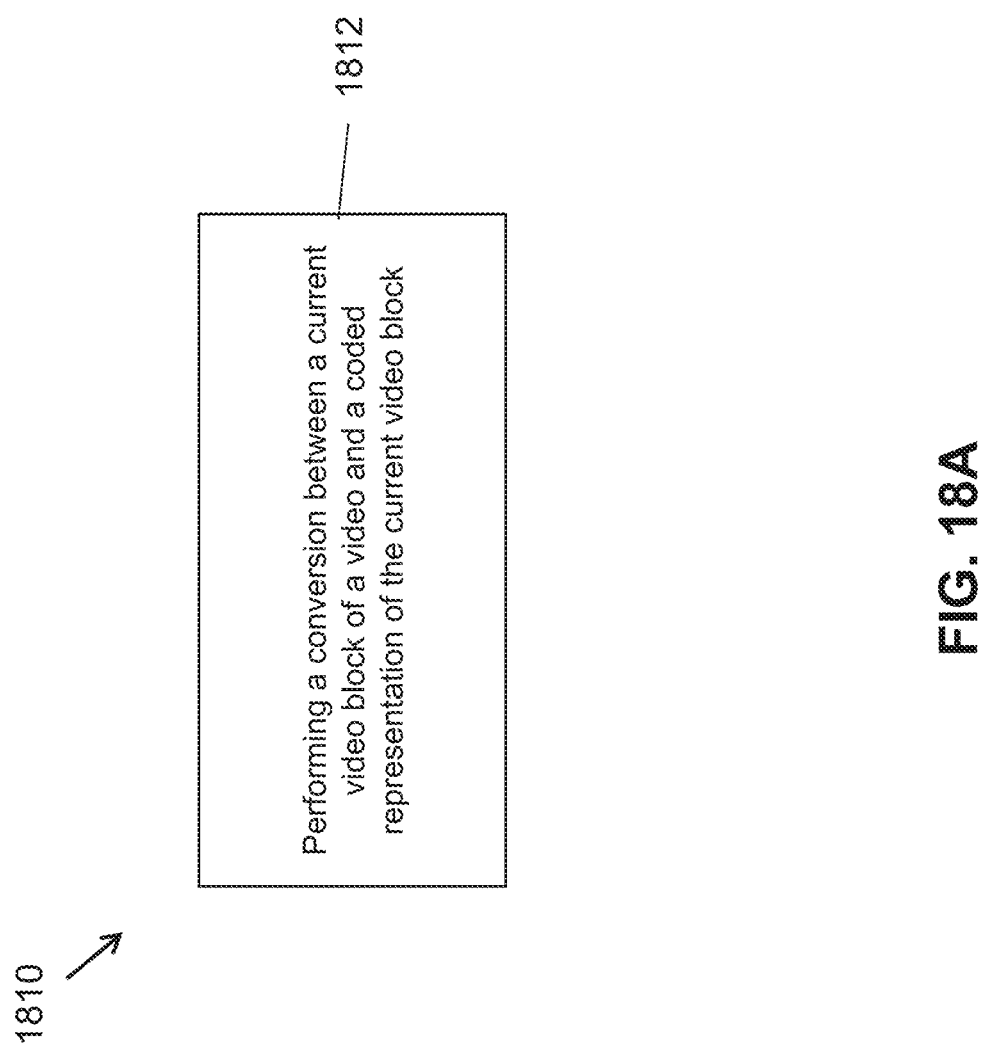
FIGS. 18A and 18B are flowcharts for examples of a video processing method.

FIG. 18A shows an example method 1810 of video processing. The method 1810 includes, at step 1812, performing a conversion between a current video block of a video and a coded representation of the current video block. In some implementations, the conversion is performed according to a rule, wherein the rule specifies that, due to use of an identity transform coding tool for representing the current video block into the coded representation, a syntax field indicative of a quantization parameter used for decoding the current video block is included such that a value of the quantization parameter is modified according to a rule, wherein the identity transform coding tool allows coefficient values at a transform domain of the current block to be same as values of a residual block of the current video block. In some implementations, the coded representation conforms to a formatting rule specifying a selective inclusion of a syntax element indicative of use of a coding tool using an identity transform based on quantization parameter included in the coded representation. In some implementations, the coded representation conforms to a formatting rule specifying that a syntax element indicative of an input bit depth of the video is included in the coded representation.

Figure 18B:
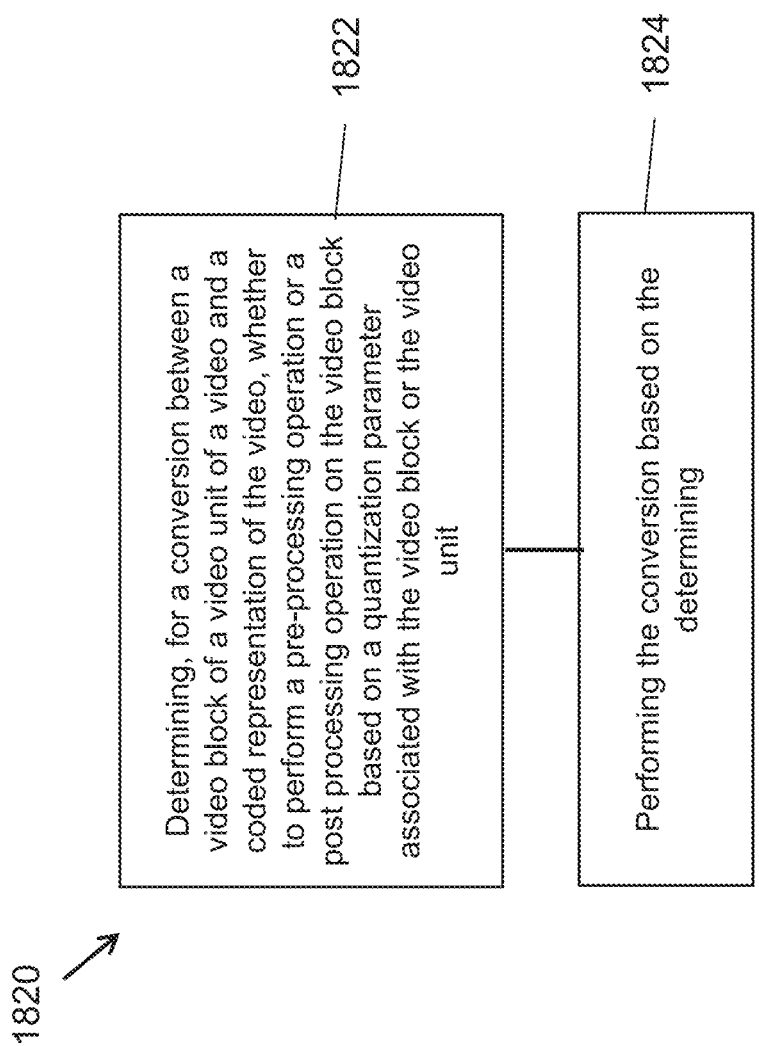

FIG. 18B shows an example method 1820 of video processing. The method 1820 includes, at step 1822, determining, for a conversion between a video block of a video unit of a video and a coded representation of the video, whether to perform a pre-processing operation or a post processing operation on the video block based on a quantization parameter associated with the video block or the video unit. The method 1820 further includes, at step 1824, performing the conversion based on the determining.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The following clauses describe some embodiments and techniques. The first set of clauses describe certain features and aspects of the disclosed techniques in the previous section.

1. A method of video coding, comprising: determining, during a conversion between a video region of a video and a bitstream representation of the video region, parameters of a deblocking process for the video region based on a palette coding mode condition related to the video region; and using the deblocking process during the conversion using the selected parameters.

2. The method of clause 1, wherein the parameters of the deblocking process are different from parameters used for conversion of another video region coded using an intra coding mode or an inter coding mode or an intra block copy coding mode.

3. The method of any of clauses 1-2, wherein the parameters include a boundary strength value that is determined based on whether or not neighboring video regions of the video region on P-side and Q-side are coded using palette mode coding.

4. The method of clause 3, wherein the boundary strength is equal to zero due to both P-side and Q-side vide regions being coded using the palette mode.

5. The method of any of clauses 1-4 wherein the palette mode corresponds to palette mode combining with intra prediction (PCIP) mode or a compound palette mode (CPM).

Item 1 in section 4 provides additional examples and embodiments of the above-described method.

6. A method of video processing, comprising: selecting, during a conversion between a video picture and a bitstream representation of the video picture, deblocking filter parameters for applying a deblocking process to a video block of the video picture based on a coding mode of neighboring video blocks based on an assignment rule; and performing the conversion by applying the deblocking process according to the assignment rule; wherein the assignment rule specifies to use same parameters for cases in which neighboring blocks are compound palette mode coded or coded using another coding mode.

7. The method of clause 6, wherein the another coding mode corresponds to an intra block copy mode.

8. The method of clause 6, wherein the another coding mode corresponds to a palette coding mode.

Item 2 in section 4 provides additional examples and embodiments of the above-described method.

9. A method of video processing, comprising: selecting, during a conversion between a video picture and a bitstream representation of the video picture, deblocking filter parameters for applying a deblocking process to a video block of the video picture based on a coding mode of neighboring video blocks based on an assignment rule; and performing the conversion by applying the deblocking process according to the assignment rule; wherein the assignment rule specifies to use same parameters for cases in which neighboring blocks are palette mode combining with intra prediction (PCIP) mode coded or coded using another coding mode.

10. The method of clause 9, wherein the another coding mode corresponds to an intra block copy mode.

11. The method of clause 9, wherein the another coding mode corresponds to a palette coding mode.

Item 3 in section 4 provides additional examples and embodiments of the above-described method.

12. A method of video processing, comprising: performing a conversion between video blocks of a video picture and a bitstream representation of the video blocks using a palette coding mode in which a palette of component values is used for coding pixels of a corresponding video block, wherein a flag in the bitstream representation provides an indication of presence of non-zero coefficients in the corresponding video block and the flag is used for signaling video blocks coded using a palette coding mode, a combining with intra prediction (PCIP) mode or a compound palette mode (CPM).

13. The method of clause 12, wherein a value of the flag depends on whether or not the corresponding block has escape pixels.

Item 4 in section 4 provides additional examples and embodiments of the above-described method.

14. A method of video processing, comprising: determining, during a conversion between a video picture comprising multiple video blocks and a bitstream representation of the video picture, an applicability of a deblocking process for each of the multiple video blocks based on a palette coding mode condition related to the each of the multiple video blocks; and selectively using, based on the applicability, the deblocking process on the multiple blocks during the conversion.

15. The method of clause 14, wherein the determining the applicability determines that the deblocking process is inapplicable to blocks coded using a palette mode or a combining with intra prediction (PCIP) mode or a compound palette mode (CPM).

16. The method of clause 14, wherein the determining the applicability includes determining that P-side samples or Q-side samples are inapplicable in case that a P-side block or a Q-side block is coded using the palette mode or the PCIP mode or the CPM mode, respectively.

Item 5 in section 4 provides additional examples and embodiments of the above-described method.

17. A method of video processing, comprising: performing a conversion between a video frame comprising multiple video blocks and a bitstream representation of the video frame that is coded using a compound palette mode (CPM); wherein the bitstream representation includes an indication of the CPM mode at a video region level that is separate from indications for an intra mode, an inter mode, an intra block copy mode or a palette mode applicable to the video region.

18. The method of clause 17, wherein the video region corresponds to a transform unit or a prediction unit or a coding block unit.

19. The method of any of clauses 17-18, wherein the bitstream representation includes the indication of the CPM mode after indications for the intra mode, the inter mode, the intra block copy mode or the palette mode applicable to the video region.

Item 6 in section 4 provides additional examples and embodiments of the above-described method.

20. A method of video processing, comprising: performing a conversion between video blocks of a video picture and a bitstream representation of the video blocks using a coding mode in which a palette of component values is used for coding pixels of a corresponding video block, wherein syntax elements related to the palette coding mode are selectively included in the bitstream representation for a given video block based on a characteristic of a color component to which the given video block belongs; wherein the coding more includes a palette coding mode, a combining with intra prediction (PCIP) mode or a compound palette mode (CPM).

21. The method of video processing, wherein syntax elements related to the palette coding mode are selectively included further based on a partition structure or a plane coding used for the given video block.

22. The method of any of clauses 20-21, wherein the syntax elements are included only for dual tree partition structure.

23. The method of any of clauses 20-21, wherein, due to the video picture being in 4:0:0 format, and the given video block being a chroma block, syntax elements are skipped.

Item 7 in section 4 provides additional examples and embodiments of the above-described method.

24. The method of clause 20, wherein the given video block corresponds to a chroma component and wherein the syntax elements related to the palette coding mode are selectively included based on a coded information of one or more selected blocks of a luma block corresponding to the given video block.

25. The method of clause 24, wherein the one or more selected block of the luma block correspond to a smallest coding unit or a smallest prediction unit or a smallest transform unit size.

Item 8 in section 4 provides additional examples and embodiments of the above-described method.

26. The method of any of clauses 20-25, wherein the coding mode is the PCIP mode.

Item 9 in section 4 provides additional examples and embodiments of the above-described method.

27. A method of video processing, comprising: performing a conversion between a video picture comprising multiple video blocks and a bitstream representation of the video picture in which at least some of the multiple blocks are coded using a predictive coding mode and wherein a video block is coded using a compound palette mode (CPM) that is identified separately from or as a special case of other predictive coding modes used for coding other video blocks of the video picture.

28. The method of clause 27, wherein the other predictive coding modes include an intra mode, an intra block copy, a palette mode and a CPM mode for intra slices or I pictures or intra tile groups.

Item 10 in section 4 provides additional examples and embodiments of the above-described method.

29. The method of clause 27, wherein the CPM is identified as the special case of other predictive coding modes in the bitstream representation and syntax elements signaling the CPM are selectively signaled based on a type of the other predictive mode of which the CPM is the special case.

30A. The method of clause 29, wherein the type of the other predictive mode is intra mode, and wherein signaling of the syntax elements of the CPM is skipped.

30B. The method of clause 29, wherein the type of the other predictive mode is a skipped mode, and wherein signaling of the syntax elements of the CPM is skipped.

Item 11 in section 4 provides additional examples and embodiments of the above-described method.

31. A video processing method, comprising: performing a first conversion between a current video block and a first bitstream representation of the current video block in which the current video block is coded using a compound palette mode (CPM), the current video block having a motion vector associated with the current video block; and performing a second conversion between a next video block and a second bitstream representation of the next video block in which a motion prediction using the motion vector associated with the current video block is used during the second conversion.

32. The method of clause 31, wherein the motion prediction is used as a merge candidate for the second conversion.

33. The method of clause 31 or 32, wherein the motion prediction is used as a history based motion vector predictor during the second conversion.

Item 12 in section 4 provides additional examples and embodiments of the above-described method.

34. A video processing method, comprising: performing a first conversion between a current video block and a first bitstream representation of the current video block in which the current video block is coded using combining with intra prediction (PCIP) mode, the current video block having an intra prediction direction associated with the current video block; and performing a second conversion between a next video block and a second bitstream representation of the next video block in which an intra mode predictor based on the intra prediction direction associated with the current video block is used during the second conversion.

35. The method of clause 34, wherein the intra prediction direction associated with the current video block is used as a most probable mode candidate during the second conversion.

Item 13 in section 4 provides additional examples and embodiments of the above-described method.

36. A video processing method, comprising: determining a maximum number of entries of a palette used during a conversion between a current video block of a video and a bitstream representation of the video, and performing the conversion using the maximum number, wherein a field in the bitstream representation signals changing of the maximum number across a video unit.

37. The method of clause 36, wherein the video unit corresponds to a coding tree block or a coding unit or a prediction unit or a transform unit.

38. The method of clauses 36-37, wherein the maximum number is based on coded information of the current video block.

Item 14 in section 4 provides additional examples and embodiments of the above-described method.

39. A video processing method, comprising: determining, due to using a palette coding mode during a conversion between a video picture comprising one or more video blocks and a bitstream representation of the video picture, that using a scaling matrix is disabled; and performing the conversion based on the determining that using the scaling matrix is disabled.

40. A video processing method, comprising: determining, due to using a palette coding mode during a conversion between a video picture comprising one or more video blocks and a bitstream representation of the video picture, that using a scaling matrix is permitted; and performing the conversion based on the determining that using the scaling matrix is permitted.

Item 15 in section 4 provides additional examples and embodiments of the above-described method.

41. The method of any of clauses 1 to 40, wherein the method is applied upon determining a characteristic of the video for which the conversion is being performed.

42. The method of clause 41, wherein the characteristic of video comprises a content type of the video.

43. The method of clause 41, wherein the characteristic of video comprises block dimensions used for the conversion.

44. The method of clause 41, wherein the characteristic of video comprises a partition tree structure used for the conversion.

Item 25 in section 4 provides additional examples and embodiments of the above-described method.

46. A video processing method, comprising: configuring, based on one or more characteristics of a current video block, a context for coding a usage of an intra block copy (IBC) mode on the current video block; and performing, based on the configuring, a conversion between the current video block and a bitstream representation of the current video block.

47. The method of clause 46, wherein the one or more characteristics comprise a block size of the current video block.

48. The method of clause 46, wherein the one or more characteristics comprise a shape of the current video block.

49. The method of clause 48, wherein the shape is square or non-square.

Item 16 in section 4 provides additional examples and embodiments of the above-described method.

50. The method of clause 46, wherein the configuring is further based on a coding mode of a neighboring block of the current video block.

Item 17 in section 4 provides additional examples and embodiments of the above-described method.

51. The method of clause 46, wherein the context comprises a first syntax element, and wherein the configuring is further based on a second syntax element associated with a neighboring block of the current video block.

Item 18 in section 4 provides additional examples and embodiments of the above-described method.

52. A video processing method, comprising: making a decision, for a current video block, regarding a selective inclusion of an indication of a coding mode in a bitstream representation of the current video block, wherein the coding mode uses an identity transform; and performing, based on the decision, a conversion between the current video block and the bitstream representation.

53. The method of clause 52, wherein the coding mode is a transform skip mode or a quantized residual block differential pulse-code modulation (QR-BDPCM).

Item 23 in section 4 provides additional examples and embodiments of the above-described method.

54. A method of video processing, comprising: performing a first determination regarding whether or not to use a preprocessing operation for a conversion between a current video block and a bitstream representation of the current video block; performing a second determination regarding whether or not to use a postprocessing operation for the conversion; and performing the conversion consistent with the first determination and the second determination; wherein the first determination and/or the second determination uses a quantization parameter of the current video block or a video region that includes the current video block.

55. The method of clause 54, wherein the first determination or the second determination disallow the preprocessing operation or the post processing operation in a case that the quantization parameter is less than a threshold.

56. The method of clause 55, wherein the threshold is a function of a bit depth of the current video block.

57. The method of any of clauses 54-56, wherein the preprocessing operation includes luma mapping with chroma scaling.

58. The method of any of clauses 54-57, wherein the postprocessing operation includes a filtering operation.

Item 31 in the previous section provides further variations of the techniques described in clauses 54-58.

59. The method recited in any of clauses 1-58, wherein the conversion comprises generating pixel values of the video region from the bitstream representation.

60. The method recited in any of clauses 1-58, wherein the conversion comprises generating the bitstream representation from pixel values of the video region.

61. A video processing apparatus comprising a processor configured to implement a method recited in any one or more of clauses 1 to 58.

62. A computer readable medium storing program code that, when executed, causes a processor to implement a method recited in any one or more of clauses 1 to 58.

The second set of clauses describe certain features and aspects of the disclosed techniques in the previous section, for example, Example Implementations 26 to 33.

1. A method of video processing, comprising: performing a conversion between a current video block of a video and a coded representation of the current video block according to a rule, wherein the rule specifies that, due to use of an identity transform coding tool for representing the current video block into the coded representation, a syntax field indicative of a quantization parameter used for decoding the current video block is included such that a value of the quantization parameter is modified according to a rule, wherein the identity transform coding tool allows coefficient values at a transform domain of the current block to be same as values of a residual block of the current video block.
2. The method of clause 1, wherein the value of the quantization parameter is modified based on a luma quantization parameter range offset (QpBdOffsety) and/or a chroma quantization parameter range offset (QpBdOffsetc).
3. The method of clause 1, wherein the value of the quantization parameter is modified based on a fixed offset.
4. The method of clause 1, the value of the quantization parameter is modified based on an input bitdepth.
5. The method of clause 1, wherein the value of the quantization parameter is modified based on an internal bitdepth and an input bitdepth.
6. The method of any of clauses 1 to 5, wherein the identity transform coding tool corresponds to a transform skip mode in which a transform and inverse transform processes are skipped.
7. The method of any of clauses 1 to 5, wherein the identity transform coding tool corresponds to a quantized residual block differential pulse-code modulation (QP-BDPCM) mode in which a block differential pulse code modulation is applied to a quantized residual block corresponding to the current video block.
8. The method of any of clauses 1 to 7, wherein the rule specifies to apply a clipping process to the quantization parameter in a case that the syntax element is equal to 1.
9. The method of clause 8, wherein the quantization parameter is set to a value that is a sum of 4 and the luma quantization parameter range offset (QpBdOffsety) in a case that the quantization parameter is smaller than the luma quantization parameter range offset (QpBdOffsety).
10. The method of clause 8, wherein the quantization parameter is set to a certain value in a case that the quantization parameter is smaller than the certain value.
11. The method of clause 8, wherein the quantization parameter is set to $(4+6*(bd-bdi))$ in a case that the quantization parameter is smaller than $(4+6*(bd-bdi))$, wherein bd indicating the internal bitdepth and bdi indicating the input bitdepth.
12. The method of any of clauses 1 to 7, wherein the rule specifies to add an offset to the quantization parameter (QPdec) to obtain modified quantization parameter in a case that the syntax element is equal to 1.
13. The method of any one of clauses 1 to 7, wherein the modified quantization parameter corresponds to a sum of QPdec, 4, and the luma quantization parameter range offset (QpBdOffsety) or a sum of QPdec and 4.
14. The method of clauses 4 to 12, wherein the modified quantization parameter corresponds to a value obtained by an equation, $QPdec+(4+6*(bdi-8))$, bdi indicating the input bitdepth.
15. The method of any one of clauses 1 to 14, wherein modified quantization parameter is used for processing a subsequent block of the video, the processing of the subsequent block including using at least one of multiple parameters including a delta quantization parameter for a quantization, a dequantization, a filtering, or a prediction operation.
16. The method of any of clauses 1 to 15, wherein the value of the quantization parameter is obtained independently of an internal bitdepth QP offset.
17. The method of any of clauses 1 to 15, wherein the value of the quantization parameter is obtained without adding a luma quantization parameter range offset (QpBdOffsety).
18. The method of any of clauses 1 to 15, wherein the value of the quantization parameter is obtained using an internal bitdepth QP offset.
19. A method of video processing, comprising: performing a conversion between a current video block of a video and a coded representation of the current video block, wherein the coded representation conforms to a formatting rule specifying a selective inclusion of a syntax element indicative of use of a coding tool using an identity transform based on quantization parameter included in the coded representation.
20. The method of clause 19, wherein the coding tool corresponds to a transform skip mode in which a transform and inverse transform processes are skipped or corresponds to a quantized residual block differential pulse-code modulation (QP-BDPCM) mode in which a block differential pulse code modulation is applied to a quantized residual block corresponding to the current video block.
21. The method of clause 19, wherein the formatting rule specifies not to include the syntax element based on a value of the quantization parameter.
22. The method of clause 21, wherein the formatting rule specifies not to include the syntax element in a case that the value of the quantization parameter is smaller than 4 or smaller than a sum of 4 and a luma quantization parameter range offset.
23. The method of any of clauses 19 to 22, wherein the syntax element includes transform_skip_flag and/or intra_bdpcm_flag.
24. A method of video processing, comprising: performing a conversion between a current video block of a video and a coded representation of the current video block, wherein the coded representation conforms to a formatting rule specifying that a syntax element indicative of an input bit depth of the video is included in the coded representation.
25. The method of clause 24, wherein the syntax element (input_bitdepth−8) is included in a sequence parameter set (SPS) or a video parameter set (VPS) to indicate the input bit depth and has a value obtained by subtracting 8 from the input bit depth.
26. The method of clause 24, wherein the syntax element (internal_bitdepth−input_bitdepth) is included in a sequence parameter set (SPS) or a video parameter set (VPS) to indicate the input bit depth and has a value obtained by subtracting the input bit depth from an internal bitdepth.
27. The method of clause 25 or 26, wherein the syntax element has a range between 0 and dQP, where dQP is a fixed value.
28. A method of video processing, comprising: determining, for a conversion between a video block of a video unit of a video and a coded representation of the video, whether to perform a pre-processing operation or a post processing operation on the video block based on a quantization parameter associated with the video block or the video unit; and performing the conversion based on the determining.
29. The method of clause 28, wherein the pre-processing operation corresponds to a luma mapping with chroma scaling (LMCS) operation in which luma samples of the current video block are reshaped between a first domain and a second domain and chroma residual is scaled in a luma-dependent manner.
30. The method of clause 28, wherein the post processing operation corresponds to a filtering operation performed after reconstructing of the current video block.
31. The method of clause 28, wherein the pre-processing operation and/or the post processing operation is disallowed in a case that the quantization parameter is smaller than a threshold.
32. The method of clause 31, wherein the threshold is predefined.
33. The method of clause 31, wherein the quantization parameter is modified according to a rule.
34. The method of clause 28, wherein a deblocking operation is not performed in a case that the quantization parameter (QP) is smaller than (4+6*(bd−bdi)), the bd is an internal bit depth and the bdi indicating an input bitdepth.
35. The method of clause 28, wherein an adaptive loop filtering operation is not performed in a case that the quantization parameter (QP) is smaller than (4+6*(bd−bdi)), the bd indicating an internal bitdepth and the bdi indicating an input bitdepth.
36. The method of clause 28, wherein a sample-adaptive offset operation is not performed in a case that the quantization parameter (QP) is smaller than (4+6*(bd−bdi)), the bd indicating an internal bitdepth and the bdi indicating an input bitdepth.
37. The method of clause 28, wherein a luma mapping with chroma scaling (LMCS) operation is not performed in a case that the quantization parameter (QP) is smaller than (4+6*(bd−bdi)), the bd indicating an internal bitdepth and the bdi indicating an input bitdepth.
38. The method of any of clauses 1 to 37, wherein the performing of the conversion includes generating the coded representation from the video.
39. The method of any of clauses 1 to 37, wherein the performing of the conversion includes generating the video from the coded representation.
40. A video processing apparatus comprising a processor configured to implement a method recited in any one or more of clauses 1 to 39.
41. A computer readable medium storing program code that, when executed, causes a processor to implement a method recited in any one or more of clauses 1 to 39.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described and other implementations, enhancements and variations can be made based on what is described and illustrated in this patent document.

What is claimed is:

1. A method of processing video data, comprising:
   determining, for a conversion between a current video block of a video and a bitstream of the video, to clip a quantization parameter indicated by a syntax field for the current video block coded with a transform skip mode in which transform and inverse transform processes are skipped;
   clipping a value of the quantization parameter based on a variable indicating a minimum allowed quantization parameter for the transform skip mode; and
   performing the conversion based on the clipping,
   wherein in the clipping, the value of the quantization parameter is set to the value of the variable when the value of the quantization parameter is smaller than the value of the variable,
   wherein the current video block is a chroma block and a chroma prediction mode for the current video block is derived based on a luma coding information of a first luma block corresponding to the current video block, and
   wherein in a case where the first luma block is a neighboring block of a second luma block, a default mode is assigned to the first luma block for constructing an intra mode candidate list of the second luma block in response to the second luma block and the first luma block being in a different slice or tile.

2. The method of claim 1, wherein the value of the variable is greater than 0.

3. The method of claim 1, wherein the value of the variable is greater than or equal to 4.

4. The method of claim 3, wherein the value of the variable is equal to (4+X), wherein X is a pre-defined value being greater than or equal to 0.

5. The method of claim 4, wherein X=6*Y, wherein Y is determined based on at least one syntax element included in the bitstream.

6. The method of claim 5, wherein Y=bd−bdi, wherein bd is an internal bitdepth of coding the video, and bdi is an input bitdepth of the video.

7. The method of claim 1, wherein the current video block is coded based on a differential coding mode, wherein in the differential coding mode, differences between quantized residuals derived with an intra prediction mode of the current video block and predictions of the quantized residuals are included in the bitstream.

8. The method of claim 1, wherein the conversion comprises encoding the current video block into the bitstream.

9. The method of claim 1, wherein the conversion comprises decoding the current video block from the bitstream.

10. An apparatus for processing video data comprising a processor and a non-transitory memory with instructions thereon, wherein the instructions upon execution by the processor, cause the processor to:
    determine, for a conversion between a current video block of a video and a bitstream of the video, to clip a quantization parameter indicated by a syntax field for the current video block coded with a transform skip mode in which transform and inverse transform processes are skipped;
    clip a value of the quantization parameter based on a variable indicating a minimum allowed quantization parameter for the transform skip mode; and
    perform the conversion based on the clipping,
    wherein in the clipping, the value of the quantization parameter is set to the value of the variable when the value of the quantization parameter is smaller than the value of the variable,
    wherein the current video block is a chroma block and a chroma prediction mode for the current video block is derived based on a luma coding information of a first luma block corresponding to the current video block, and
    wherein in a case where the first luma block is a neighboring block of a second luma block, a default mode is assigned to the first luma block for constructing an intra mode candidate list of the second luma block in response to the second luma block and the first luma block being in a different slice or tile.

11. The apparatus of claim 10, wherein the value of the variable is greater than 0.

12. The apparatus of claim 10, wherein the value of the variable is greater than 4.

13. The apparatus of claim 12, wherein the value of the variable is equal to (4+X), wherein X is a pre-defined value being greater than or equal to 0.

14. The apparatus of claim 13, wherein X=6*Y, wherein Y is determined based on at least one syntax element included in the bitstream.

15. The apparatus of claim 10, wherein the current video block is coded based on a differential coding mode, wherein in the differential coding mode, differences between quantized residuals derived with an intra prediction mode of the current video block and predictions of the quantized residuals are included in the bitstream.

16. A non-transitory computer-readable storage medium storing instructions that cause a processor to:
- determine, for a conversion between a current video block of a video and a bitstream of the video, to clip a quantization parameter indicated by a syntax field for the current video block coded with a transform skip mode in which transform and inverse transform processes are skipped;
- clip a value of the quantization parameter based on a variable indicating a minimum allowed quantization parameter for the transform skip mode; and
- perform the conversion based on the clipping,
- wherein in the clipping, the value of the quantization parameter is set to the value of the variable when the value of the quantization parameter is smaller than the value of the variable,
- wherein the current video block is a chroma block and a chroma prediction mode for the current video block is derived based on a luma coding information of a first luma block corresponding to the current video block, and
- wherein in a case where the first luma block is a neighboring block of a second luma block, a default mode is assigned to the first luma block for constructing an intra mode candidate list of the second luma block in response to the second luma block and the first luma block being in a different slice or tile.

17. The non-transitory computer-readable storage medium of claim 16, wherein
- the value of the variable is greater than 0; or
- the value of the variable is greater than or equal to 4,
- wherein the value of the variable is equal to (4+X), X is a pre-defined value being greater than or equal to 0, and
- wherein X=6*Y, wherein Y is determined based on at least one syntax element included in the bitstream.

18. A non-transitory computer-readable recording medium storing a bitstream of a video which is generated by a method performed by a video processing apparatus, wherein the method comprises:
- determining, for a current video block of the video, to clip a quantization parameter indicated by a syntax field for the current video block coded with a transform skip mode in which transform and inverse transform processes are skipped;
- clipping a value of the quantization parameter based on a variable indicating a minimum allowed quantization parameter for the transform skip mode; and
- generating the bitstream based on the clipping,
- wherein in the clipping, the value of the quantization parameter is set to the value of the variable when the value of the quantization parameter is smaller than the value of the variable,
- wherein the current video block is a chroma block and a chroma prediction mode for the current video block is derived based on a luma coding information of a first luma block corresponding to the current video block, and
- wherein in a case where the first luma block is a neighboring block of a second luma block, a default mode is assigned to the first luma block for constructing an intra mode candidate list of the second luma block in response to the second luma block and the first luma block being in a different slice or tile.

19. The non-transitory computer-readable recording medium of claim 18, wherein
- the value of the variable is greater than 0; or
- the value of the variable is greater than or equal to 4,
- wherein the value of the variable is equal to (4+X), X is a pre-defined value being greater than or equal to 0, and
- wherein X=6*Y, wherein Y is determined based on at least one syntax element included in the bitstream.

20. The non-transitory computer-readable recording medium of claim 19, wherein Y=bd−bdi, wherein bd is an internal bitdepth of coding the video, bdi is an input bitdepth of the video.

* * * * *